Dec. 13, 1966 E. E. HANNA ET AL 3,291,913

TELEPHONE SYSTEM SIGNAL CONVERTER

Filed May 17, 1963 13 Sheets-Sheet 1

INVENTORS E. E. HANNA
A. W. KETTLEY
T. N. LOWRY

BY William F. Simpson.

ATTORNEY

Dec. 13, 1966 E. E. HANNA ET AL 3,291,913

TELEPHONE SYSTEM SIGNAL CONVERTER

Filed May 17, 1963 13 Sheets-Sheet 5

Dec. 13, 1966 E. E. HANNA ET AL 3,291,913

TELEPHONE SYSTEM SIGNAL CONVERTER

Filed May 17, 1963 13 Sheets-Sheet 7

Dec. 13, 1966 E. E. HANNA ET AL 3,291,913

TELEPHONE SYSTEM SIGNAL CONVERTER

Filed May 17, 1963 13 Sheets-Sheet 9

3,291,913

TELEPHONE SYSTEM SIGNAL CONVERTER

Edward E. Hanna, Brooklyn, N.Y., Arthur W. Kettley, Middletown, N.J., and Terrell N. Lowry, New York, N.Y., assignors to Bell Telephone Laboratories, Incorporated, New York, N.Y., a corporation of New York Filed May 17, 1963, Ser. No. 281,137
17 Claims. (Cl. 179—16)

This invention is directed to automatic telephone switching systems and more particularly to means for translating multifrequency calling signals to serial trains of pulses similar to dial pulses.

It has previously been proposed to provide converters for step-by-step switching systems, for example, which will respond to received multifrequency signals and transmit series of pulses representing the same information in a form suitable for operation or actuation of the step-by-step switches. Examples of such an arrangement are shown in a patent of F. C. Kuchas, No. 3,133,155, issued May 12, 1964, and a patent of G. Riddell, No. 3,231,675, issued Jan. 25, 1966.

In these and other prior art arrangements each converter is self-contained and performs all of the necessary functions without use of any common equipment. Such arrangements are advantageous and economical when electromechanical relays and related types of switching equipment are employed.

In accordance with our invention, we employ economical equipment for translating the multifrequency signals received from a subscriber to series of pulses similar to dial pulses suitable for operation of these step-by-step switches.

In order to advantageously and economically employ electronic equipment by making more efficient use of the higher speeds obtainable with electronic equipment, we have provided common storage and common control equipment, which common equipment is capable simultaneously of controlling the translation of a number of calls on a time division basis. Thus, by providing relatively simple and inexpensive gates and other equipment for each individual call and providing for the control and storage on a common basis, the higher speeds of the electronic equipment may be advantageously employed and at the same time less of such equipment is required, thus making the arrangement more economical.

Another object of our invention is to provide a stored program for controlling the operations of our electronic equipment. This stored program is separate and independent from the stored signals as received from the calling subscriber. Thus, in accordance with our invention it is relatively easy to change the operations performed and the order in which they are performed and the manner in which they are programmed, it being only necessary to change the information recorded in the stored program.

Another object of our invention is to employ a plurality of stored programs and to repeatedly employ these different programs in succession for each of the calls being processed thereby.

A feature of our invention is to employ one program comprising a sequence of orders for controlling the transmission of a series of pulses suitable for operation of step-by-step switches.

Another feature of a specific embodiment of our invention is to employ a separate program for receiving and controlling the registering and storing of received signals.

Another feature of a specific embodiment of our invention is employing a third program for translation, for the recording of a status of a call, and for over-all control of the operation of the system.

Another feature of our invention is to repeatedly employ each of these programs in succession one after another in the handling of telephone calls.

Another feature of our invention is to employ a portion of each of the programs for scanning or responding to the received signals since they may be of a short duration and not persist sufficiently long to permit their scanning by only one of the programs.

In accordance with another feature of our invention we employ two storage devices, one for storing the various series of orders comprising the respective programs and the other for storing received information designating the called subscriber.

Another feature of our invention is to employ a reentrant serial type of storage equipment.

In an exemplary embodiment of our invention we employ two shift registers, one for each of the storage devices. Each shift register comprises in effect a shift register for each bit or denominational order in each of the registers.

The program store comprises two sections, an A section and a B section, the A section having three bits and the B section having four bits. Thus, seven such shift registers are employed and operated in parallel so that all the bits of each of the words may be read out simultaneously.

The signal store comprises four bits for each word so four shift registers are provided which are actuated in parallel so that each stored word for read out is in parallel. The program store of the exemplary embodiment of this invention employs 55 program words so that this store is 55 words long and each word read out comprises seven bits. The signal storage register is divided up into register spaces, one register space being provided for each converter required. Each of the register spaces in the exemplary embodiment described herein provides 15 words and since it is assumed that there will be ten such converters or converter register spaces, the signal storage shift registers are 10 times 15 or 150 words long.

In accordance with an other feature of our invention, the control equipment is arranged so that the various programs are employed in combination with the various register spaces in the signal store register in sequence. Thus, the A program will be employed in combination with the information stored in the No. 1 converter register space; then the B program will be employed with the information stored in the No. 2 converter register space; and then the C program will be employed with the information stored in the No. 3 converter register space. Thereafter, the A program will be employed in combination with the information stored in the No. 4 converter register space and the above operations are then repeated.

A feature of our invention is directed to making the number of programs not evenly divisible into the number of converter register spaces so that each program will be employed in succession in combination with each converter register space.

A feature of our invention is to employ as a shift register magnetic shift registers employing ferrite magnetic cores preferably of a type having nondestrucutive read out such as disclosed in one or more of the following U.S. patents: (1) Patent 2,869,112, issued to L. P. Hunter on January 13, 1959, (2) Patent 2,889,542 issued to R. B. Goldner et al. on June 2, 1959, (3) Patent 2,963,591, issued to T. H. Crowley et al. on December 6, 1960, and (4) Patent 3,040,305 issued to U. F. Gianola on June 19, 1962; or in one or both of the following patent applications of Gianola, Serial No. 204,682, now Patent 3,145,370 and Serial No. 204,683, both filed June 25, 1962, now Patent 3,145,371.

A feature of our invention is an arrangement for entering information in such storage shift registers at different positions to permit higher speed operation and to simplify the over-all control logic circuits.

The foregoing and other objects and features of our invention may be more readily understood from the following description of an exemplary embodiment when read with reference to the attached drawing, in which:

FIG. 1 shows a portion of a step-by-step automatic telephone switching system and the manner in which the converter, converter registers and control circuits in accordance with this invention are interconnected with such a step-by-step telephone switching system.

Figure 1:
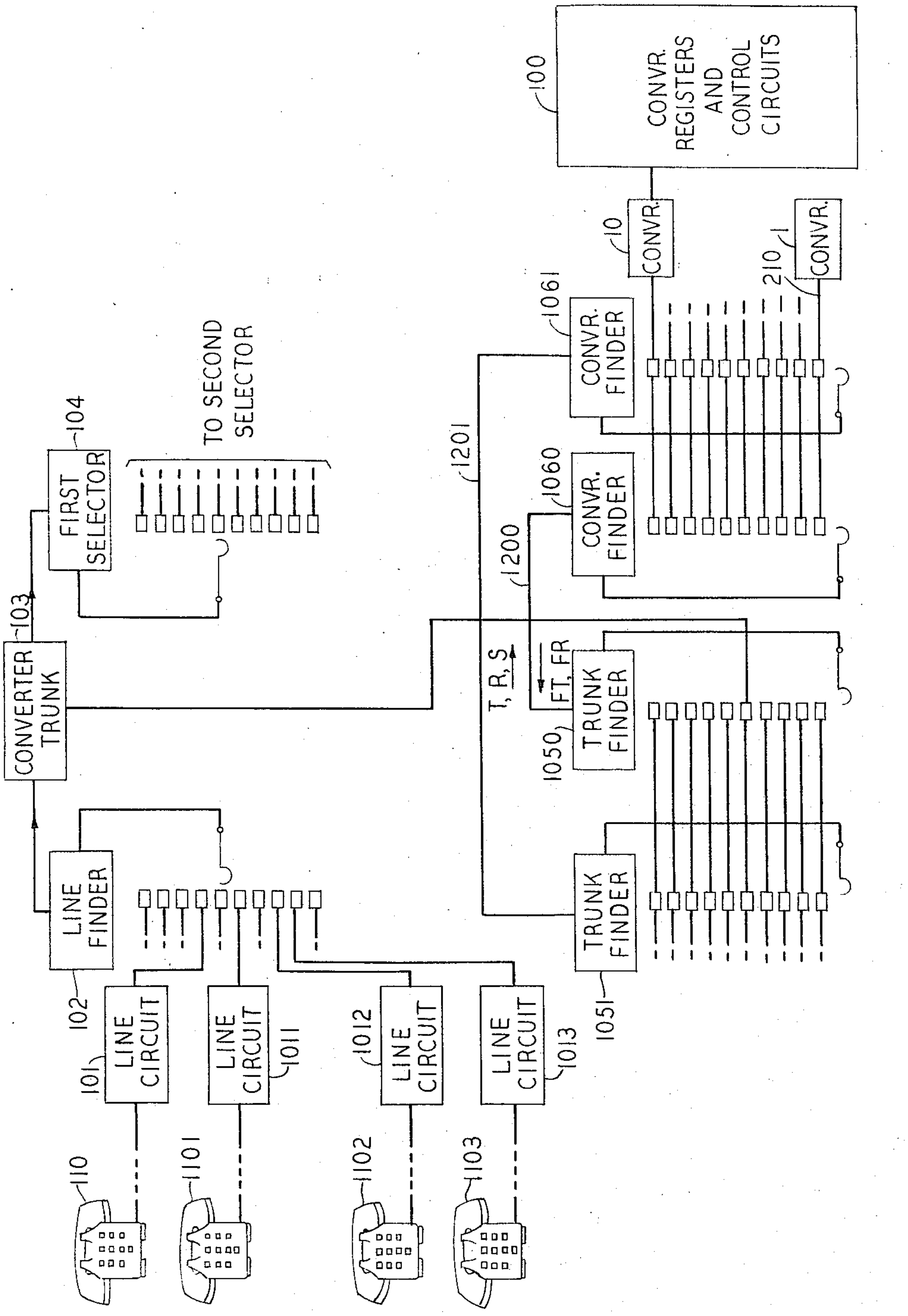
FIG. 1 shows portions of a step-by-step telephone switching system and the manner in which the circuits in accordance with our invention cooperate therewith.

As shown in FIG. 1 a plurality of subscribers' stations 110, 1101, 1102 and 1103 are connected with the step-by-step switching system by means of subscribers' lines. These lines terminate in the line circuits 101, 1011, 1012 and 1013. The line circuits are interconnected with the banks of a plurality of line finders represented by line finder 102. These line circuits 101, 1011, 1012 and 1013 are likewise connected to connector bank terminals for terminating calls. Since these connector connections are well understood they are not shown in the drawing. Only one line finder 102 is shown in the drawing and this is represented as having a bank of ten levels. Such a bank would normally have 100 positions or sets of contacts to serve 100 subscribers' lines or stations. The line finder may also be arranged to cooperate with 200 lines, two sets of such banks being provided for each line finder. In addition, a large plurality of such groups of line finders will be provided in the usual step-by-step central office, the number depending upon the number of calls handled by the office during the busy hours, as is well understood.

In the usual step-by step office each line finder circuit, such as 102, is directly interconnected by means of a trunk to a first selector, such as 104, there being one first selector 104 for each line finder 102, as described in the above-identified patent applications of Kuchas and Riddell. When it is desired to provide conversion from multifrequency calling signals to a series of pulses suitable for operating step-by-step switches, a converter trunk, such as 103, is interposed in the connection between the line finder, such as 102, and the first selector 104. This converter trunk is arranged so that the multifrequency calling signals from the subscriber stations may be transmitted to the control equipment, and the converted pulse trains then transmitted from the converter circuits, in accordance with our invention, through the converter trunk 103 to the first selector and then through the central office, through and to the succeeding step-by-step switches required to establish the desired connection.

When the call is completely established, the converter trunk 103 is switched so that the path from the line finder 102 extends directly to the corresponding first selector 104 for the transmission of voice frequency signals and the maintaining of the connection through the step-by-step switches; the charging circuits may also extend directly through this converter at this time.

In addition, upon the completion of the establishing of the call, the circuits in accordance with this invention will release so that they may be available for use in combination with other converter trunks, similar to 103, for establishing other connections through the step-by-step system.

The converter trunk 103 has connections extending to banks of trunk finder switches, such as 1050 and 1051. These banks are similar to the line finder banks except that they may have more contacts in each set. Usually they will be arranged to have 100 such sets of contacts, one set for each converter trunk, similar to trunk 103. The trunk finders are likewise similar to the line finders, and the control and starting circuits operate in a manner analogous to the corresponding circuits in the line finders, as is well known in the art.

Each of the converter trunk finders, such as 1050 and 1051, is connected over a trunk, such as 1200 and 1201, to a converter finder, such as 1060 and 1061. The banks of the converter finders have connected to them converters as shown in FIG. 1; these banks have ten levels, and ten converters 1 to 10 are shown connected to the corresponding levels. In the usual central office the converter banks will have 100 such terminals, ten on each level and ten levels. Thus, provision is made for each 100 converters in such a converter finder group, the converters being multipled to corresponding contacts in the banks of each of the converter finders in the usual manner.

Both the converter trunk appearances in the trunk finder banks and converter appearances in the converter finder banks may be slipped in a manner analogous to any of the manners in which the subscribers' lines are slipped and interconnected between the banks and various line finders in a given line finder group.

As in the case of line finders, a plurality of trunk finders and converter finders will be provided in each group and, where the calling rate is sufficiently high, a plurality of such groups may be provided.

In accordance with our invention a common group of circuits 100 is provided for a plurality of the converters. As shown in the exemplary embodiment described herein, this common equipment 100 is arranged to be used in combination with ten converters and thus handle ten substantially simultaneous calls. The equipment may be expanded to handle more simultaneous calls as may be desired or required by the traffic load in the central office.

Briefly, when a subscriber, such as the subscriber at station 110, initiates a call he will pick up the handset; this will close the loop to the central office whereupon the line circuit 101 initiates the operation of one of the line finders of the group associated with this subscriber line, then this line finder, such as line finder 102, will find the subscriber's line. The connection is then extended through the line finder and converter trunk 103 to the banks of the trunk finder, such as trunk finders 1050 and 1051. One of these trunk finders, such as 1050, then finds this trunk and the associated converter finder 1060 finds an idle converter, such as converter 1. The system is then in condition for responding to the multifrequency signals transmitted by pushbuttons on the subscriber's set 110. At this time these signals are transmitted from the subscriber set 110 and over the subscriber's line through the line circuit 101, line finder 102, converter trunk 103, and trunk finder 1050, for example, and then over trunk 1200 to the converter finder 1060 and then to the converter 1 and the converter register and control circuit 100. The incoming signals are then translated or converted into series of pulses suitable for operation of the step-by-step switches and transmitted from the converter register and control circuits 100, converter 1, converter finder 1060, trunk finder 1050, converter trunk 103 to the first selector 104.

The first series of these signals operates this first selector. The succeeding series of signals representing the succeding digits will be transmitted from the converter registers and control circuits 100 over the path described above and then through the first selector 104 and the succeeding step-by-step switches and cause a connection to be established to the called party in the usual manner. Thereafter, the circuits in the converter trunk 103 are actuated to directly connect the line finder 102 to the first selector 104 and disconnect the circuits through the trunk finder 1050, a converter finder 1060 to the converter 1 and the converter register and control circuits 100.

Upon completion of the call the line finder 102, the converter trunk 103, the first selector 104 and the succeeding step-by-step switches in the train are released in the usual manner and the respective circuits restored to their idle condition so that they are available for use in establishing other calls through the step-by-step central office in the above described manner.

Figure 2:
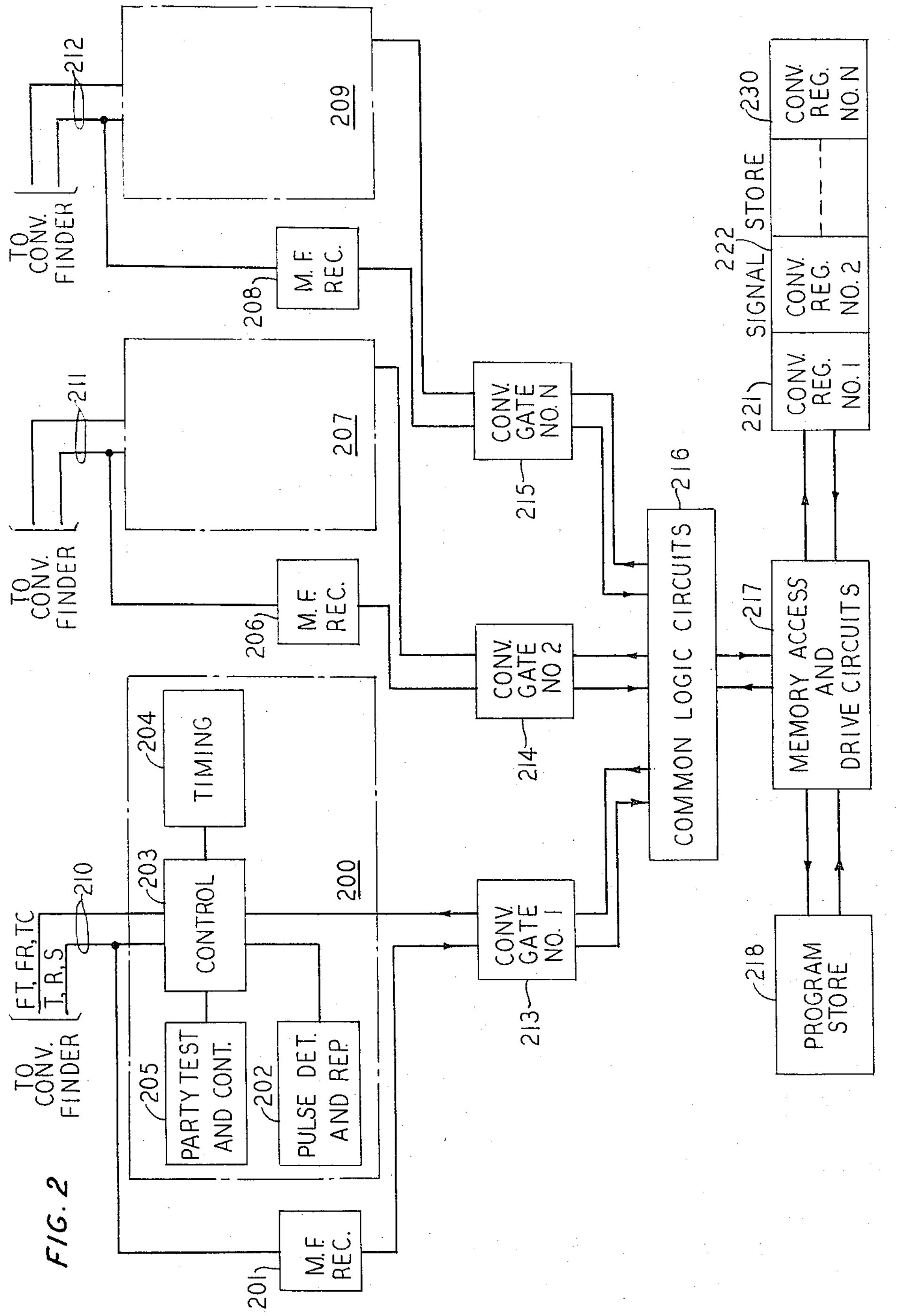
FIG. 2 shows in outline form the various circuits of our invention and the manner in which they cooperate one with the other.

FIG. 2 shows the various components of a converter system in accordance with one embodiment of our invention and the manner in which the various components cooperate one with the other.

FIG. 2 shows in greater detail the circuit arrangements of the various components and the converter registers and control circuits represented in FIG. 1. As indicated in the above-identified patent applications of F. C. Kuchas and G. Riddell, the converters are connected to the step-by-step system by the trunk finders and converter finders and the converter trunk shown in FIG. 1. FIG. 2 shows the details of the converter circuits which are connected to the converter finders. Thus, the trunk circuit 210 extends to the converter finder bank contacts as illustrated in FIG. 1. These conductors comprise a tip, ring and sleeve T, R and S, which are interconnected through the converter trunk to the incoming line and FT, FR and TC conductors which are interconnected through the converter trunk 103 to the first selector 104. Thus six conductors extend through the converter finder and trunk finder and interconnecting trunk such as 1200 to the converter trunk 103.

As illustrated in FIG. 2 and also set forth in the above-identified copending patent applications, the tip, ring and sleeve conductors extend to control circuit 203 which is, in turn, interconnected with the timing circuit 204 and the party test and continuity circuit 205. Control circuit 203 and the pulse detector and repeater circuit 202 are provided.

In addition, a multifrequency receiver 201 is provided and interconnected with the tip and ring conductors T and R.

This multifrequency receiver circuit is interconnected with a converter gate circuit No. 1, for example 213.

The multifrequency receiving circuit 201 is arranged to cooperate with a multifrequency transmitting equipment at the various representative subscribers' stations such as 110, 1101, 1102 and 1103 shown in FIG. 1. Exemplary subscribers' station circuits and equipment and multifrequency receiving equipment are shown in the following Patents:

| Patent | Issued To— | Issue Date |
|---|---|---|
| 2,147,710 | R. F. Mallina | 2/21/39 |
| 2,153,129 | H. M. Bascom | 4/4/39 |
| 2,228,113 | R. E. Hersey | 1/7/41 |
| 2,232,398 | A. A. Lundstrom | 2/18/41 |
| 2,237,742 | do | 4/8/41 |
| 2,276,037 | do | 3/10/42 |
| 2,315,344 | R. F. Mallina | 3/30/43 |
| 3,076,059 | L. A. Meacham, L. Schenker | 1/29/63 |

and copending patent application C. E. Mitchell, R. E. Prescott, L. Schenker, D. G. Tweed, Serial No. 860,549, filed December 18, 1959, now Patent 3,109,071.

The above-described circuits in FIG. 2 are similar to the corresponding circuits in the above-identified copending applications of F. C. Kuchas and G. Riddell and operate in a similar manner. These circuits are interconnected as shown in FIG. 2 with the converter gate circuit 213 which in turn is interconnected to the common logic circuit 216. These logic circuits are in turn interconnected with the memory access and drive circuits 217. The memory access and drive circuits 217 are in turn interconnected with a program store 218 and with a group of signal stores 221 through 230.

As shown in FIG. 1 a plurality of the converter circuits are provided which are presented by the converter circuit 1 and 10. It is assumed that ten such circuits will be provided for one of the converter register and circuits 100. As shown in FIG. 2, three such circuits are represented and are designated 200, 207 and 209. These are interconnected with the converter finder banks of FIG. 1 by means of their respective trunks or groups of conductors 210, 211 and 212. Each of these converter circuits is provided with a multifrequency receiver such as 201, 206 and 208 and they are, in turn, interconnected with the respective gate circuits No. 1 through N, designated 213, 214 and 215 in FIG. 2.

The common logic circuits 216 are common to all of these converters and converter gates of which there are assumed to be ten in the exemplary embodiment described herein.

Similarly, the memory access and drive circuits 217 and the program store 218 are common to all of this group of converter circuits. Likewise a signal store is provided common to all of these converter circuits. The signal store, however, is divided up into converter register spaces or storage portions, each of which is individual to and assigned to each of the converter circuits. Thus, the converter register No. 1 designated 221 is assigned to and individual to the converter circuit 200 and to the converter gate 213. The converter register No. 2 designated 222 is assigned to and individual to the converter 207 and the converter gate No. 2 designated 214. Similarly, the converter register No. N, designated 230, is individual to the converter circuit 209 and the converter gate 215.

Thus, the incoming signals are transmitted from the subscriber to the multifrequency receiver such as 201 through the circuits of FIG. 1, as described above, and then through the converter gate circuits 213 to the common logic circuits 216 and then through the memory access and drive circuits to the signal store. These circuits are in turn controlled by the program store 218. The signals are recorded and stored in the corresponding converter register such as 221 and then retransmitted as a series of dial pulses under control of the stored signals in the signal store back through the memory access and drive circuits 217, common logic circuits 216, converter gate 213 and control circuit 203 to the converter trunk circuit 103 and then to the first selector 104 through the equipment represented in FIG. 1 in the manner described above.

Figure 3:
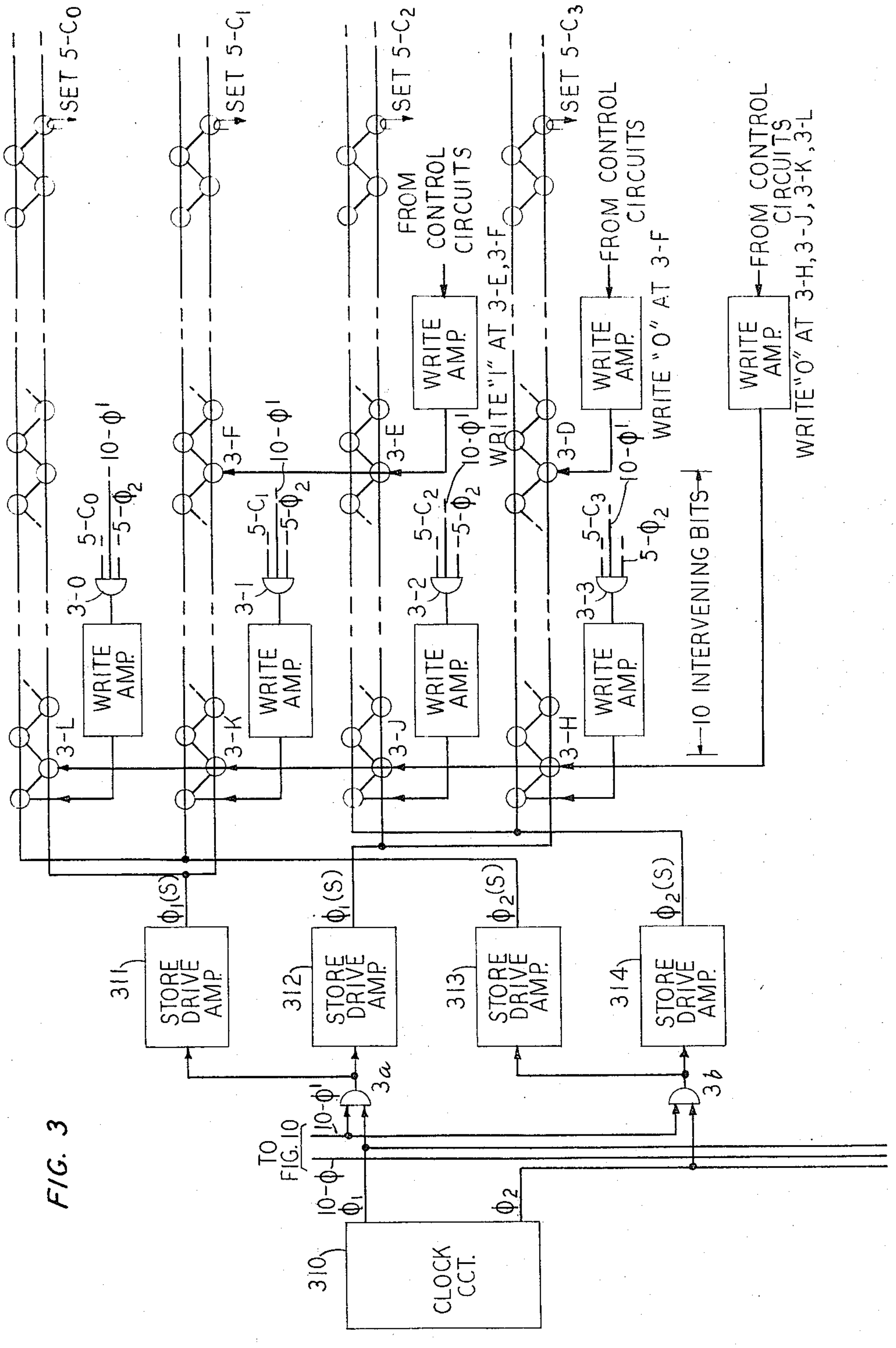
FIG. 3 shows the clock circuit and the driving and other circuits of the signal store.
Figure 4:
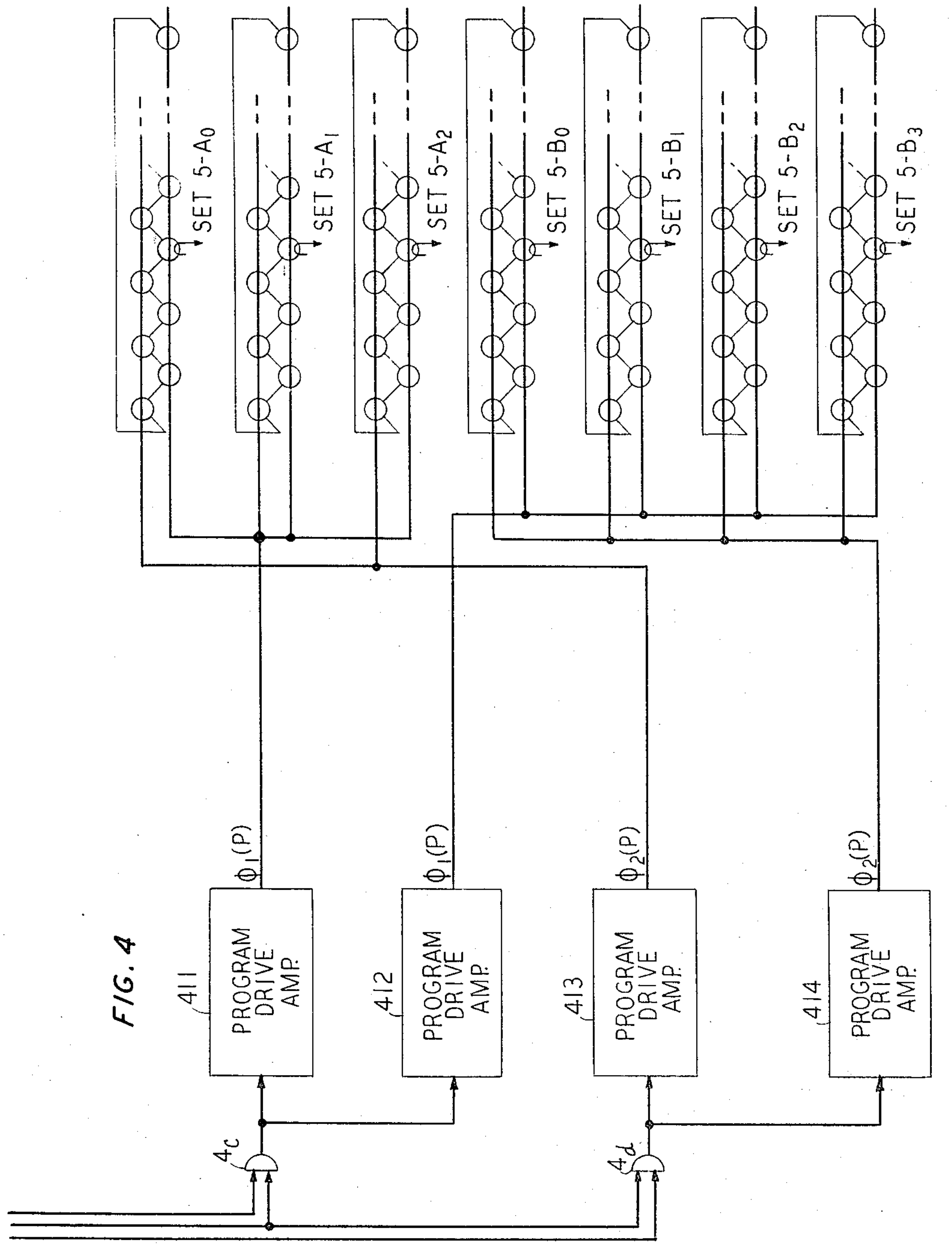
FIG. 4 shows driving and other circuits of the program store.

FIGS. 3 and 4 show the memory access and drive circuits 217, the program store 218 and the signal store in greater detail.

Figure 10:
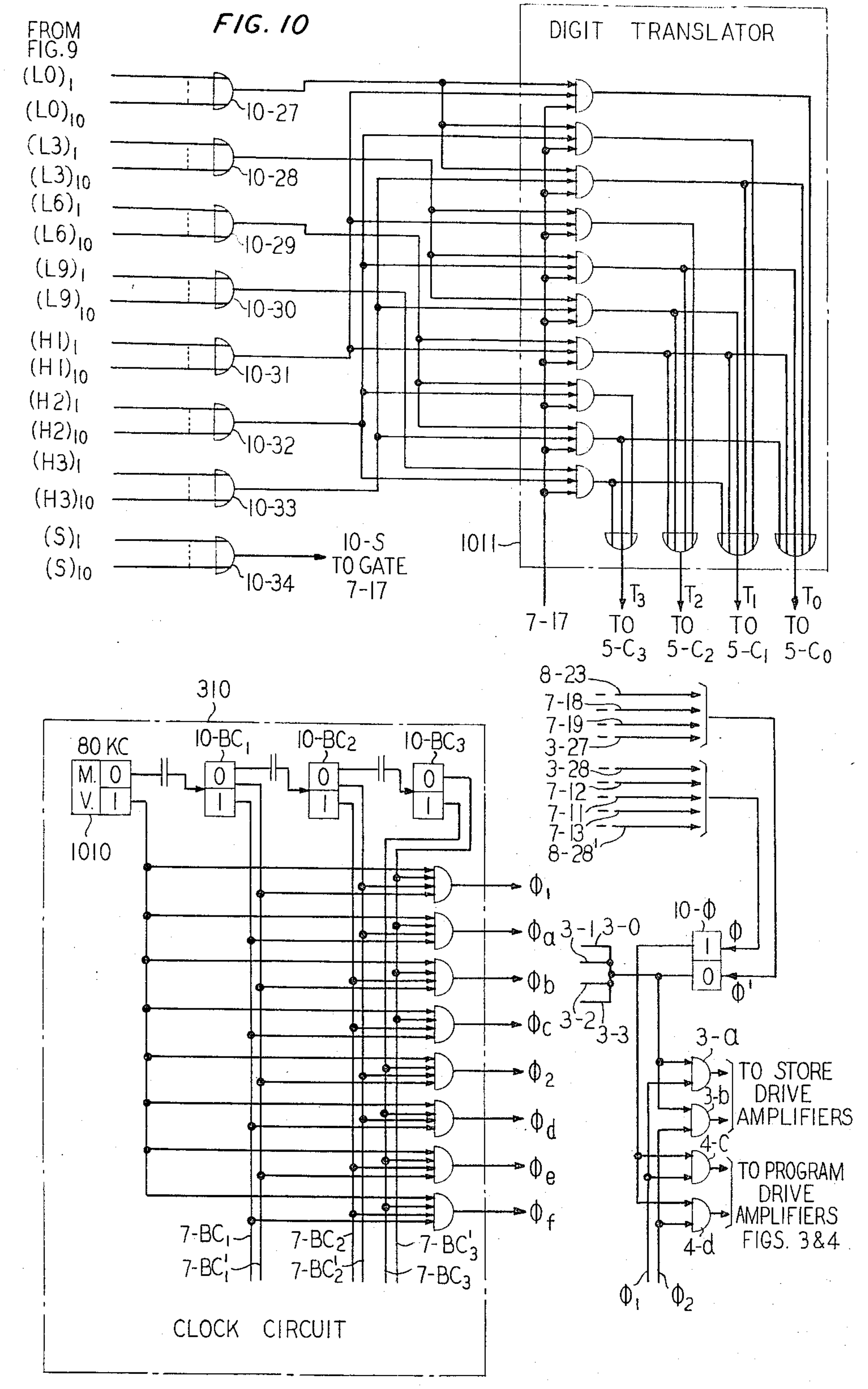

The system is controlled by a clock circuit 310 which is shown in greater detail in FIG. 10. This clock circuit repeatedly generates a series of clock pulses. During each cycle of operation of this circuit a series of 8 pulses are generated. These pulses designated $\Phi_1$, $\Phi_a$, $\Phi_b$, $\Phi_c$, $\Phi_2$, $\Phi_d$, $\Phi_e$ and $\Phi_f$ are generated in this order. These pulses are assumed to be uniformly spaced during the cycle but need not be. All of these pulses are transmitted to the common logic circuits 216 which are shown in detail in FIGS. 5 through 10, inclusive. The $\Phi_1$ and $\Phi_2$ pulses are also transmitted under control of these common logic circuits to the program store and to the signal store through corresponding drive amplifiers. The signal store is represented in FIG. 3 and the program store in FIG. 4. Thus, the $\Phi_1$ and $\Phi_2$ pulses are transmitted from the clock circuit 310 through the And gates $3_a$ and $3_b$ to the signal store drive amplifiers 311, 312, 313 and 314 under control of the 10–Φ flip-flop (FIG. 10). Similarly, the $\Phi_1$ and $\Phi_2$ pulses are transmitted through the And gates $4_c$ and $4_d$ to the program drive amplifiers 411, 412, 413 and 414 again under control of the 10–Φ flip-flop. When 10–Φ flip-flop is in its "0" state the $\Phi_1$ and $\Phi_2$ pulses are transmitted to the signal store of FIG. 3 and when this flip-flop is in its "1" state they are transmited to the program store depicted in FIG. 4.

The various drive amplifiers 311, 312, 313 and 314, and 411, 412, 413 and 414 may be of any suitable type including vacuum tube amplifiers and also transistor amplifiers or combinations of such amplifiers. They may also include various types of gain control, limiting and clamping circuits, and other control equipment known in the prior art. Outputs from these amplifiers extend to the corresponding shift registers comprising the program store and the signal store.

In the exemplary embodiment of our invention described herein both the program register and the signal store employ the diodeless magnetic shift registers of the type disclosed in U.S. Patents 2,889,542, granted to R. B. Goldner et al. on June 2, 1959 and 2,963,591, granted to T. H. Crowley et al. on December 6, 1960 and also disclosed in Gianola applications, Serial No. 204,682 and Serial No. 204,683, both filed June 25, 1962.

Each of these stores comprises a plurality of such shift registers. A shift register is provided in each store for each bit of the words required to be stored in their respective stores. Each of these shift registers is arranged to require two driving pulses. These pulses are sometimes considered a stepping pulse and a priming pulse. The registers are both arranged so that they step upon the reception of a $\Phi_1$ pulse, which causes bits in the respective shift registers and thus a word in the respective stores to be read out. The $\Phi_2$ pulse is sometimes considered a priming or conditioning pulse and causes the register to advance so that it will be responsive to the succeeding $\Phi_1$ pulse. The signal store register, in addition, is arranged to cause information to be read into or stored by the signal store in response to $\Phi_2$ pulses.

Each of these shift registers is represented by two lines of circles representing the various cores or apertures in the magnetic material as shown in the above-identified patents and patent applications. The register is assumed to advance so that the information is transmitted serially down the line of circles in response to the various pulses. Thus, when a bit is read into a signal store, it is read into the first core or aperture portion in the core in response to the $\Phi_2$ pulse as described and then in response to the succeeding $\Phi_1$ pulse information is conveyed to the next core or aperture. The information in all of the cores to which the $\Phi_2$ pulse is applied is similarly conveyed to the next succeeding core which will be respective to the next succeeding $\Phi_1$ pulse. In response to each of the $\Phi_1$ pulses, information at a particular core or aperture at a read out station will be read out and the information at each of these cores or apertures transmitted to the next succeeding core which will be responsive to a $\Phi_2$ pulse. The operation of such shift registers is described in greater detail in the above-identified patents and patent applications which are made part hereof as if fully included herein. As is pointed out in the above-identified patents, direct current may be also applied to the various cores in the manner described therein.

The reading and writing positions of the various registers comprising the stores is also indicated by the arrows, shown in FIGS. 3 and 4, designating the particular cores or apertures at which the reading out of information or the writing in or storing of information takes place under control of the various logic circuits. Each of these shift registers is arranged to store one binary bit of each of the stored binary numbers, codes or words which numbers, codes, or words may be given any desired significance or represent any desired function as will be described.

The program store as shown in FIG. 4 comprises seven such shift registers each arranged in a ring. The program comprises seven bit words and each bit is stored in one of the shift registers. Inasmuch as there are fifty-five program words, each of these shift registers is fifty-five stages long or fifty-five bits long. The registers are read out in parallel so that at each step of the register a seven bit program word is obtained.

The program words and thus the registers are arranged in two groups, an A group comprising three bits and a B group comprising the remaining four bits of each of the program words. The A group of bits define the particular type of operation to be performed while the B group specifies a number or the number of operations or steps to be taken under certain conditions. These A groups of bits and the orders defined by them are shown in the attached Table A:

TABLE A

| "A" Codes | $7-V_1$ | |
|---|---|---|
| A 000 | ------- | Advance Program B+1 Steps. |
| B 001 | ------- | Match Store to B: Step if M; Skip if M'. |
| C 010 | ------- | Step Store, Match to B: Step if M'; Skip if M. |
| D 011 | ------- | Step Store, Match to B: Step if M; Skip if M'. |
| E 100 | 0 | Step Store, Match to B: Step if M; Peg if M'. |
| F 100 | 1 | Step Store, Match to B: Step if M'; Peg if M. |
| G 101 | 0 | Or B with Store: 1, Reset Zero'd Bit in B, Step; 0, Set Zero'd Bit in B, Skip. |
| H 101 | 1 | Advance Store B+1 Steps, if (1111)' then write (1100), Peg. |
| I 110 | ------- | Direct "B" Code. |
| J 111 | ------- | Peg "B" Code. |

As shown in Table A, the A group of bits does not in all cases completely specify the operation to be performed; specifically, order of the type E and type F require consideration of the $7-V_1$ flip-flop state for their characterization, as do the type G and type H orders, as will be more fully described herein. The last two orders of the A group are designated I and J. These orders are also special in that the B group of bits define particular operations. The I orders are called Direct B codes and are shown in the following Table B:

TABLE B

| Direct "B" Codes | |
|---|---|
| 1 0000 | Gate Send Lead to Addressed Pulser; Step. |
| 2 0001 | Gate C (scan) to WXYZ; Step. |
| 3 0010 | Gate WXYZ to C; Step. |
| 4 0100 | Advance Store to (0000)'; Step. |
| 5 0101 | Advance Store to (1111): if W=1, Write "0" at D; Step; if X=1, Write "1" at E&F; Step. |
| 6 0110 | Advance Store to (1101): if (1111) Encountered, Peg; if not, Step. |
| 7 1000 | Match Store to (0000): Step if M; Peg if M'. |
| 8 1001 | Match Store to (1010): Step if M; reset C (scan) Peg and Step Store if M'. |
| 10 1100 | Step Store: if $(C_3C_2C_0'+C_3C_2C_1)$, Set W; Step; if $(C_3C_2C_0'+C_3C_2C_1)'$, Set X; Step. |
| 11 1101 | Write (1000) in Store; Step Store, Write (1010); Step Store, Write (1100); Skip. |
| 12 1110 | Step Store, Read $C_3$: 1, Set U=1; Skip; 0, Step. |
| 13 1111 | Write "0" at H,J,K&L, Write (0100) in Store; Continuously Step Store and write (1101) until (1111) encountered; signal converter control (Scc); Step. |

The J orders relate to a different type of B code called "Peg B" codes which are shown in the following Table C:

TABLE C

| Peg "B" Codes | |
|---|---|
| 14 0000 | Reset ($V^1$, WXYZ&R); Advance Store to (1111); Step Store, Gate C (ADDR) to R; Step Store, Gate T to C if S=1; Step. |
| 15 0001 | Set $V_1$, Reset (WXYZ&R); Step Store, Gate T to C if S=1; Step. |
| 16 0010 | Match Store to (–000): Step if M'; Peg if M. |
| 17 0100 | Read U: 1, Reset U; Peg; 0, Step. |
| 18 1000 | Write (1000) in Store; Step. |

In the above tables the word "step" refers to stepping the program register one step so that the next order word will be read out of the program store. The word "skip" indicates that the program store is stepped two spaces or two words so that the word next immediately following the word which has been read out will be skipped. The word "peg" means that the program store will be stepped the required number of steps until the number 111 is read out of the A field from the program store.

The orders stored in the program register comprise seven bit words dividea into an A portion having three bits and a B portion having four bits, as pointed out above. The orders are divided into three programs, the program A, the program B and the program C. As will be more apparent, the program A is provided for control and the sending or transmitting of pulses from the system, the program B is provided for control and for shifting the pulses or dialed information from the one portion of the storage register to another, while the program C is employed for control and to translate or obtain additional information from at least certain of the received digits. These three programs of the various orders are shown in the following Table D:

TABLE D.—PROGRAM STORE

| Program A | | A Field | B Field | Remarks |
|---|---|---|---|---|
| No. | Code | | | |
| 1 | J-14 | 111 | 0000 | Initialize next Converter Register Reset $V_1$; Scan. |
| 2 | C-8 | 010 | 1000 | Check code slot for Send code. |
| 3 | A-2 | 000 | 0010 | Advance program 3 Steps. |
| 4 | I-4 | 110 | 0100 | Advance Store to first occupied digit slot. |
| 5 | B-13 | 001 | 1101 | Check digit slot for Not Received code. |
| 6 | A-12 | 000 | 1100 | Advance program 13 Steps. |
| 7 | I-1 | 110 | 0000 | Send one pulse through designated converter. |
| 8 | G-14 | 101 | 1110 | Read and change $C_0$ Bit; carry if previously 0. |
| 9 | A-6 | 000 | 0110 | Advance program 7 Steps. |
| 10 | G-13 | 101 | 1101 | Read and change $C_1$ Bit; carry if previously 0. |
| 11 | A-7 | 000 | 0111 | Advance program 8 Steps. |
| 12 | G-11 | 101 | 1011 | Read and change $C_2$ Bit; carry if previously 0. |
| 13 | A-5 | 000 | 0101 | Advance program 6 Steps. |
| 14 | G-7 | 101 | 0111 | Read and change $C_3$ Bit. |
| 15 | A-3 | 000 | 0011 | Advance program 4 Steps. |
| 16 | I-7 | 110 | 1000 | Check digit slot for 0000. |
| 17 | I-10 | 110 | 1100 | Examine next slot: Set W if End or Synchronous code; otherwise Set X. |
| 18 | I-5 | 110 | 0101 | Write 1 at E and F if X; Write 0 at D if W. |

TABLE D.—PROGRAM STORE

| Program B | | A Field | B Field | Remarks |
|---|---|---|---|---|
| No. | Code | | | |
| 19 | J-14 | 111 | 0000 | Initialize next Converter Register Reset $V_1$; Scan. |
| 20 | B-0 | 001 | 0000 | Check scan slot for waiting digit. |
| 21 | A-4 | 000 | 0100 | Advance program 5 Steps. |
| 22 | I-2 | 110 | 0001 | Copy digit in scan slot into WXYZ. |
| 23 | I-8 | 110 | 1001 | Check digit in scan slot for Zero code. |
| 24 | E-4 | 100 | 0100 | Check code slot for Idle code. |
| 25 | I-11 | 110 | 1101 | Prepare digit slots for sending operator code. |
| 26 | I-12 | 110 | 1110 | Set U if $C_3$=1 in code slot. |
| 27 | A-9 | 000 | 1001 | Advance program 10 Steps. |
| 28 | J-16 | 111 | 0010 | Check code slot for Send code or reset pending code. |
| 29 | G-14 | 101 | 1110 | Read and change $C_0$ bit; carry if previously 0. |
| 30 | A-3 | 000 | 0011 | Advance program 4 Steps. |
| 31 | G-13 | 101 | 1101 | Read and change $C_1$ bit; carry if previously 0. |
| 32 | A-1 | 000 | 0001 | Advance program 2 Steps. |
| 33 | G-11 | 101 | 1011 | Read and change $C_2$ bit. |

TABLE D.—PROGRAM STORE—Continued

| Program B | | A Field | B Field | Remarks |
|---|---|---|---|---|
| No. | Code | | | |
| 34 | J-17 | 111 | 0100 | Check for U' to see if digit must be transferred. |
| 35 | I-6 | 110 | 0110 | Advance store to next available digit slot. |
| 36 | I-3 | 110 | 0010 | Gate digit on WXYZ into digit slot. |

TABLE D.—PROGRAM STORE

| Program C | | A Field | B Field | Remarks |
|---|---|---|---|---|
| No. | Code | | | |
| 37 | J-15 | 111 | 0001 | Initialize next Converter Register Set $V_1$; Scan. |
| 38 | F-1 | 100 | 0001 | Check code slot for $d_3$ Received. |
| 39 | B-0 | 001 | 0000 | Check code slot for Reset Pending. |
| 40 | I-13 | 110 | 1111 | Restore entire Converter Register to idle condition. |
| 41 | A-14 | 000 | 1110 | Advance program 15 Steps. |
| 42 | J-18 | 111 | 1000 | Write Send in code slot. |
| 43 | C-1 | 010 | 0001 | Examine first digit for possible "1". |
| 44 | A-7 | 000 | 0111 | Advance program 8 Steps. |
| 45 | C-1 | 010 | 0001 | Examine second digit for possible "1". |
| 46 | A-5 | 000 | 0101 | Advance program 6 Steps. |
| 47 | D-8 | 011 | 1000 | Examine third Digit for Possible "8". |
| 48 | H-2 | 101 | 0010 | Advance store 3 Steps; write End code. |
| 49 | B-9 | 001 | 1001 | Examine third digit for possible "9". |
| 50 | H-1 | 101 | 0001 | Advance store 2 Steps; write End code. |
| 51 | H-0 | 101 | 0000 | Advance store 1 Step; write End code. |
| 52 | C-1 | 010 | 0001 | Examine second or third digit for possible "1". |
| 53 | B-10 | 001 | 1010 | Examine second or third digit for possible "0". |
| 54 | H-8 | 101 | 1000 | Advance store 9 Steps; write End code if not Synchronous slot. |
| 55 | H-5 | 101 | 1001 | Advance store 6 Steps; write End code. |

In the exemplary embodiment of our invention described herein the signal store comprises four shift registers since the information stored in this register is in the form of four bit words. These registers are divided up into converter register spaces having fifteen words per converter. Thus, if there are to be ten converters then each of the shift registers will have 10×15 or a 150-bit storage capacity. Four of these shift registers are provided for the signal store and thus provide an individual storage space for each of the ten converters.

As explained above, the program shift registers are arranged in a closed loop so that the information once stored therein is continually circulated by operation of the system. No regeneration stage or amplifiers are provided or usually required to regenerate the information in shift registers of this type because the character of the stored bit is repeatedly regenerated and rewritten first in one position and then in another in the respective cores or about the respective apertures in the magnetic material. The signal store shift registers as shown in FIG. 3 are arranged in an open chain so that the information is read in or stored at one end and received out at the other end. If it is desired to recirculate the information, then it must be recorded or restored at the beginning of the chain.

The first four words in each converter space or register in the store register comprise control information. The first is called a synchronizing word which is 1111; the second is the address of the converter to properly identify this converter. The information stored herein will be the number or address of this register in binary form. The next or third word is designated "scan" which is employed to temporarily store any received digit until this information can be properly stored in the proper place in the converter register space. The fourth word is called a code word which is used to designate the state of the register and the state of progress of the information in the register.

The last eleven words or word spaces in each of the converter register spaces in the signal store are employed to store in binary form the particular digits transmitted by the subscriber by means of his calling equipment or pushbuttons.

The various codes stored in the code space in the converter register space in the store is shown by the following Table E:

TABLE E.—TYPICAL CONVERTER REGISTER SPACE, OF FIFTEEN 4-BIT SLOTS, IN SIGNAL STORE

| No. and "Name" of Slot | Possible Binary Values in Each Slot | Meaning of Binary Codes in Each Slot |
|---|---|---|
| 1 Synchronous | 1111 | Beginning of a converter register space. |
| 2 Address | 0001 through 1010 | Number designation of the converter being served. |
| 3 Scan | 0000 and 0001 through 1010. | Value of digit just received, but not yet properly placed within register space. |
| | 1110 | |
| | 1101 | |
| | 1100 | Interval counts used for measuring of cycles during interdigital timing. |
| | 1011 | |
| | 1010 | |
| | 1001 | |
| 4 Code | 1000 | "Send" code. |
| | 0100 | "Idle" code. |
| | 0011 | First digit received. |
| | 0010 | Second digit received. |
| | 0001 | Third digit received. |
| | 0000 | "Reset Pending" code. |
| | 0000 | Digit has been sent. |
| | 0001 through 1010 | Either value of digit, or untransmitted portion of digit currently being sent. |
| 5 through 15 Digit | 1101 | No digit received yet for this portion of called number. |
| | 1100 | "End of transmission" code. |

FIGS. 5, 6, 7, 8, 9 and 10 show the common logic circuits 216 in detail. The connections of various gates are clearly indicated in these figures.

When desired suitable amplifiers, decoupling and gate circuits may be provided between the various gates and flip-flops as is well understood. These amplifiers may include vacuum tubes but preferably will employ transistors and various clamping, control and Zener diodes and related circuits.

Figure 11:
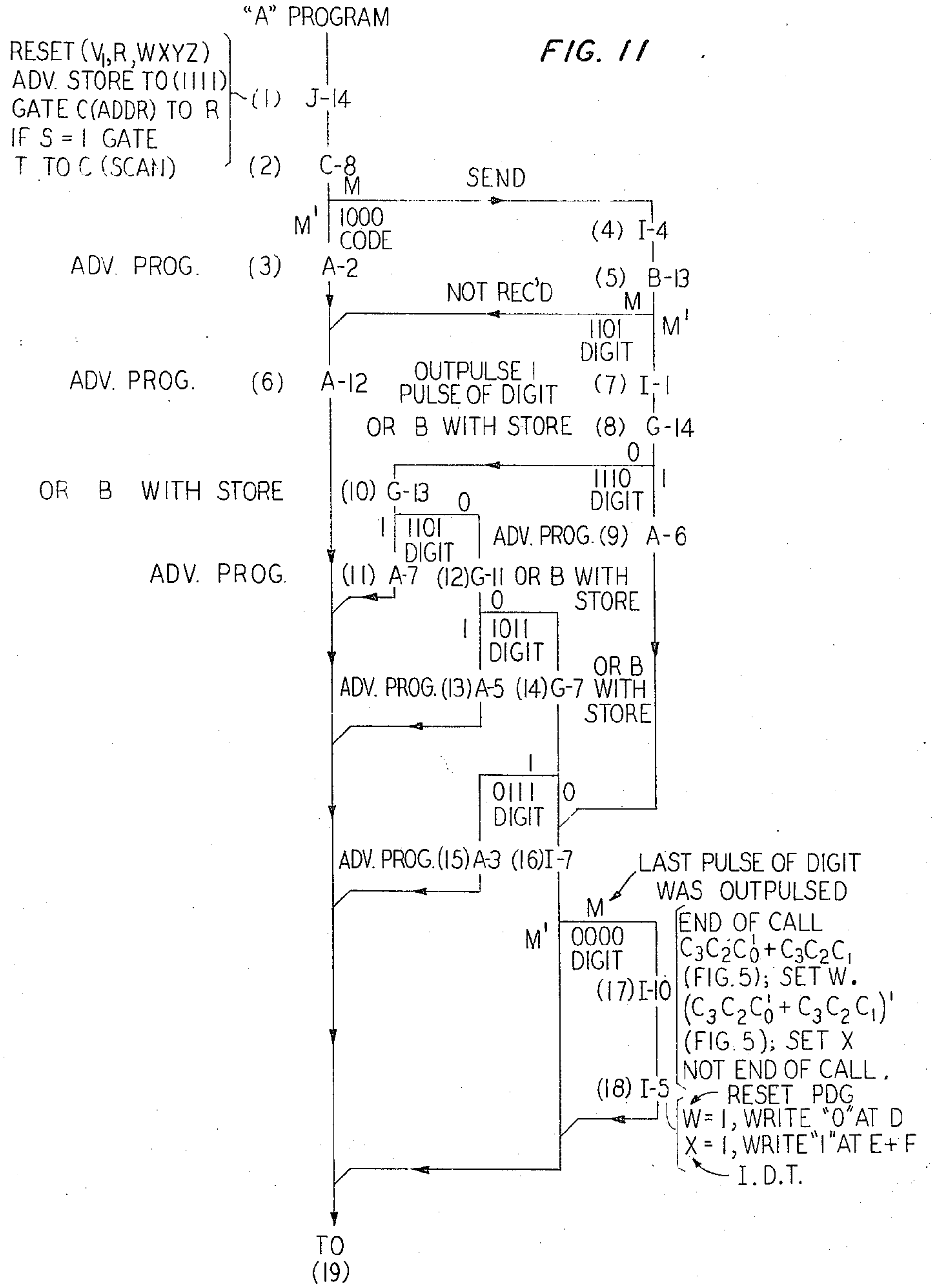
FIG. 11 shows a sequence chart of the operation of the system in accordance with a stored program A.
Figure 12:
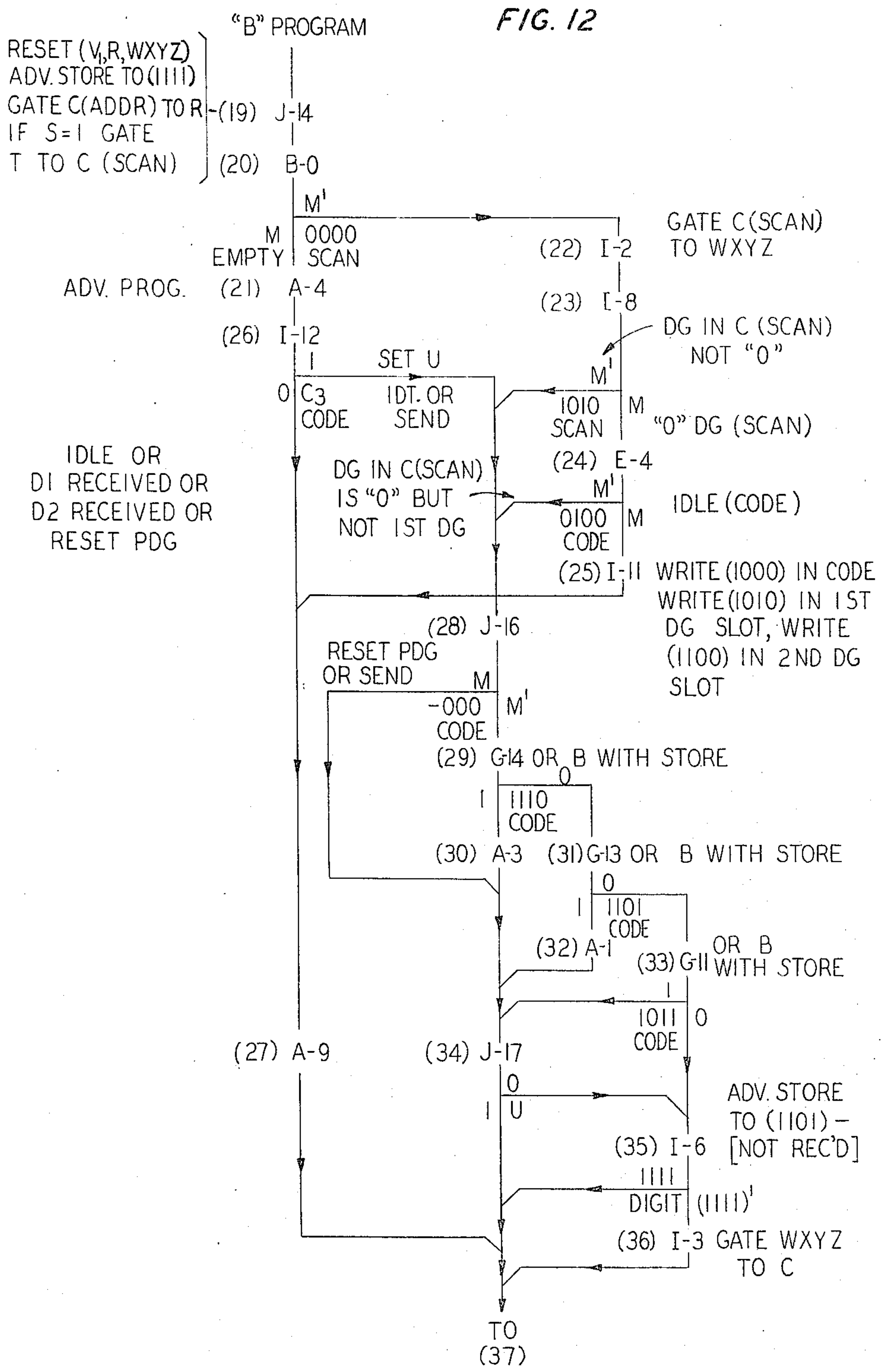
FIG. 12 shows a sequence chart of the operation of the system in accordance with the stored program B.
Figure 13:
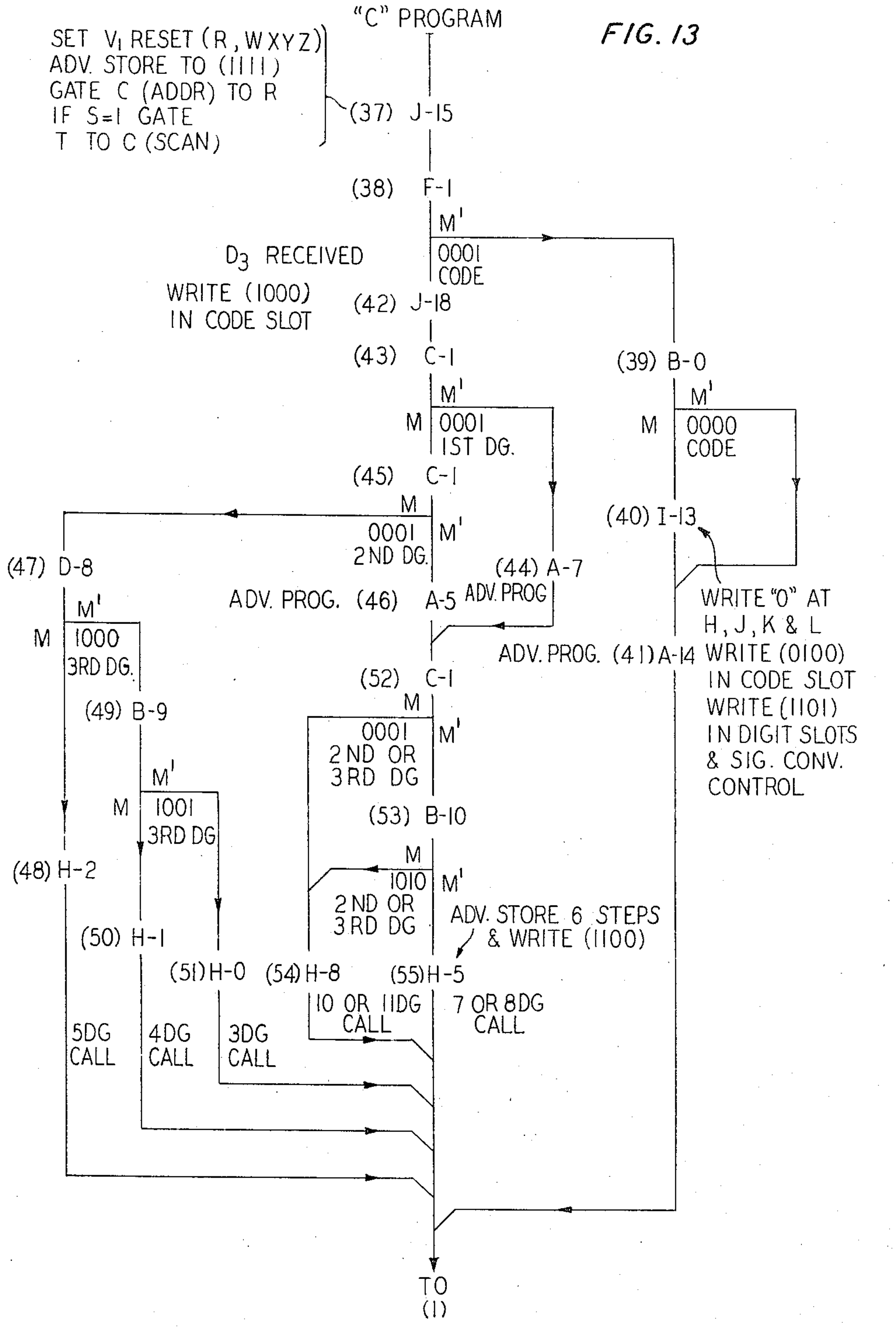
FIG. 13 shows a sequence chart of the operation of the system in accordance with stored program C.

FIG. 11 shows a sequence chart of the various orders of the A program and the manner in which the control of the system is transferred from each order to different ones of the following orders in the program. FIG. 12 shows a similar sequence chart for program B and FIG. 13 shows a similar chart for program C.

In order to facilitate the description and understanding of our invention the operation of an exemplary system will first be described when the system is idle, that is when no calls are being originated, dialed, or established through the switching equipment.

The system is controlled by means of a pulse generator frequently called a clock circuit. This clock circuit 310, see FIGS. 3 and 10, in the exemplary embodiment of this invention described herein is actuated by a 80 kc. multivibrator 1010. This multivibrator 1010 causes a pulse to be emitted each time it is in its "1" state. When the multivibrator is in its "0" state, no pulse is emitted by the clock circuit 310. The 80 kc. multivibrator 1010 drives the binary counter stage 10–$BC_1$. The binary counter 10–$BC_1$ in turn drives binary counter circuits 10–$BC_2$ and 10–$BC_3$. The multivibrator circuit 1010 as well as the binary counter stages may be of any suitable type such as described in the Military Standard Handbook, MIL–HDBK–215, June 1960, such as shown in Sections 6–13, 6–15, 6–17, 7–9, 7–10, 7–11, 7–12. Both the 0 and 1 outputs of the three binary stages as well as the 1 output from the 80 kc. multivibrator 1010 are connected to eight And circuits as shown in FIG. 10 in such a way that during each time the 80 kc. multivibrator is in its "1" state the pulse will be obtained from a different one of the eight different And circuits in succession and thereafter the above cycle is repeated. In other words, a $\Phi_1$ pulse is obtained followed in turn by a $\Phi_a$, $\Phi_b$, and $\Phi_c$. Next a $\Phi_2$ pulse is obtained followed by pulses $\Phi_d$, $\Phi_e$, and $\Phi_f$. Thereafter a $\Phi_1$ pulse will be obtained again followed by the other pulses in succession. These pulses are used to control the operation of the various circuits described herein in combination with the order words stored in the program store of FIG. 4 and the information stored signal store of FIG. 3 described above.

$\Phi_1$ and $\Phi_2$ outputs from the clock circuit 1010 extend through a set of four And gates 3–*a*, 3–*b*, 4–*c* and 4–*d*. These gates are controlled by the 10–$\Phi$ flip-flop. With the 10–$\Phi$ flip-flop in its "0" state And gates 3–*a* and 3–*b* are activated so that they will pass the $\Phi_1$ and $\Phi_2$ pulses. The output of the And gates 3–*a* and 3–*b* extend through amplifiers 311, 312, 313 and 314 to the store shift register shown in FIG. 3 so that when the 10–$\Phi$ flip-flop is in its "0" state the store shift register is advanced one step during each complete cycle of the clock circuit.

When the 10–$\Phi$ flip-flop is in its "1" state then gates 4–*c* and 4–*d* are activated and gates 3–*a* and 3–*b* are not activated. As a result the $\Phi_1$ and $\Phi_2$ pulses are now transmitted through these gates 4–*c* and 4–*d* and amplifiers 411, 412, 413 and 414 to the program shift register shown in FIG. 4. Thus when the $\Phi$ flip-flop is in its "1" state the program shift register is advanced one step during each complete cycle of the clock circuit.

In addition to the various And gates described, a plurality of flip-flops are employed to temporarily store information obtained either from the store shift register of FIG. 3 or the program shift register of FIG. 4. An address register comprising flip-flops 8–R0, 8–R1, 8–R2 and 8–R3 are provided to store the address of the converter and converter register which are being processed by the control circuits at any given instant of time. The C flip-flops 5–$C_0$, 5–$C_1$, 5–$C_2$ and 5–$C_3$ are provided to store the information read out of the store register from the various stages or steps of this register. Likewise, a program register comprising the A flip-flops 5–$A_0$, 5–$A_1$, and 5–$A_2$ are employed to temporarily store the A portion of the order while it is being executed and the B flip-flops 5–$B_0$, 5–$B_1$, 5–$B_2$ and 5–$B_3$ are employed to store the B portion of the same order while this order is being executed. The additional register circuit WXYZ comprises flip-flops 6–W, 6–X, 6–Y and 6–Z. A group of additional flip-flops 7–I, 7–II, 7–III, 7–IV, 7–V, 7–VI and 7–U and 7–$V_1$ are provided to cooperate with the various flip-flops and And circuits to control the operation of the system. In addition a 7–J flip-flop is provided for controlling the binary counter 710 which is separate and distinct from the binary counter in the clock circuit 310 and comprises the binary counter stages 7–$BC_1$, 7–$BC_2$, 7–$BC_3$ and 7–$BC_4$.

The designation of the various input and outputs from the flip-flops and various gate circuits shown in the drawing is in accordance with the usual Boolean algebra notation. Thus the two outputs from the 5–$A_0$ flip-flop are designated 5–$A_0$ and 5–$A'_0$. When the flip-flop is in its zero state, an output assumed to be positive, will be obtained from the 5–$A'_0$ output and when the flip-flop is in its "1" state an output, assumed to be positive, will be obtained from its 5–$A_0$ output. Inverters cause a given output to be inverted and change from the direct output to the prime or from the prime to the direct output.

In an effort to simplify the drawing, the various input and output conductors from the various gate circuits and flip-flops have not been connected up. Each of the conductors is designated indicating the particular places they are interconnected with. Furthermore, the various isolating diodes or circuits and amplifiers which may be required where the outputs extend to many inputs are not shown in the drawing. It is assumed that such decoupling circuits, Or circuits, and amplifiers are well known and operate in their usual manner and are provided when required.

The various flip-flops are all assumed to be in their "0" state at the beginning of a given order and will be restored to their "0" state or else in the case of various register flip-flops reset by the succeeding order when it is read out. However, the flip-flops 7–I through 7–VI, 7–U and 7–$V_1$ are all assumed to be in their "0" state at the beginning of operation and are returned to their "0" state, as will be described.

Assume now that the program of orders shown in Table D has been entered in the program shift registers in a convenient way from cards or manual keys or in any other suitable manner. Also assume that at the beginning of each converter register the synchronizing symbol of 1111 has been entered the first or synchronizing slot and in the next succeeding word slot in each converter register the number or address of the respective register has been entered. It is also assumed that 0000 has been entered in the scan or third word position and in each of the converter registers and that the idle symbol 0100 has been entered in the code slot or word position in each of the converter register spaces. Also assume that the digit not received code 1101 is entered in the digit storage spaces or slots in all of the storage registers. The manner in which the above codes are entered in all but the first two slots is described in detail hereinafter.

Assume now that the 10–Φ flip-flop has been previously operated to its "1" state and that the program register has been advanced so that the first order J–14 of the A program is read out. The manner in which the 10–Φ flip-flop is operated to its "1" state is described below. With this flip-flop in its "1" state the program register is advanced as described above. Upon the transmission of one of the $\Phi_1$ pulses to this register the register will be advanced to the first order word and this, in turn, read out. As is well understood, each order as it is advanced to the reading position is read out and made available for use of the circuits in the manner described herein.

Figure 5:
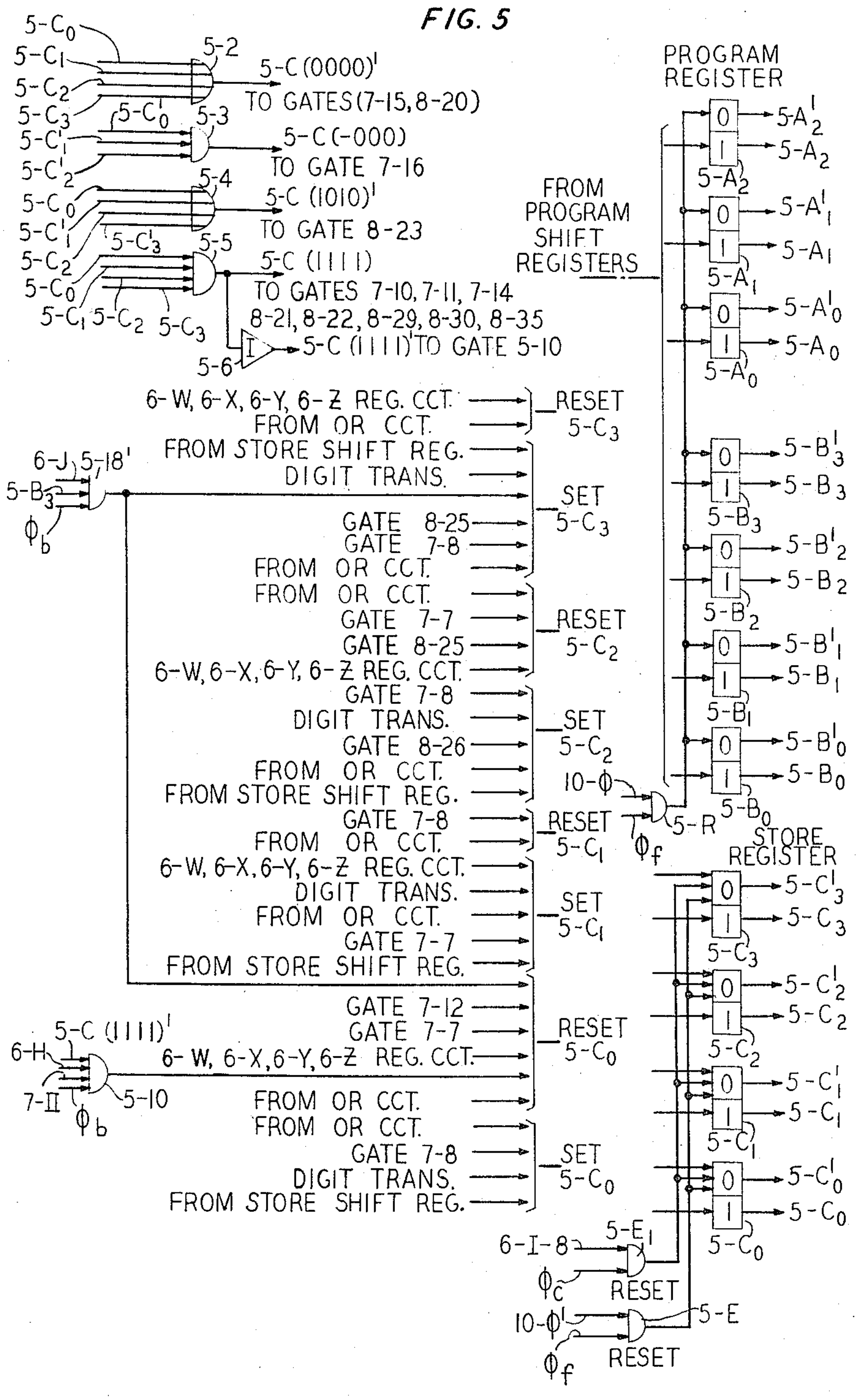
FIGS. 5, 6, 7, 8, 9 and 10 show circuit details of the various control circuits of our invention.
Figure 6:
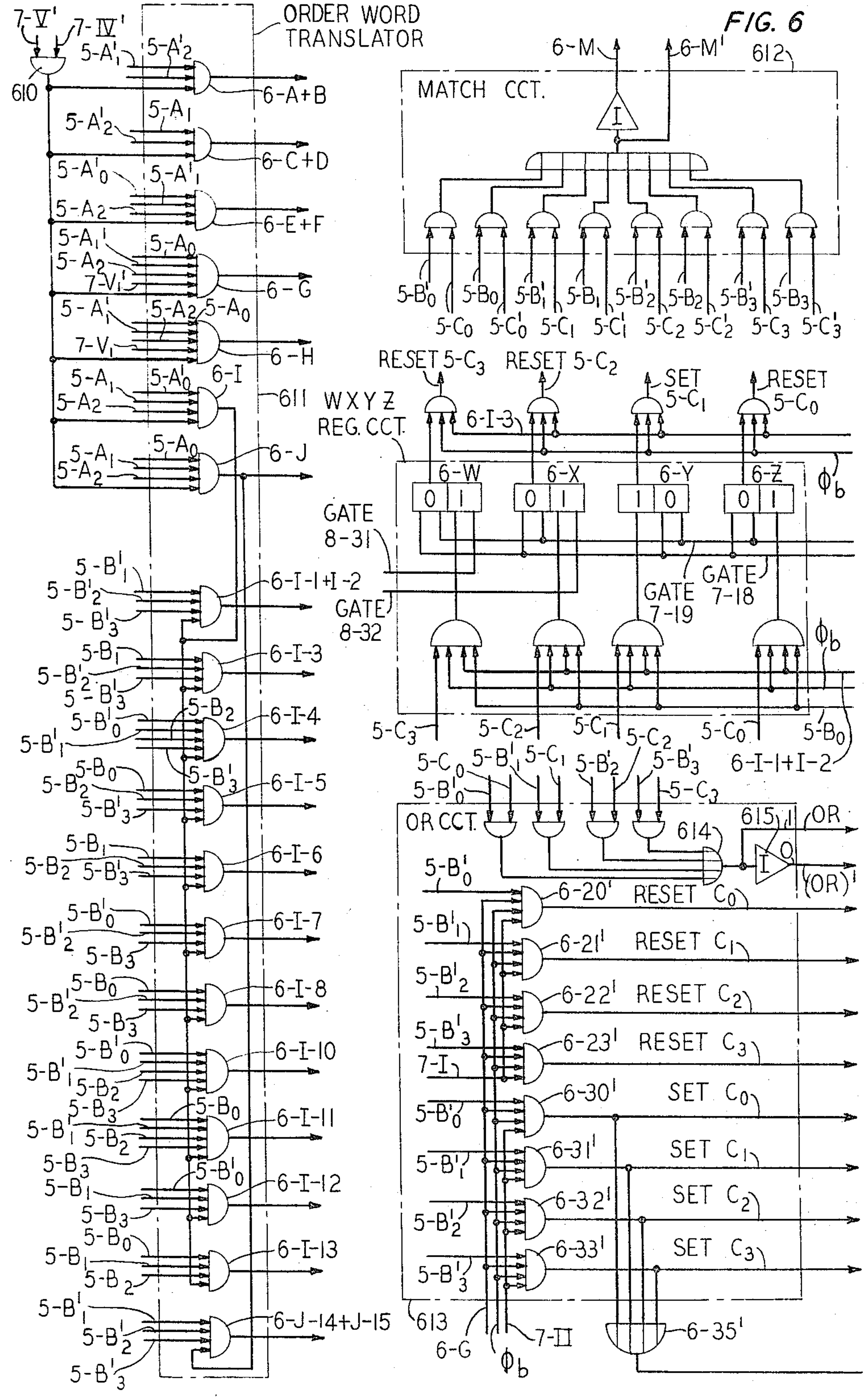
Figure 7:
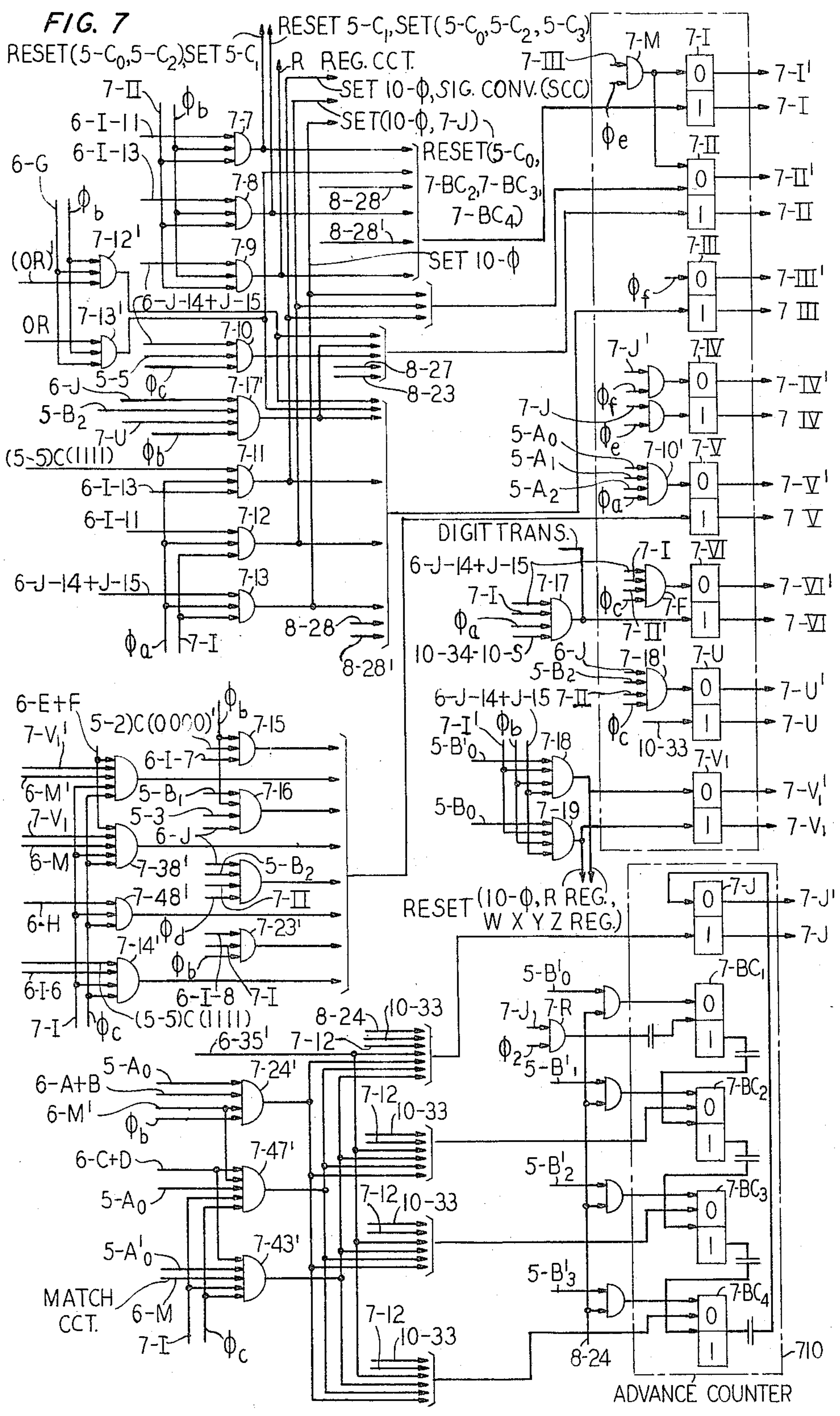
Figure 8:
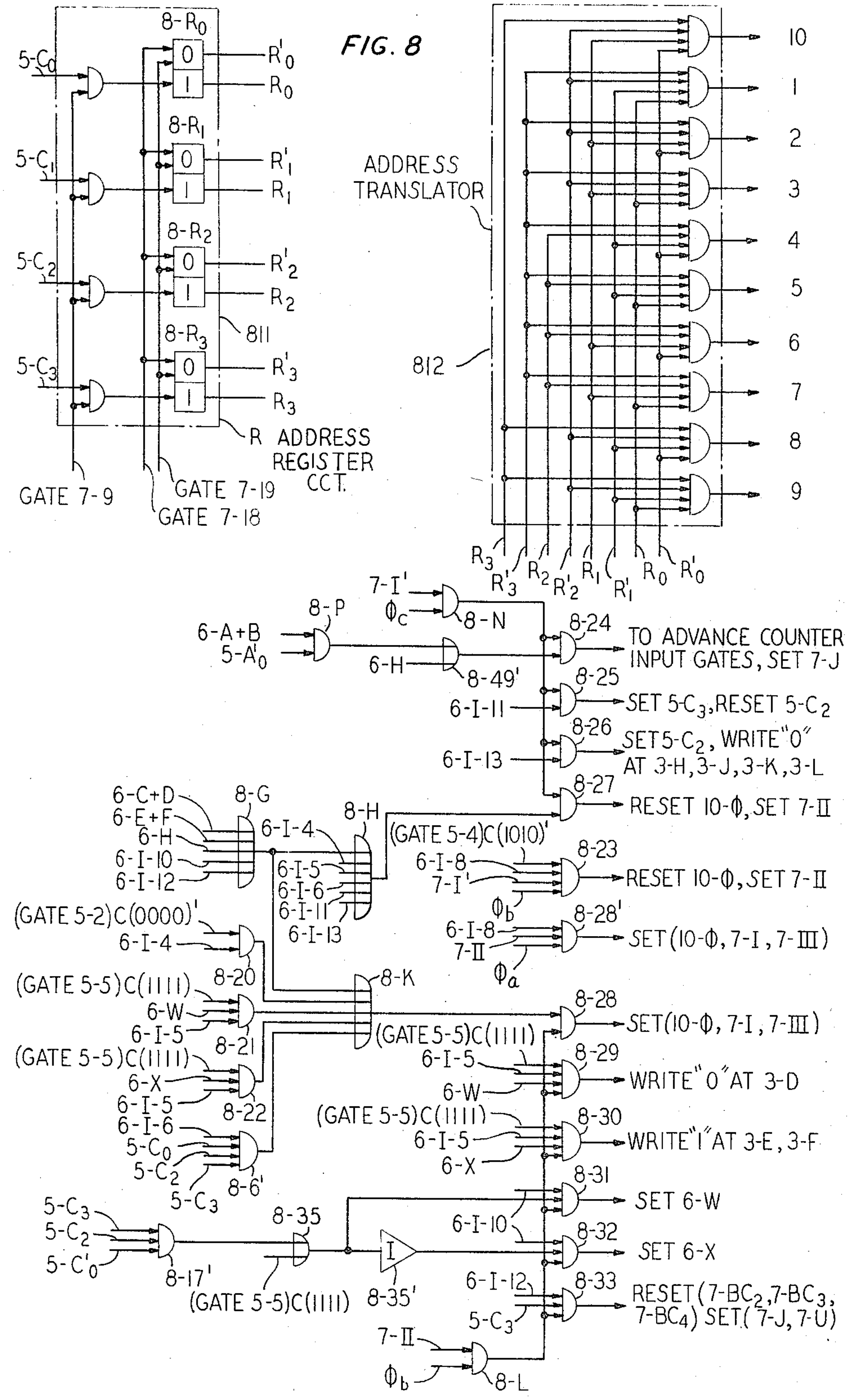
Figure 9:
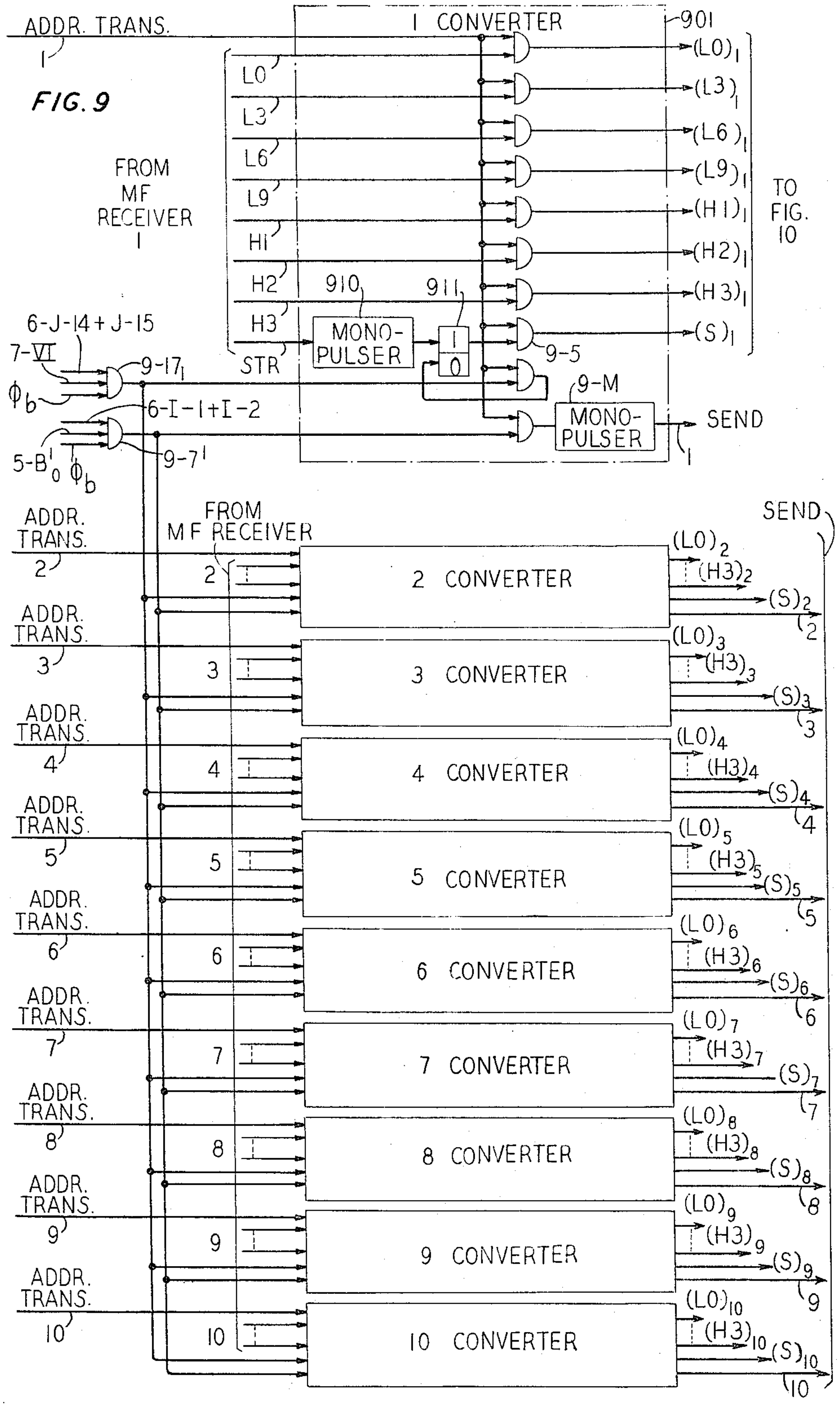

When this first order is read out, it will be entered upon the program register flip-flops which were previously reset as will presently appear. Thus at this time a "1" will be entered on the flip-flops 5–$A_0$, 5–$A_1$ and 5–$A_2$ while zeros will be entered upon the flip-flops 5–$B_0$, 5–$B_1$, 5–$B_2$ and 5–$B_3$ (FIG. 5). As a result the "1" output of the three A flip-flops are connected to the 6–J And circuit (FIG. 6) so that, a pulse is obtained from this And circuit at this time since as described above both the 7–IV and 7–V flip-flops were in their "0" state so a positive output is obtained from their 7–IV′ and 7–V′ conductors or terminals which in turn activates the first seven And circuits of the order word translator 611. The output from the 6–J And circuit in the order word translator 611 extends to various gate circuits as will be described herein. It also extends to the 6–J–14+J–15 And circuit. This And circuit has inputs from the 5–$B'_1$ and 5–$B'_2$ and 5–$B'_3$ program register flip-flops. Consequently these three flip-flops must be in their "0" state. The 5–$B_0$ flip-flop can be either in its "1" or "0" state. This flip-flop 5–$B_0$ will be in its "0" state in response to the J–14 order and its "1" state in response to the J–15 order. Consequently in response to the J–14 order an output will be obtained both from the 6–J And circuit of the order word circuit 611 and from the 6–J–14+J–15 And cirruit. After the $\Phi_1$ pulse has been obtained, the clock circuit 310 will generate and transmit a $\Phi_a$ pulse. The $\Phi_a$ pulse together with the outputs from the 5–$A_0$, 5–$A_1$, and 5–$A_2$ flip-flops, which are in their "1" states in response to this order as described above, cause an output to be obtained from the And circuit 7–10′ and this output in turn insures that flip-flop 7–V is restored to its "0" state at this time.

Then at a later time a $\Phi_b$ pulse is generated. This pulse is transmitted to the And circuits 7–18 and 7–19. Like wise the output of the And circuit 6–J–14+J–15 is transmitted to this And circuit as the 7–I′ output from the 7–I flip-flop is transmitted to these And circuits. Since the 5–$B_0$ flip-flop will be in its "0" state for the J–14 order, a positive output is obtained on the 5–$B'_0$ conductor extending to the And circuit 7–18. Thus when the $\Phi_b$ pulse is transmitted, this And circuit transmits a pulse which insures that the 7–$V_1$ flip-flop is reset to its "0" state.

The output of the And circuit 7–18 also extends to one of the reset inputs of the address register flip-flops 8–R0, 8–R1, 8–R2, and 8–R3. The output of this And circuit also extends to one of the rest inputs of the 6–W, 6–X, 6–Y, and 6–Z flip-flops thus causing these flip-flops to be reset to their "0" state.

The output of the And circuit 7–18 also extends to the reset input of the 10–Φ flip-flops thus causing this flip-flop to be reset in its "0" state. As a result, so long as this flip-flop remains in its "0" state the program register is not stepped. The J–14 order remains on the order word register flip-flops. Instead, the next $\Phi_2$ pulse as well as the succeeding $\Phi_1$ and $\Phi_2$ pulses will be transmitted to the store shift registers and cause them to advance and read out the information in the various registers in this store. The flip-flops 5–$C_0$ through 5–$C_3$ will normally have stored on them the last word read out of the signal store at this time. Consequently when the first $\Phi_2$ pulse is received after flip-flop 10–Φ is reset, the word entered upon these C flip-flops will be stored in the signal store by the And gates 3–0, 3–1, 3–2, and 3–3. If no information is stored on these flip-flops then 0's will be entered in the signal store at this time. No information is read out at this time because information is read out only on the transmission of the $\Phi_1$ pulse. The system does not respond to the succeeding $\Phi_d$ and $\Phi_e$ pulses. Upon the reception of the $\Phi_f$ pulse, the store register flip-flops 5–$C_0$, 5–$C_1$, 5–$C_2$ and 5–$C_3$ are restored to their "0" state since the 10–Φ flip-flop is also in its "0" state. Consequently, the reset pulse is obtained from the And gate 5–E and transmitted to the reset input terminals of these C flip-flops thus restoring this register to its "0" state in preparation for receiving another word read out from the succeeding word or slot space in the converter register in the store. When the next succeeding $\Phi_1$ pulse is transmitted from the clock circuit 310 it will be transmitted to the store shift register and cause the next word in the converter register to be read out and entered upon the store register flip-flops 5–$C_0$, 5–$C_1$, 5–$C_2$ and 5–$C_3$. When the succeeding $\Phi_2$ pulse is generated, the store will again be advanced and since the C registers are set in accordance with the information read out of the last position in the store register, And circuits 3–0, 3–1, 3–2, and 3–3 will transmit pulses in accordance with the settings of these C flip-flops through the write amplifiers and cause the same information to be read back into the first cores or stage of the store shift register. The succeeding pulses $\Phi_d$ and $\Phi_e$ from the clock circuit during this cycle and succeeding cycles are ineffective. The following $\Phi_f$ pulse again causes store register flip-flops 5–$C_0$ through 5–$C_3$ to again be reset to "0" in preparation for reading out the next word from the store registers.

Each $\Phi_1$ pulse causes the store shift registers to advance and read out a word from the particular converter register. The succeeding $\Phi_2$ pulse then causes this same word to be read back into the first stage of the shift register thus regenerating all of the information in the particular storage space for the converter register being read out.

Each succeeding $\Phi_f$ pulse similarly sets the store register flip-flops 5–$C_0$ through 5–$C_3$ back to zero.

This action continues until the first word in the next converter register is read out. The first word is the synchronizing word or code and comprises 1111. When the C register is thus set in response to 1111 with all the flip-flops 5–$C_0$ through 5–$C_3$ in their "1" state, positive output will be obtained from the And circuit 5—5 which is transmitter to a number of the gate circuits and in particular to gate circuit 7–10. This gate circuit has an input from the 6–J–14+J–15 And circuit of the order word translator with the result that upon the transmission of the $\Phi_c$ pulse from the clock circuit flip-flop 7–II is set in its "1" state. The next $\Phi_2$ pulse will again advance the store shift registers and cause this 1111 synchronous signal or word to be read back into the first stage of the store register.

Upon the reception of the next $\Phi_1$ pulse from the clock circuit, the address word or number of the No. 1 converter, for example, will be read out of the second slot in the converter space and entered upon the store register flip-flops 5–$C_0$ through 5–$C_3$ in the usual manner. At this time flip-flop 7–II is set in its "1" state. Consequently, when the $\Phi_b$ pulse is received all of the inputs to gate 7–9 will be positive. These inputs include the positive voltage input from the order word gate 6–J–14+J–15 since the program register flip-flops are still set in accordance with the J–14 word. A positive voltage will be obtained from the "1" output from the 7–II flip-flop and a positive pulse will be obtained at time $\Phi_b$. These are all of the inputs to the And circuit 7–9. Consequently, an output is obtained from this And circuit which sets the 7–I flip-flop in its "1" state. Also a positive voltage is obtained from this And circuit and applied to each of the gate circuits in the 8–R register circuit thus causing the setting of the 5–C flip-flops 5–$C_0$ through 5–$C_3$ to be transferred to the register circuit flip-flops 8–R0 through 8–R3. These flip-flops are now set in accordance with the address in the No. 1 register assigned to the No. 1 converter storage space. At the termination of this $\Phi_b$ pulse these gates are deactivated. However, now both the store register flip-flops 5–$C_0$ through 5–$C_3$ and the 8–R register flip-flops 8–$R_0$ through 8–$R_3$ are set in accordance with the number or address of the No. 1 converter register.

The circuits do not respond to the next succeeding $\Phi_c$ pulse. The subsequent $\Phi_2$ pulse causes the setting of the 5–$C_0$ through 5–$C_3$ flip-flops to be read back into the signal store and the store shift register to advance. The $\Phi_d$ and $\Phi_e$ pulses do not cause further operation of the circuit. The $\Phi_f$ pulse again causes the C flip-flop to be restored to their "0" state.

The next succeeding $\Phi_1$ pulse causes the store registers to be advanced and the next word read out which will be the scan word and under assumed conditions in 0000. This word is entered upon the C register flip-flops in the manner described above. On the generation of the succeeding $\Phi_a$ pulse all of the inputs to the And circuit 7–13 are positive so that an output pulse is obtained from this And circuit which causes the 7–III flip-flop to be set in its "1" state, flip-flop 7–II to be set to its "0" state, and flip-flop 10–Φ to be set in its "1" state. Assume that no signals are being received from the multifrequency receiver at this time indicating that no pulses are being received from any subscriber. Consequently, a positive voltage will not be present on the 10S output from gate 10–34 and as a result no positive voltage is obtained from gate 7–17 so flip-flop 7–VI remains in its "0" state. Consequently, the application of $\Phi_c$ pulse to the And circuit 7–F at this time merely maintains this flip-flop in its "0" state.

Since the flip-flop 10–Φ is now in its "1" state where the advance pulses are now being transmitted to the program register, the succeeding $\Phi_2$ pulse is now transmitted to the program register and causes this register to be advanced to its primed state. The succeeding $\Phi_d$ pulse is ineffective. However, the $\Phi_e$ pulse causes flip-flop 7–I to be restored to its "0" state via And circuit 7–M. The following $\Phi_f$ pulse causes flip-flop 7–III to be restored to its "0" state and also causes via And circuit 5–R the program register flip-flops 5–$A_0$ through 5–$A_2$ and 5–$B_0$ through 5–$B_3$ to be reset to their "0" states.

The succeeding $\Phi_1$ pulse will be transmitted to the program register and cause the next or second word to be read out of this register. This is a C–8 order word wherein A is represented by 010, the B portion is represented by 1000. The function of this order is to examine the converter register code slot, for the possible presence of a "Send" code. When this order is read out it is entered on the program register flip-flops 5–$A_0$, 5–$A_1$, 5–$A_2$ and 5–$B_0$ through 5–$B_3$. This order in then translated by the order word translator circuit 611 which causes an output from 6–C+D And circuit since both flip-flops 7–IV and 7–V are in their "0" state and the 5–$A_1$ flip-flop is in its "1" state and the 5–$A_2$ flip-flop is in its "0" state.

The circuits do not respond to the following $\Phi_a$ and $\Phi_b$ pulses. The positive potential from the 6–C+D And circuit is transmitted through the Or circuits 8–G and 8–H to the And circuit 8–27. The other input of the And circuit 8–27 receives positive pulse from And circuit 8–N, since flip-flop 7–I is in its "0" state, when the $\Phi_c$ pulse is generated by the clock circuit. The positive output from And circuit 8–27 sets the 7–II flip-flop in its "1" state and resets the 10–Φ flip-flop to its "0" state. Consequently, the succeeding $\Phi_2$ pulse is transmitted to the store register and advances or primes this register. In addition the $\Phi_2$ pulse causes the setting of the 5–$C_0$ through 5–$C_3$ flip-flops to be read into the signal store.

The succeeding $\Phi_d$ and $\Phi_e$ pulses are ineffective at this time. However, the $\Phi_f$ pulse now causes the C store register flip-flops 5–$C_0$ through 5–$C_3$ to be reset to their "0" states. These flip-flops were previously set in their "0" states in response to the scan information which was all 0's under the assumed conditions so that these flip-flops now remain in their "0" states.

The succeeding $\Phi_1$ pulse from the clock circuit will be transmitted to the store register and cause the fourth word which is the code word to be read out from this register and entered upon the store register C flip-flops 5–$C_0$ through 5–$C_3$. This word is 0100, under the assumed conditions, indicating that the register is idle.

At this time the setting of the C flip-flops is matched by a matching circuit 612 with the setting of the program register flip-flops 5–$B_0$ through 5–$B_3$. As described above, the program register flip-flops 5–$B_0$ through 5–$B_3$ are set in accordance with the code 1000 by the second or C–8 order, while the C flip-flops are set in 0100 in response to the code word received from the converter register in the signal store. These two codes or words do not match so that an output is obtained on the M′ conductor. No such output is obtained from the M conductor. The circuits do not respond to the succeeding $\Phi_a$ pulse but in response to the $\Phi_b$ pulse an output is obtained from And circuit 8–28. A positive voltage is applied to the first input of this And circuit 8–28 through the Or gates 8–G and 8–K from the 6–C+D And circuit of the order word translator while a positive voltage is applied to the second input of And circuit 8–28 from the And circuit 8–L which has positive voltage applied to one of its inputs from the 7–II flip-flop which is in its "1" state, as described above, and to its other input by $\Phi_b$ from the clock circuit. As a result, flip-flops 7–I and 7–III and 10–Φ are set in their "1" states.

As a result, the next $\Phi_2$ pulse is transmitted to the program register which causes this register to be primed or advanced. The circuits do not respond to the succeeding $\Phi_d$ pulse. In response to the following $\Phi_e$ pulse flip-flops 7–I and 7–II are restored to the "0" state due to the positive output from the And circuit 7–M. In response to the succeeding $\Phi_f$ pulse flip-flop 7–III is restored to its "0" state and the program registers 5–$A_0$ through 5–$A_2$ and 5–$B_0$ through 5–$B_3$ are restored to their "0" state by positive output from the And circuit 5–R.

The succeeding $\Phi_1$ pulse causes the next or third order to be read out from the program register. This order comprises 000 in the A field and 0010 in the B field. This order directs the system to advance the program register B+1 steps. Since the B portion of this order is a binary 2, this A order directs the system to advance the program register three steps, that is, to the No. 6 order.

The circuits do not respond to the succeeding $\Phi_a$ and $\Phi_b$ pulses generated by the clock circuit. In response to the succeeding $\Phi_c$ pulse an output will be obtained from the And circuit 8–24. The first input to this And circuit is positive due to an output from And circuit 8–N since the 7–I flip-flop is in its "0" state at this time. An output is also obtained from the And circuit 8–P since a positive output is obtained from the 6–A+B And circuit from the order word translator and since the 5–$A_0$ flip-flop is in its "0" state. As a result, the 7–J flip-flop is set in its "1" state. In addition, the And circuits of the advance counter are activated by the output of And circuit 8–24. Since a binary 2 is recorded on the program register B flip-flops in response to the binary 2 in the B portion of this third order, the binary counter will be set so that it will recycle in response to three pulses transmitted to it. The advance binary counter comprising the counter stages 7–$BC_1$, 7–$BC_2$, 7–$BC_3$ and 7–$BC_4$ is arranged as a binary count-down counter. Thus, the counter stages are normally set in their "1" state. Consequently, when a binary 2 from the B flip-flops of the program register is transferred to this counter, the binary counters stages 7–$BC_1$, 7–$BC_3$ and 7–$BC_4$ are restored to their "0" state while the binary counter stage 7–$BC_2$ remains in its "1" state.

The succeeding $\Phi_2$ pulse in addition to stepping or priming the program register causes the And circuit 7–R to emit a pulse to advance the advance binary counter. This pulse changes the binary counter stage $BC_1$ from 0 to 1 and this, in turn, changes binary counter stage $BC_2$ from 1 to 0.

The circuits do not further respond to the succeeding $\Phi_d$ pulse. With the 7–J flip-flop in its "1" state, the succeeding $\Phi_e$ pulse causes flip-flop 7–IV to be set in its "1" state so that the order word translator 611 does not respond to the succeeding settings of the program register flip-flops. The program register flip-flops 5–$A_0$ through 5–$A_2$ and 5–$B_0$ through 5–$B_3$ are now restored to their "0" state by an output from the 5–R And circuit. The succeeding $\Phi_1$ pulse causes the program register to advance one step and read out the No. 4 order. This order is entered upon the program register flip-flops but is not transmitted to the order word translator because the flip-flop 7–IV is now in its "1" state with the result that no output is obtained from And circuit 610 so the And circuits of the order word translator 611 remain inactive.

The succeeding $\Phi_a$ and $\Phi_b$ and $\Phi_c$ pulses do not further actuate the circuits because there is no output from the order word translator. The succeeding $\Phi_2$ pulse is again transmitted through the 7–R And circuit in addition to priming or advancing the program. As a result, binary counter stage $BC_1$ is now actuated from its "1" to its "0" state. At this time all of the stages of the advance binary counter are now in their "0" state. The succeeding $\Phi_d$ and $\Phi_e$ and $\Phi_f$ pulses from the clock circuit do not actuate any of the circuits. The next $\Phi_1$ pulse advances the program register and the succeeding or No. 5 order will be read out on the program register flip-flops. This order like the No. 4 order is not transmitted to the order word translator since the flip-flop 7–IV is still actuated to its "1" state. The circuits do not further respond to the $\Phi_a$, $\Phi_b$ or $\Phi_c$ pulses from the clock circuit. The succeeding $\Phi_2$ pulse from the clock circuit again causes an output to be obtained from the And circuit 7–R with the result that all of the stages of the advance binary counter are set to their "1" state and an output pulse obtained from a binary counter 7–$BC_4$ stage which causes the 7–J flip-flop to be reset to its "0" state.

The succeeding pulses $\Phi_d$ and $\Phi_e$ do not cause the circuits to further respond. However, in response to the following $\Phi_f$ pulse, since the J flip-flop is now in its "0" state, the 7–IV flip-flop will be restored to its "0" state and as a result a positive output will be obtained from the conductor 7–IV′ which is applied to the And gate 610 which in turn controls the order word translator 611.

The succeeding $\Phi_1$ pulse from the clock circuit again advances the program register for the third time and causes the succeeding or No. 6 order in this register to be read out and entered on the program register flip-flops 5–$A_0$ through 5–$A_2$ and 5–$B_0$ through 5–$B_3$. This order is now transmitted to the order word translator since the flip-flops 7–IV and 7–V are their "0" states. This order is another A order with 000 in the A field and a binary 12 recorded in the B field or portion of the order thus directing the circuits to advance the program store thirteen steps.

The circuits respond to this order in a manner similar to that described above with reference to the No. 3 order. Thus, in response to the following $\Phi_c$ pulse from the clock circuit the 7–J flip-flop is set in its "1" state and the binary advance counter 710 set to represent No. 12 in binary notation, that is, the binary counter stages 7–$BC_1$ and 7–$BC_2$ are reset to their "0" stage while the binary counter stages 7–$BC_3$ and 7–$BC_4$ remain in their "1" states.

As a result, the program register is stepped and the binary counter 710 counted down one for each of the cycles of the clock circuit until the program register has been stepped twelve times. During these twelve steps the 7–IV flip-flop is in its "1" state due to the operation of the 7–J flip-flop to its "1" state and the succeeding $\Phi_e$ pulse, as described above, with reference to the No. 3 order.

After twelve steps, the 7–J flip-flop and the 7–IV flip-flop are restored to their "0" states and as the thirteenth step, the No. 19 order word is read out from the program register and entered upon the program register flip-flops 5–$A_0$ through 5–$A_2$ and 5–$B_0$ through 5–$B_3$.

This No. 19 order is the first order of the program B and is the same order J–14 as is recorded in the first position in the program A. The circuits respond to this order in the same manner as described above with respect to the first order. In this case, however, the store register is advanced until the synchronizing word or code is read out of the register space for the next succeeding converter, that is, the first word of the next succeeding register space in the signal store regitser. Thus, if it is assumed that the first A program operated in combination with the No. 1 register space in the signal store assigned to the first converter, then in response to the No. 19 order which is the first order of the B program the signal store is advanced to the first word or synchronizing code 1111 in the No. 2 register space which is assigned to the No. 2 converter.

As before the J–14 order is read out of the program register in response to the $\Phi_1$ pulse from the clock circuit and entered upon the program register flip-flops 5–$A_0$ through 5–$A_2$ and 5–$B_0$ through 5–$B_3$. This order is then decoded by the order word translator which, in turn, causes a signal to be applied to the output conductors from the 6–J and the 6–J–14 and 6–J–15 And circuits.

In response to the $\Phi_a$ pulse the reset potential is applied to the 7–V flip-flop which will restore this flip-flop to its "0" state if it had been in its "1" state. However, as described above, it is in its "0" state at this time so that it merely remains in its "0" state in response to a potential applied to its reset conductor or terminal.

Then in response to the $\Phi_b$ pulse the flip-flops 7–$V_1$ and 6–W, 6–X, 6–Y and 6–Z will be restored to their "0" states if they were in their "1" states and flip-flop 10–$\Phi$ is restored to its "0" state due to the output from And gate 7–18, as described above.

The circuits do not respond to the $\Phi_c$ pulse at this time. In response to the succeeding $\Phi_2$ pulse with the 10–$\Phi$ flip-flop in its "0" state, an advance pulse is transmitted to the store register, and the information stored on the store register flip-flops 5–$C_0$ through 5–$C_3$ read back into the store register through the And gates 3–0, 3–1, 3–2, and 3—3. The circuits do not respond to the $\Phi_d$ and $\Phi_e$ following this $\Phi_2$ pulse. In response to the $\Phi_f$ pulse the store register flip-flops 5–$C_0$ through 5–$C_3$ are restored to their "0" state since the 10–$\Phi$ flip-flop is also in its "0" state.

The next $\Phi_1$ pulse will cause the next word in the store register to be read out and entered upon the store register flip-flops 5–$C_0$ through 5–$C_3$ in the manner described above. So long as this word is not a synchronizing word comprising 1111 the circuits do not respond in any of the succeeding pulses except the next $\Phi_2$ pulse which steps the store and causes the information on the 5–$C_0$ through 5–$C_3$ flip-flops to be read back into the store and then the $\Phi_f$ pulse resets the store register flip-flops to 0. The next succeeding $\Phi_1$ pulse causes the next word in the store register to be read out and entered upon the store register C flip-flops. The above cycles of operation are repeated for each clock cycle causing the store to be advanced one word record space for each clock cycle. When the synchronizing word comprising 1111 is read out indicating the beginning of a register space assigned to a converter, in response to a $\Phi_1$ pulse all four store register flip-flops 5–$C_0$ through 5–$C_3$ will be set in their "1" states. As a result an output is obtained from And circuit 5—5 and then in response to the $\Phi_c$ pulse from And circuit 7–10 which causes the flip-flop 7–II to be set in its "1" state. The next $\Phi_2$ pulse causes this word to be read back into the store and the store advanced or primed. The following $\Phi_f$ pulse then resets the store register flip-flops 5–$C_0$ through 5–$C_3$.

The next $\Phi_1$ pulse advances the store register and causes the next word to be read out, which is the address of this converter. This address is entered upon the store register flip-flops 5–$C_0$ through 5–$C_3$ at this time. Then in response to the $\Phi_b$ pulse with flip-flop 7–II in its "1" state, an output is obtained from And circuit 7–9 which sets flip-flop 7–I in its "1" state and activates the input gate circuits to the R register circuit 811. As a result the address stored on the 5–$C_0$ through 5–$C_3$ flip-flops is entered upon the R register flop-flops 8$R_0$ through 8–$R_3$. The same information remains stored on the 5–$C_0$ through 5–$C_3$ flip-flops. In response to the succeeding $\Phi_2$ pulse the store register is advanced or primed and this address information read back into the store register. Then in response to the following $\Phi_f$ pulse the store register flip-flops 5–$C_0$ through 5–$C_3$ are again restored to their "0" state.

In response to the next $\Phi_1$ pulse the next word is read out of the store register which is designated scan. Since it is assumed that the system is idle, all zero's will be stored in this space in the converter register space. Also inasmuch as the system is assumed to be idle, no output will be obtained from the multifrequency receiver so that no output is obtained on the *s* lead from the converter or over the 10S conductor from the Or circuit 10–34. Consequently, in response to the $\Phi_a$ pulse an output is obtained from And circuit 7–13 which resets 7–II flip-flop to "0" sets 7–III flip-flop to "1," and sets the 10–$\Phi$ flip-flop to "1." In response to the following $\Phi_c$ pulse, flip-flop 7–VI has a resetting potential applied to its resetting terminals from And circuit 7–F. However, since this flip-flop is assumed to be in its "0" state, it will remain in this state. The succeeding $\Phi_2$ pulse is transmitted to the program register and causes this register to advance or be primed. In response to the $\Phi_e$ pulse since 7–III flip-flop is in its "1" state, flip-flops 7–I and 7–II are restored to their "0" states by an output from And circuit 7–M. In response to the $\Phi_f$ pulse the program register flip-flops 5–$A_0$ through 5–$A_2$ and 5–$B_0$ through 5–$B_3$ are restored to their "0" states. Flip-flop 7–III is also reset to its "0" state by the $\Phi_f$ clock pulse.

In response to the next succeeding $\Phi_2$ pulse the next program order word will then be read out since the 10–$\Phi$ flip-flop is in its "1" state. This order word is No. 20 and is a B–0 order. As a result, the 5–$A_0$ flip-flop will be set in its "1" state and the 5–$A_2$ and 5–$A_3$ flip-flops in their "0" states. The B flip-flops of the program register will all be set in their "0" states. This order is translated by the order word translator since the flip-flops 7–IV and 7–V are in their "0" states. As a result, an output is obtained from the And circuit 6–A+B and applied to various gate circuits as described.

The output of the program register flip-flops 5–$B_0$ through 5–$B_3$ and the output of the store register flip-flops 5–$C_0$ through 5–$C_3$ in addition to extending to various gate circuits, as described herein, also extend to the input to the match circuit 612. Match circuit 612 comprises eight And circuits which are connected, as shown, so that if the same number or word is stored on the program register flip-flops 5–$B_0$ through 5–$B_3$ as is stored upon the store register flip-flops 5–$C_0$ through 5–$C_3$, a positive output will be obtained on the M conductor indicating a match from the match circuit. If the same number or word is not stored on these two groups of flip-flops, then a positive voltage or output is obtained on the M′ conductor indicating a no-match. Under the assumed conditions wherein the No. 20 order is the B order with 0000 in the B field, each of the program register flip-flops 5–$B_0$ through 5–$B_3$ will be set in its "0" state. Likewise under the assumed conditions with 0000 in the scan word space in the converter register spaces in the store each of the C flip-flops 5–$C_0$ through 5–$C_3$ will be set in their "0" state. Consequently, a match is obtained at this time and positive potential applied to the output conductor M from the match circuit and a low or negative voltage applied to the M′ conductor. With these circumstances the $\Phi_a$, $\Phi_b$ and $\Phi_c$ pulses from the clock circuit are ineffective. The $\Phi_2$ pulse will advance the program register and the $\Phi_d$ and $\Phi_e$ pulses from the clock circuit are ineffective. The $\Phi_f$ pulse will cause the program register flip-flops to be reset to their "0" state.

The next succeeding $\Phi_1$ pulse will advance the program register and cause the next order which is No. 21 to be read out and entered upon the program register flip-flops 5–$A_0$ through 5–$A_2$ and 5–$B_0$ through 5–$B_3$. This is an A–4 order wherein zeros are stored in the A field and the binary 4 in the B field, thus indicating that the program store should be advanced five steps. This order will be decoded or translated by the order word translator 611 and a positive output will be obtained from the 6–A+B And circuit. The circuits do not respond to the following $\Phi_a$ and $\Phi_b$ pulses. In response to the following $\Phi_c$ pulse the 7–J flip-flop is set in its "1" state due to the operation of the And circuits 8–P, 8–N, and 8–24 and Or circuit 8–49′. In addition, the input And gates to the advance binary counter 710 are activated at this time with the result that these binary counter stages are set in accordance with the binary number recorded in the B field of the program register flip-flops. In other words 7–$BC_1$, 7–$BC_2$, and 7–$BC_4$ are all set in their "0" states while 7–$BC_3$ remains set in its "1" state.

The following $\Phi_2$ pulse primes or advances the program store and also causes the advance binary counter to count down 1, in other words the binary counter stage 7–$BC_1$ is changed from its "0" state to its "1" state and this, in turn, causes binary counter 7–$BC_2$ to change from its "0" state to its "1" state, and binary counter 7–$BC_3$ to change from its "1" state to its "0" state.

The circuits do not respond to the following $\Phi_d$ pulse. However, in response to the following $\Phi_e$ pulse with the 7–J flip-flop in its "1" state, 7–IV flip-flop is set in its "1" state. This prevents the setting of the program register flip-flops from being conveyed to the order word translator 611. The following $\Phi_f$ pulse causes the program register flip-flops to be restored to their "0" state. The next and each succeeding cycles of the clock circuit steps the program register one complete step or cycle and causes the advance counter 710 to count down 1. Consequently, after five $\Phi_2$ pulses from the clock circuit the advance binary counter will cause the 7–J flip-flop to be reset in its "0" state and thus, in turn, cause 7–IV flip-flop to be returned to its "0" state in response to the following $\Phi_f$ pulse.

Then, when the succeeding $\Phi_1$ pulse is received from the clock circuit the program register will be advanced and cause the fifth order from Order No. 21 which is Order No. 26 to be read out from the program store and entered upon the program register flip-flops.

This order is designated I–12 and comprises 110 entered in the respective 5–$A_0$, 5–$A_1$ and 5–$A_2$ flip-flops and 1110 entered on the B flip-flops 5–$B_0$ through 5–$B_3$, inclusive. This order is decoded by the order word translator 611 which, in turn, causes the positive output to be obtained from the 6–I–12 And circuit of this translator. The $\Phi_a$ and $\Phi_b$ pulses are ineffective at this time. In response to the $\Phi_c$ pulse an output is obtained from the And circuit 8–27. This output is due to an output of the And 8–N circuit in response to the $\Phi_c$ pulse and the 7–I flip-flop in its "0" state and also in response to the output of the Or circuits 8–G and 8–H from the 6–I–12 And circuit. As a result a 7–II flip-flop is set in its "1" state and the 10–Φ flip-flop reset to its "0" state. In response to the succeeding $\Phi_2$ pulse the outputs of the 5–$C_0$ through 5–$C_3$ flip-flops are read back into the store register and in response to the $\Phi_f$ pulse these flip-flops are restored to their "0" states.

In response to the succeeding $\Phi_1$ pulse the next word is read out of the converter register space. This will be the word in the code space, and under the assumed conditions, with this converter and thus the register space idle this code will be a 0100 code, Thus, the flip-flops 5–$C_0$, 5–$C_1$ anud 5–$C_3$ will be set in their "0" states while flip-flop 5–$C_2$ will be set in its "1" state. With flip-flop 7–II in its "1" state, an output will be obtained from the And circuit 8–28 in response to the following $\Phi_b$ pulse. This output is due to an input to this And circuit from the 6–I–12 And circuit of the order word translator through the Or circuits 8–G and and 8–K and from the 8–L And circuit due to the $\Phi_b$ pulse and the 7–II flip-flop in its "1" state.

The output from the And circuit 8–28 sets the flip-flops 7–I and 7–III in their "1" states and also sets the 10–Φ flip-flop in its "1" state.

With the flip-flop 10–Φ in its "1" state the next $\Phi_2$ pulse is transmitted to the program store and primes this store. In response to the succeeding $\Phi_e$ pulse with 7–III flip-flop in its "1" state, flip-flops 7–I and 7–II are restored to their "0" states. In response to $\Phi_f$, flip-flop 7–III is restored to its "0" states and the program register flip-flops restored to their "0" states.

Consequently, when the next $\Phi_1$ pulse is received the program store is advanced and the next succeeding or No. 27 order word read out and entered upon program register flip-flops. This is an A–9 order as shown in the Table D with 000 recorded in the A field and with binary 9 recorded in the B field. As a result 5–$B_0$ and 5–$B_3$ flip-flops will be set in their "1" states and 5–$B_1$ and 5–$B_2$ will be set in their "0" states. All the A flip-flops are set in their "0" states. This order is translated by the order word translator 611 in the manner described above and the advance binary counter set in accordance with the binary 9 recorded in the B field of this order. As a result during the next ten $\Phi_2$ pulses from the clock circuit the program store is advanced ten steps or ten cycles and each of the program words read out and entered upon the program register flip-flops. However, the first nine of these orders are not translated at this time due to the fact that the 7–IV flip-flop is operated to its "1" state as a result of the state of the advance counter 710 and flip-flop 7–J being operated to its "1" state in the manner described above. At this time the program store has been advanced so that it will read out order word No. 37. This is the order designated J–15 and has 111 in the A field and 0001 recorded in the B field. The circuits respond to this order in a manner similar to that described above with reference to the J–14 orders which were the first orders recorded in the A and B programs. This No. 37 order is the first order of the C program. This J–15 order, in addition to causing the various flip-flops to the reset in the manner described above with respect to J–14 order also causes the flip-flop 7–$V_1$ to be set in its "1" state. Thus, this order causes the 8–$R_0$ through 8–$R_3$ and 6–W, 6–X, 6–Y and 6–Z and 10–Φ flip-flops to be set in their "0" states and flip-flop 7–$V_1$ to be set in its "1" state due to a positive output from And gate circuit 7–19 instead of from And gate circuit 7–18 for the order J–14. As a result, the store is advanced until the synchronizing word or code is read out from the first slot in the next or No. 3 converter register space. This word comprises 1111. Next, the store is advanced one step and at which time the address of the converter register space, namely No. 3, is entered upon the store register flip-flops 5–$C_0$ through 5–$C_3$ and then the register flip-flops 8–$R_0$ through 8–$R_3$ set in accordance with this address. Inasmuch as the system is assumed to be idle, no signals will be received from the multifrequency receiver from the subscriber at this time. Consequently, the S output lead from the No. 3 converter will be a "0" so that no additional information is to be read into the converter register at this time.

Next the store shift registers are advanced or stepped and the previously scanned information read out. With the system idle 0000 will be read out from the scan slot at this time. Then the program store will be advanced one step and cause the No. 38 order to be read out. This order is designated F–1 and has 100 recorded in the A field and 0001 in the B field. These numbers are entered upon the order register flip-flops in the manner described above.

When the No. 38 order word is entered upon the program register flip-flops 5–$A_0$ through 5–$A_2$ and 5–$B_0$ through 5–$B_3$, it will be decoded by the order word translator since the flip-flops 7–IV and 7–V are in their "0" states. As a result an output will be obtained from the 6–E+F And circuit of the order word translator 611. The $\Phi_a$ and $\Phi_b$ pulses from the clock circuit are ineffective at this time. In response to the $\Phi_c$ pulse from the clock circuit, an output is obtained from And circuit 8-27. This And circuit is activated at this time, first by the positive potential from the 6–E+F And circuit of the order word translator 611 through the Or gates 8–G and 8–H also from the And circuit 8–N due to the 7–I flip-flop being in its "0" state and a $\Phi_c$ pulse from the clock circuit.

The output from the And circuit 8–27 sets the 7–II flip-flop in its "1" state and resets the 10–Φ flip-flop in its "0" state. With the flip-flop 10–Φ in its "0" state, the next $\Phi_2$ pulse is transmitted to the signal store and causes this store to be primed or advanced. It also causes the setting of the store register flip-flops 5–$C_0$ through 5–$C_3$ to be read back into the signal store shift registers.

The succeeding $\Phi_d$ and $\Phi_e$ clock pulses are ineffective. The following $\Phi_f$ pulses, however, causes the store register flip-flops 5–$C_0$ through 5–$C_3$ to be restored to their "0" state.

The succeeding $\Phi_1$ pulse then causes the store to advance and read out the next word from the No. 3 converter register space. This is designated the code word which under the assumed conditions, will be 0100 indicating that the No. 3 converter is idle. This word or information is read out and entered upon the store register flip-flop 5–$C_0$ through 5–$C_3$.

The $\Phi_a$ clock pulse is ineffective at this time. However, since 7–II flip-flop was set in its "1" state in response to the previous $\Phi_c$ pulse an output will be obtained from gate 8–28 in response to the succeeding $\Phi_b$ pulse. A positive voltage is applied to the upper input of gate 8–28 from the 6–E+F And gate of the order word translator 611 through the Or gates 8–G and 8–K. A positive voltage is applied to the lower input of the And gate 8–28 from the And circuit 8–L due to the positive voltage input from the 7–II flip-flop in its "1" state and the positive voltage of $\Phi_b$ clock pulse.

The output of the And gate 8–28 is employed to set the 7–I, the 7–III and the 10–$\Phi$ flip-flops in their "1" states.

The F–1 order is employed to match the number on the 5–$C_0$ through 5–$C_3$ flip-flops which are set in accordance with the code word read out from the code slot in the signal store No. 3 converter space and the number entered on the 5–$B_0$ through 5–$B_3$ flip-flops obtained from the B portion of the order. Thus the number 0100 entered upon the 5–$C_0$ through 5–$C_3$ flip-flops at this time is compared or matched by the match circuit 612 with the number 0001 entered upon the 5–$B_0$ through 5–$B_3$ flip-flops. Inasmuch as these numbers are different a match will not be obtained so a positive output will be obtained on the M′ output from the circuit while no such voltage will be obtained from the M output. Consequently, no output will be obtained from the 7–38′ And gate in response to the $\Phi_c$ clock pulse.

With the flip-flop 10–$\Phi$ in its "1" state the next $\Phi_2$ pulse is transmitted to the program store to prime this store.

The succeeding $\Phi_d$ pulse is ineffective while the $\Phi_e$ pulse causes flip-flops 7–I and 7–II to be restored to their "0" states due to an output from the And gate 7–M since the flip-flop 7–III is in its "1" state.

The succeeding $\Phi_f$ pulse causes flip-flop 7–III to be restored to its "0" state and causes the program register flip-flops 5–$A_0$ through 5–$A_2$ and 5–$B_0$ through 5–$B_3$ to be restored to their "0" states.

The next succeeding $\Phi_1$ pulse causes the next order word No. 39 of the C program to be read out from the program store and entered upon the program register flip-flops. This order B–0 has 001 entered in its A field and 0000 entered in its B field. This order is employed to compare the setting of the 5–$C_0$ through 5–$C_3$ flip-flops with the number i.e., 0000 of the B portion of the order and entered upon the flip-flops 5–$B_0$ through 5–$B_3$.

This order will be transmitted from the order word register flip-flops to the order word translator 611 and an output will be obtained from the And circuit 6–A+B.

The succeeding $\Phi_a$ pulse is ineffective at this time because 111 is not recorded in the A portion of this order. Since the 0100 entered on the 5–$C_0$ through 5–$C_3$ flip-flops does not match the number 0000 entered on the 5–$B_0$ through 5–$B_3$ flip-flops positive ouput will be obtained from the M′ conductor from the match circuit 612 while no such output will be obtained from the M output.

As a result positive output will be obtained from the And gate 7–24′ in response to the succeeding $\Phi_b$ pulse. Positive voltage is applied to the first input of this And gate from the 5–$A_0$ flip-flop in its "1" state; to the second input from the 6–A+B And circuit of the order word translator 611; to the third input from the M′ output of the match circuit 612; and a positive $\Phi_b$ pulse is applied to the fourth or final input of the And circuit 7–24′.

The output of And gate 7–24′ is employed to set the 7–J flip-flop of the advance counter 710 in its "1" state. The output of this And circuit is also employed to reset the binary counter stages 7–$BC_2$, 7–$BC_3$ and 7–$BC_4$ to their "0" states. Binary counter stage 7–$BC_1$ is left in its "1" state. The succeeding $\Phi_2$ pulse advances and primes the program store and in addition is transmitted through the 7–R And circuit to the binary counter 710. As a result the binary counter stage 7–$BC_1$ is changed from its "1" state to its "0" state.

The succeeding $\Phi_d$ pulse is ineffective while the $\Phi_e$ pulse causes flip-flop 7–IV to be set in its "1" state in the manner described above. The succeeding $\Phi_f$ pulse causes the program register flip-flops to be restored to their "0" states.

The next $\Phi_1$ pulse then causes the program store to be advanced and the next order is read out. Since the flip-flop 7–IV is now in its "1" state, this order is not transmitted to the order word translator 611.

The system responds in the above described manner to the next cycle of the clock circuit and causes the next order to be read out from the program store. Thus the B–0 order is employed to cause the store to be advanced two steps or to skip the No. 40 order. The circuits respond in a manner described above so that in response to the succeeding $\Phi_1$ pulse the No. 41 order of the C program is read out from the program store and entered upon the program register flip-flops 5–$A_0$ through 5–$A_2$ and 5–$B_0$ through 5–$B_3$.

This order A–14 has 000 entered in its A portion and binary 14 or 1110 entered in its B portion. As described above the A orders are employed to step the program register one step more than the number entered in the B portion of the order, consequently, in response to this No. 41 order the program store will be advanced 15 steps due to the operation of the 7–J flip-flop and the binary stages 7–$BC_1$, 7–$BC_2$, 7–$BC_3$ and 7–$BC_4$ of the advance counter 710 in the manner described above. At the end of these 15 steps the No. 1 order of the A program will be read out and entered upon the order word register flip-flops in the manner described above.

So long as a system is idle the response to the various orders will be similar to that described above except that each succeeding program is employed in cooperation with the next succeeding converter register space in the signal store. It is assumed that there are ten such converter spaces in a signal store so that it will take 3⅓ cycles of the main program store to cooperate with each of the signal store converter register spaces. At the end of 3⅓ program store cycles each one of the converter store register spaces will have cooperated with someone of the A, B or C programs in the program store. Each program store cycle requires approximately ten milliseconds, so 3⅓ program store cycles require approximately 33⅓ milliseconds. In the exemplary embodiment described herein there are ten converters and ten converter register spaces in the signal store. So long as the number of these register spaces is not evenly divisible by three each register space will cooperate with each of the programs during different ones of these cycles. Thus approximately every 100 milliseconds each of the converter register spaces in the signal store is serviced by or cooperates with each of the programs A, B, and C.

Since it is assumed that the output pulses are to be transmitted at a rate of ten pulses per second, one pulse transmission may be required during each 100 millisecond interval. However, since the multifrequency receiver outputs may persist for intervals as short as only 40 milliseconds it is necessary to scan the outputs of these multifrequency receivers at a faster rate. In the exemplary embodiment described herein they are scanned every 33⅓ milliseconds.

The above cycle of operation of the system continues so long as the system remains idle. Each of the programs is employed in combination with each of the register spaces in sequence in the manner described. Thus, during the first 33⅓ milliseconds, the No. 1 converter register is first serviced by the A program. During the second of these 33⅓ millisecond intervals this converter register space is serviced by the B program and during the third one of these intervals it will be serviced by the C program. Similarly, during the first interval the second converter register space will be serviced by the B program, during the second interval by the C program and during the third interval by the A program. In this fashion each of the other eight of the converter register spaces cooperates in sequence with each of the three programs.

Assume now that the subscriber 110 provided with multifrequency calling equipment originates a call and that a line finder 102 finds the calling line. Assume also that the trunk finder 1050 will find the truck 103 between the line finder 102 and the first selector 104 and that a converter finder 1060 will find the first converter for example, and cause this converter to be interconnected with the trunk 103 extending between the first selector 104 and the line finder 102.

At this time dial tone will be returned to the calling subscriber in a normal manner as described in the above-identified patents and patent applications. Assume further that between the time the No. 1 converter register space which is assigned to the No. 1 converter has been scanned by the C program and the time it will be scanned by the A program, the subscriber transmits signals representing the first digit identifying a called subscriber's line or station. The multifrequency tones or signals will be transmitted from the subscriber's station, over the subscriber's line, through the line finder 102 and then through the trunk finder 1050 and converter finder 1060 to the multifrequency receiver 201 interconnecting therewith as shown in FIG. 2. This multifrequency receiver 201 will transmit output signals over appropriate conductors representing the digit transmitted in a manner described in the above-identified patents. These output signals are transmitted to the No. 1 converter which is similar to the one shown in FIGS. 1 and 2. There are seven signal conductors and a control conductor between each converter and the corresponding multifrequency receiver The signal conductors are designated $L_0$, $L_3$, $L_6$, $L_9$, $H_1$, $H_2$ and $H_3$ and the control conductor is designated STR. The multifrequency receiver applies signals to different L and H conductors to identify the particular digits received and a signal to the STR conductor to indicate that a signal has been received.

The signal on the STR conductor is transmitted through a monopulser 910. This monopulser may be of any suitable type, such as, for example, set forth in Section 6–14 of the Military Standardization Handbook of Selected Semiconductor Circuits, MIL–HDBK–215, dated June 15, 1960. The output from the monopulser sets the converter flip-flop 911 in its "1" state and this flip-flop in turn conditions the 9–S And circuit for later operation.

If other subscribers similarly start calls, their converters will similarly be conditioned. With the No. 1 converter thus conditioned assume that the program register and the store register arrive at the condition wherein the No. 1 register space assigned to the first converter in the signal store will be employed in combination with the A program.

As before, the first order of this A program is a J–14 order having a 111 stored in the A field and 0000 in the B field or portion. This order is read-out from the program store in response to the $\Phi_1$ pulse from the clock circuit. In response thereto, this order is entered on the order word register flip-flops 5–A$_0$ through 5–A$_2$ and 5–B$_0$ through 5–B$_3$ and, since the 7–IV and 7–V flip-flops are in their "0" state it is transmitted to the order word translator 611 and decoded and a signal assumed to be positive is obtained from 6–J–14+J–15 And circuit. Inasmuch as the 7–V flip-flop is already in its "0" state, $\Phi_a$ pulse is ineffective at this time.

In rseponse to the $\Phi_b$ pulse, an output is obtained from the And circuit 7–18 which in turn causes the 10–Φ flip-flop, the 8–R$_0$ through 8–R$_3$ flip-flops, the 6–W, 6–X, 6–Y, 6–Z flip-flops and the 7–V$_1$ flip-flop all to be reset to their "0" states. At this time the 7–I flip-flop is also in its "0" state. Inasmuch as the flip-flops 6–W, 6–X, 6–Y, and 6–Z are already in their "0" state, they will remain in this state. The resetting of the 10–Φ flip-flop to its "0" state causes the succeeding clock pulses $\Phi_2$ and $\Phi_1$ to be transmitted to the signal store instead of the program store. The circuits do not respond to the $\Phi_c$ pulse from the clock circuit at this time.

With the 10–Φ flip-flop in its "0" state, the next $\Phi_2$ pulse is transmitted to the signal store and causes this store to be primed or advanced and, in addition, causes the setting of the store register flip-flops 5–C$_0$ through 5–C$_3$ to be read back into the store register through the And circuits 3–0, 3–1, 3–2, and 3–3. The following $\Phi_d$ and $\Phi_e$ pulses are ineffective. The $\Phi_f$ pulse is employed to reset the store register flip-flops 5–C$_0$ through 5–C$_3$ to their "0" states.

The succeeding $\Phi_1$ pulse then causes the signal store to advance and the information or word in the next slot read out and entered upon the 5–C$_0$ through 5–C$_3$ register flip-flops. As before, assume that this is not 1111 so that the $\Phi_a$, $\Phi_b$ and $\Phi_c$ pulses are ineffective. The subsequent $\Phi_2$ pulse again advances the signal store and the succeeding $\Phi_f$ pulse causes the 5–C$_0$ through 5–C$_3$ register flip-flops to again be reset to their "0" states. The next $\Phi_1$ pulse advances the store register and causes the word in the next slot to be read-out and entered on the store register flip-flops. Thus, during each cycle from the clock circuit the signal store is advanced one slot and the information in this slot read out. So long as this information is not 1111, the above cycles of operation are repeated.

When the first slot in the register space assigned to the first converter is reached under the assumed conditions, the synchronizing code 1111 will be read out and entered upon the store register flip-flops 5–C$_0$ through 5–C$_3$. As a result, when the $\Phi_d$ pulse is received from the clock circuit 310 an output will be obtained from the 5–5 And circuit and also from the 7–10 And circuit. The output from the 7–10 And circuit causes the 7–II flip-flop to be set in its "1" state. The succeeding $\Phi_2$ pulse then causes the signal store to be primed or advanced and the following $\Phi_f$ pulse causes the store register flip-flops 5–C$_0$ through 5–C$_3$ to be restored to their "0" states. The next $\Phi_1$ pulse causes the address which is assumed to be a 0001 to be read-out from the next slot in this register space and entered upon the store register flip-flops 5–C$_0$ through 5–C$_3$ in the manner described. In response to the succeeding $\Phi_b$ pulse since an output is obtained from the 6–J–14+J–15 And circuit of the order word translator 611 and since the 7–II flip-flop is in its "1" state, an output is obtained from And gate 7–9 which causes the address now set upon the store register flip-flops 5–C$_0$ through 5–C$_3$ to be transmitted to the address register flip-flops 8–R$_0$ through 8–R$_3$.

In addition, flip-flop 7–I is set in its "1" state in response to the output from And gate 7–9.

In response to the succeeding $\Phi_2$ pulse, the setting of the C register flip-flops is again entered in the signal store and in response to the $\Phi_f$ pulse the setting of the 5–C$_0$ through 5–C$_3$ register flip-flops is restored to "0."

The next $\Phi_1$ pulse causes the information in the next or scan slot in this register space to be read-out and entered upon the store register flip-flops in the manner described. Under the assumed conditions, this information will be 0000 since previously this converter and register were idle. Inasmuch as an output is still obtained from the 6–J–14+J–15 And circuit of the order word translator 611 and, since the 7–I flip-flop is in its "1" state, an output is obtained from the And circuit 7–13 in response to the succeeding $\Phi_a$ pulse received from the clock circuit at this time. The output from And gate 7–13 causes flip-flops 10–Φ and 7–III to be set in their "1" states and flip-flop 7–II to be restored to its "0" state.

The output of the address register flip-flops 8–$R_0$ through 8–$R_3$ is transmitted through the address translator 812 and causes a positive voltage to be applied to the 1 output from this transistor. As a result, the first eight And gates of the No. 1 converter 910 are activated and cause voltages to be transmitted from them in accordance with the voltages received from the multifrequency receiver. This includes a voltage on the $S_1$ output lead.

In response to the $\Phi_a$ pulse with voltage on the $S_1$ conductor and voltage from the 6–J–14+J–15 And circuit and with the 7–I flip-flop and its "1" state, an output is obtained from And circuit 7–17. As a result, the signal representing this dialed digit is transmitted from the first seven And gates of the No. 1 converter through the corresponding Or circuits 10–27 through 10–33, to the digit translator 1011 and then from the digit translator 1011 to the store register flip-flops 5–$C_0$ through 5–$C_3$, thus setting these flip-flops to represent the first dialed digit. The digit translator 1011 is employed to translate the multifrequency code representing these digits as received into a binary number representing the same digit which is stored on the 5–$C_0$ through 5–$C_3$ flip-flops. In addition, the flip-flop 7–VI is set in its "1" state by the output from And gate 7–17.

In response to the succeeding $\Phi_b$ pulse, And gate 9–$17_1$ causes an output to be transmitted to reset the flip-flop 911 of the No. 1 converter through the corresponding And circuit which is still activated by the output from the address translator 812.

In response to the following $\Phi_c$ pulse with an output from the 6–J–14+J–15 And circuit and with flip-flop 7–I in its "1" state and flip-flop 7–II in its "0" state, an output will be obtained from the And circuit 7–F which causes flip-flop 7–VI to be restored to its "0" state.

The succeeding $\Phi_2$ pulse is transmitted to the program store since the 10–$\Phi$ flip-flop is in its "1" state. This pulse thus primes or advances the program store. With the 7–III flip-flop in its "1" state an output is obtained from the 7–M And gate in response to the succeeding $\Phi_e$ pulse. This output from And gate 7–M restores flip-flop 7–I to its "0" state. Then the flip-flop 7–III is restored to its "0" state in response to the following $\Phi_f$ clock pulse. This $\Phi_f$ pulse also restores the program register flip-flops to their "0" states in preparation for receiving the next program order word.

The following $\Phi_1$ pulse is transmitted to the program store and causes the next or No. 2 order to be read out of the A program. This is a C–8 order with 010 stored in the A field and 1000 stored in the B field. As described above this order is employed to compare the code or binary number stored in the code slot in the signal store with the send code 1000 stored in the B field of this order.

Inasmuch as the flip-flops 7–IV and 7–V are in their "0" states, this order is transmitted to the order word translator 611 where it causes an output to be obtained from the And circuit 6–C+D. The following $\Phi_a$ and $\Phi_b$ pulses are ineffective. The next $\Phi_c$ pulse causes an output to be obtained from the And circuit 8–27 which in turn causes the 10–$\Phi$ flip-flop to be reset to its "0" state and the flip-flop 7–II to be set in its "1" state.

The output from the And circuit 8–27 as described above at this time is due to positive voltage transmitted from the 6–C+D And circuit of the order word translator 611 through the Or gates 8–G and 8–H to the lower input of the And circuit 8–27. Positive voltage is also obtained from the 7–I flip-flop in its "0" state from the $\Phi_c$ pulse which causes an output from the And gate 8–N which output is transmitted to the upper input of the And circuit 8–27.

With the 10–$\Phi$ flip-flop reset in its "0" state a succeeding $\Phi_2$ pulse is transmitted to the signal store and primes this store and causes the binary representation of the first called digit to be read into the signal store from signal store register flip-flops 5–$C_0$ through 5–$C_3$. This representation will remain in the scan slot until it is read out and changed as will be described later.

The $\Phi_d$ and $\Phi_e$ clock pulses are inffective at this time. The following $\Phi_f$ pulse is employed to reset the signal store register flip-flops 5–$C_0$ through 5–$C_3$, thus preparing these flip-flops to receive the information recorded in the next or code slot in this No. 1 converter register space in the signal store. The code slot has the idle code 0100 stored in it at this time. This binary number or code is thus read out and entered upon the store register flip-flops 5–$C_0$ through 5–$C_3$ in response to the next $\Phi_1$ clock pulse.

The following $\Phi_a$ pulse is ineffective. In response to the next $\Phi_b$ pulse an output is obtained from the And gate 8–28 due to positive voltage applied to its upper input from the output of the 6–C+D And gate of the order word translator 611 which is transmitted through the Or gates 8–G and 8–K to the upper input of the And circuit 8–28. Positive input voltage is applied to the lower input of the And gate 8–28 from the And gate 8–L due to positive input applied to its upper input from the 7–II flip-flop in its "1" state and the $\Phi_b$ clock pulse applied to its lower input.

The output from the And circuit 8–28 is employed to set the flop-flops 10–$\Phi$, 7–I and 7–III all in their "1" states.

As described above the output of the signal store register flip-flops 5–$C_0$ through 5–$C_3$ and the output of the B program register flip-flops 5–$B_0$ through 5–$B_3$ are transmitted to the match circuit 612. As described above the idle code 0100 is now stored upon the 5–$C_0$ through 5–$C_3$ flip-flops while the send code 1000 is now stored upon the flip-flops 5–$B_0$ through 5–$B_3$, consequently, no match will be obtained from the M conductor of the match circuit at this time. As a result the $\Phi_c$ clock pulse is ineffective.

The succeeding $\Phi_2$ pulse is then transmitted to the program store and primes this store and causes the idle code to be read back into the signal store in the manner described herein. The following $\Phi_d$ pulse is ineffective at this time. The $\Phi_e$ pulse causes the flip-flops 7–I and 7–II to be restored to their "0" states due to the output of the And gate 7–M. The following $\Phi_f$ pulse causes the flip-flop 7–III to be restored to its "0" state and the program register flip-flops 5–$A_0$ through 5–$A_2$ and 5–$B_0$ through 5–$B_3$ all to be restored to their "0" states.

The next $\Phi_1$ pulse will then cause the next order to be read out of the program register which is the No. 3 order. This order is an A–Z order having 000 stored in its A field and 0010 stored in its B field as described above. This order is employed to cause the program store to be advanced 3 steps in the manner described above at which time the No. 6 order will be read out from the program store. This order is also designated A–12 and has 000 stored in its A field and 1100 stored in its B field. 1100 is a binary representation of the decimal number 12 so that this order causes the program store to be advanced 13 steps in the manner described above. At this time the No. 19 order will be read out from the program store, which is the first order of the B program and is designated J–14.

The system responds to this order in a manner described above in cooperation with the No. 2 converter register space in the signal store.

The system responds to the succeeding orders of the B program as well as the orders of the C program and the A program in the manner described herein. If the various register spaces in the signal store are all idle then the system responds to these programs in a manner described above. If the respective converters and the corresponding converter spaces in the signal store are in the process of handling a call then the system will respond to these various orders in the manner described herein. As described, each program cooperates in succession with each of the converter register spaces in the signal store.

However, the next time the No. 1 register space in the signal store is scanned it will be scanned by the B program as described above. The first order is the No. 19 order and is a J–14 order. The system responds to this order in a manner described above. This order has 111 recorded in the A field and 0000 in the B field.

The $\Phi_a$ pulse causes an output from the 7–10′ And circuit which causes the flip-flop 7–V to be restored to its "0" state if it had been in its "1" state with a result that the order is transmitted to the order word translator 611 and translated in the manner described above. This order then causes the flip-flops 10–Φ, 7–$V_1$, 6–W, 6–X, 6–Y, 6–Z and 8–$R_0$ through 8–$R_3$ all to be reset to their "0" states. The store is then advanced to the synchronizing code word 1111. The store is then stepped to the address or number slot which is read out and stored upon signal store register flip-flops 5–$C_0$ through 5–$C_3$. Then the output of these flip-flops is gated to the flip-flops of the address register 811 in a manner described above. The store is then stepped to the scan slot. As first described above, it was assumed that the No. 1 converter and thus the No. 1 converter register space were in their idle condition and had 0000 stored in the scan slot. It is now assumed that the representation of the first called digit was stored in the scan slot by the No. 1 or J–14 order of the A program the previous time this No. 1 register space cooperated with the A program. At that time the flip-flop 911 was reset to its "0" state.

While the output from the multifrequency receiver may last for as little as 40 milliseconds the digits will not be transmitted faster than one every tenth of a second. Consequently, since the first digit was received just prior to the previous cooperation of the A program with this converter register space a succeeding digit cannot be received at this time so that the converter flip-flop 911 will be in its "0" state. As a result the output of the digit translator is not gated to the store register flip-flops 5–$C_0$ through 5–$C_3$, at this time, instead the program store is advanced in the manner described above.

The succeeding $\Phi_1$ pulse then causes the program store to be stepped and the next program order word is read out, which will be the program order word No. 20. This is a B–0 order with 001 registered in the A field and 0000 registered in the B field. This order is entered upon the program register flip-flops 5–$A_0$ through 5–$A_2$ and 5–$B_0$ through 5–$B_3$ and then translated by the order word translator, since 7–IV and 7–V flip-flops are both in their "0" state. At this time, the setting of the store register flip-flops 5–$C_0$ through 5–$C_3$ is matched against the setting of the program register 5–$B_0$ through 5–$B_3$. As described previously, when the scan slot is empty, 0000 is recorded in this slot in the signal store and on signal store register flip-flops 5–$C_0$ through 5–$C_3$ so in response to this order with the 0000 recorded on the program register flip-flops 5–$B_0$ through 5–$B_3$, a match was obtained from the match circuit 612. Under the now assumed conditions, however, the binary representation of the first digit of the called party's number is stored on the store register flip-flops 5–$C_0$ through 5–$C_3$ and, as a result, no match will be obtained. Instead, a mismatch will be obtained with positive potential applied to the M′ conductor rather than the M conductor from the match circuit 612.

The succeeding $\Phi_a$ pulse is ineffective at this time. However, in response to the $\Phi_b$ pulse an output is obtained from the And circuit 7–24′ which output causes the 7–J flip-flop to be set in its "1" state.

The output from the And circuit 7–24′ is also applied to set the advance binary counter stages 7–$BC_2$, 7–$BC_3$ and 7–$BC_4$ to their "0" states so that this counter is set to represent a binary 1. The following $\Phi_c$ clock pulse is ineffective at this time.

With the 7–J flip-flop in its "1" state, the next $\Phi_2$ pulse causes an output from the And circuit 7–R which output changes the first advance binary counter stage 7–$BC_1$ from its "1" state to its "0" state wherein this counter now is set to represent the binary 0. In addition, this $\Phi_2$ pulse causes the program register to be advanced.

The following $\Phi_d$ and $\Phi_e$ pulses produce no effect upon the circuit at this time. The $\Phi_f$ pulse resets the program register flip-flops in their "0" states. This $\Phi_f$ pulse together with the J flip-flop in its "1" state causes the 7–IV flip-flop to be set in its "1" state.

Then in response to the $\Phi_1$ pulse the program store is advanced and the next order word read out and entered upon the program register flip-flops. However, since the 7–IV flip-flop is now in its "1" state, this order is not transmitted to the order translator 611 and is not translated by this translator. The succeeding $\Phi_a$, $\Phi_b$ and $\Phi_c$ pulses from the clock circuit are ineffective. The $\Phi_2$ pulse causes the program register to be advanced or primed. This $\Phi_2$ pulse, in addition, is transmitted to the 7–R And circuit again causing an output from this And circuit which now restores the advance counter stages to their "1" states which in turn cause the 7–J flip-flop to be restored to its "0" state. The following $\Phi_d$ and $\Phi_e$ pulses are ineffective. However, the $\Phi_f$ pulse with the 7–J flip-flop in its "0" state causes the 7–IV flip-flop to be restored to its "0" state and, in addition, causes the program register flip-flops to be restored to their "0" states.

The next $\Phi_1$ pulse received from the clock circuit causes the program register to advance and read out the next Order No. 22 from the program store. This order is an I–2 order and as a result a positive output voltage is obtained from the 6–I–1+I–2 And circuit of the order word translator 611. The following $\Phi_a$ pulse is ineffective, and in response to the $\Phi_b$ pulse the input And gates of the 6–W, 6–X, 6–Y, and 6–Z flip-flop circuits are all conditioned to respond to the setting of the store register flip-flops 5–$C_0$ through 5–$C_3$. These And gates are so conditioned by the output from the 6–I–1+I–2 And circuit, the 5–$B_0$ flip-flop in its "1" state due to the 0001 recorded in the B field of this order, and by the $\Phi_b$ pulse. As a result, the binary representation of the first digit of the called number is transferred from the store register flip-flops 5–$C_3$ through 5–$C_0$ to the 6–W, 6–X, 6–Y, and 6–Z flip-flops, respectively. The following $\Phi_c$ pulse is ineffective and the next $\Phi_2$ pulse primes the program store. The following $\Phi_f$ pulse restores the program register flip-flops to their "0" states.

The next $\Phi_1$ pulse causes the next program order to be read out and entered on the program order word register flip-flops. This is Order No. 23 and is designated I–8. This order is transmitted to the order word translator which in turn causes a positive output voltage to be obtained from the 6–I–8 And circuit. The succeeding $\Phi_a$ pulse is ineffective. However, in response to the $\Phi_b$ pulse, an output is obtained from the And circuit 8–23. This And circuit has one input connected to the 6–I–8 And circuit, another input has a positive voltage applied to it when the 7–I flip-flop is in its "0" state. This And circuit is shown with another input designated C(1010)′. This input is from gate 5–4 which is an Or circuit having positive inputs from flip-flops 5–$C_0$ and 5–$C_2$ when they are in their "1" states and from flip-flops 5–$C_1$ and 5–$C_3$ when they are in their "0" states. This is the complement of the binary representation of the decimal number 10 or the dialed or transmitted digit of 0 by the subscriber. If the subscriber had dialed a 0 as a first digit, then flip-flops 5–$C_0$ and 5–$C_2$ would now be reset in their "0" states and flip-flops 5–$C_1$ and 5–$C_3$ would now be set in their "1" states, resulting in no output from gate 5–4. If these flip-flops are not set in accordance with this dialed digit, assuming an initial digit other than 0, then positive voltage will be obtained from this gate 5–4 and in turn cause an output from And circuit 8–23 in response to the $\Phi_b$ clock pulse received at this time. At this time, the first digit of the called number is still recorded on store register flip-flops 5–$C_0$ through 5–$C_3$ and upon the 6–W, 6–X, 6–Y, and 6–Z flip-flops in the manner described above. The output from And circuit 8–23 is employed to reset the 10–Φ flip-flop to its "0" state and to set the 7–II flip-flop in its "1" state. The following $\Phi_c$ pulse causes an output from And circuit 5–$E_1$ which causes the store register flip-flops 5–$C_0$ through 5–$C_3$ to be restored to their "0" states. The $\Phi_2$ pulse causes the signal store to be primed and, at the same time, the "0's" recorded now on the store register flip-flops 5–$C_0$ through 5–$C_3$ to be entered in the scan slot of the No. 1 converter register space in the signal store. In other words, the binary representation of the first digit of the called subscriber's number has been removed from the scan slot in this register space and 0's written in its place. This binary representation has been temporarily stored on the 6–W, 6–X, 6–Y, and 6–Z flip-flops at this time. The following $\Phi_d$ and $\Phi_e$ pulses are ineffective. Because flip-flop 10–Φ is in its "0" state, the $\Phi_f$ pulse would reset the store register flip-flops to "0" by means of And gate 5E, but since they are already in their "0" states this pulse is ineffective at this time.

The succeeding $\Phi_1$ pulse is transmitted to the signal store, since the 10–Φ flip-flop is in its "0" state. As a result this register is advanced and the information in the next slot is read out and entered upon the 5–$C_0$ through 5–$C_3$ flip-flops. The next slot is designated the code slot and under assumed conditions has an idle code of 0100 stored in it. In response to the following $\Phi_a$ clock pulse with flip-flop 7–II in its "1" state and with an output from the And circuit 6–I–8, an output will be obtained from the And circuit 8–28′ since positive voltage is applied to each of its inputs. The output of this And circuit is employed to set the 10–Φ, 7–I and 7–III flip-flops in their "1" states. With flip-flop 7–I in its "1" state, an output is obtained from the And gate 7–23′ in response to the following $\Phi_b$ clock pulse, since all of its inputs are positive at this time. The output of And gate 7–23′ is employed to set flip-flop 7–V in its "1" state. The succeeding $\Phi_c$ pulse is inffective.

The succeeding $\Phi_2$ pulse is now transmitted to the program register since the 10–Φ flip-flop is in its "1" state. The succeeding $\Phi_d$ pulse is ineffective. With flip-flop 7–III in its "1" state flip-flops 7–I and 7–II are restored to their "0" states in response to the $\Phi_e$ pulse which causes an output from the 7–M And circuit. In response to the $\Phi_f$ pulse with the 10–Φ flip-flop in its "1" state, the program register flip-flops are restored to their "0" states. Flip-flop 7–III is also restored to its "0" state. The 7–V flip-flop, however, remains in its "1" state at this time.

The succeeding $\Phi_1$ pulse causes the next program order which is No. 24 to be read out and entered upon the order register flip-flops. Since the 7–V flip-flop is in its "1" state, this order is not transmitted to the order word translator 611 and is thus not translated. The succeeding $\Phi_a$, $\Phi_b$ and $\Phi_c$ pulses are ineffective and the succeeding $\Phi_2$ pulse again primes the program store. The succeeding $\Phi_d$ and $\Phi_e$ pulses are ineffective while the $\Phi_f$ pulse causes the program register flip-flops to be restored to their idle condition. The above cycle of operation of advancing the program register one step for each cycle is repeated until an order is read out in which the A field has 111 recorded in it. This type of operation is called a "peg" operation. Thus, the program store will be stepped through the Order Nos. 25, 26, 27 to order No. 28.

When Order No. 28 is read out, 111 in the A field is entered upon the program register flip-flops 5–$A_0$, 5–$A_1$ and 5–$A_2$. This order is designated J–16 and has 0010 recorded in its B field. Then in response to the $\Phi_a$ pulse with the program register flip-flops 5–$A_0$ through 5–$A_2$ all in their "1" states, an output is obtained from And circuit 7–10′ which causes the 7–V flip-flop to be restored to its "0" state.

As a result, this order is transmitted to the order word translator 611 and decoded so that an output may be obtained from the 6–J And circuit.

As described above, the signal store register flip-flops 5–$C_0$ through 5–$C_3$ have been set in accordance with the word recorded in the code slot in the store register. This was the idle code 0100. The J–16 order is employed to determine whether or not the last three digits of this code are all 0's. Since they are not, no output will be obtained from the 5–3 And circuit and, thus, an output is not obtained from the 7–16 And circuit. Consequently, 7–V flip-flop now remains in its "0" state. The succeeding $\Phi_c$ pulse is ineffective while the next $\Phi_2$ pulse is employed to prime the program register. The succeeding $\Phi_d$ and $\Phi_e$ pulses are ineffective and the $\Phi_f$ pulse causes the program register flip-flops to be reset to their "0" states.

The next $\Phi_1$ clock pulse causes the program register to step and read out the next order which is Order No. 29. This is a G–14 order having 101 recorded in its A field and 1110 recorded in its B field.

This is the first of a series of G orders which are employed to subtract 1 from the code or binary number stored in the code slot in the converter register space. As shown in Table E, numerous codes or binary numbers are stored in this code slot and represent different conditions of the register and converter. The idle code 0100 was previously stored in this slot and was read out and entered upon the stored register flip-flops 5–$C_0$ through 5–$C_3$ in response to the previous Order No. 23 as described above.

This code also represents the binary representation of the number four. The succeeding G orders to be described are employed to change this code from the binary representation of the number four to the binary representation of the number three which, as shown in Table E, indicates that the first digit has been received.

In changing this indication from the binary representation of 4 to the binary representation of 3 it is necessary to subtract 1 from the binary code representing 4. In accordance with the exemplary embodiment described herein 1 is subtracted by reading out each of the bits of this binary number in succession. These bits are read out and changed. The lowest denominational order or $C_0$ bit is read out first and changed. If this bit was a 0 the next higher denominational order or $C_1$ bit will also be read out and changed. Again, if this was 0 the next higher order bit is read out and changed. If any of these bits as stored in the register space is a 1 then the higher order bits are not read out and are not changed. The 0's are changed to 1's after they are read out and the 1's are changed to 0's but only the first 1 encountered is changed, the remaining bits remaining unchanged.

In this manner the binary number may be reduced by 1 or 1 subtracted from this number.

Thus the No. 29 order is employed to change the $C_0$ bit of the code representation. This order is read out from the program register and entered upon the program register flip-flops. The A portion of this order is translated by the order word translator which causes a positive output voltage to be obtained from the 6–G And circuit of the order word translator 611. The B portion of this order comprising 1110 is entered upon the B flip-flops 5–$B_0$ through 5–$B_3$ of the program register. The 0 output of the program register flip-flops 5–$B_0$ through 5–$B_3$ is compared with the 1 output of the corresponding signal store register flip-flops 5–$C_0$ through 5–$C_3$. These corresponding outputs are transmitted to the first four And circuits of the Or circuit 613. Thus, the first And circuit has an input from 0 output from the 5–$B_0$ flip-flop and an input from the 1 output from the 5–$C_0$ flip-flop. In this case 0 is recorded on the 5–$B_0$ flip-flop so that its output and thus the first input to the first And circuit will be positive. The succeeding B flip-flops of the program register have 1 recorded in them so that the first input to the succeeding three And circuits of the Or circuit 613 will not be positive. Consequently, no outputs may be obtained from these And circuits at this time.

The 1 output from the 5–$C_0$ flip-flop is also connected to the second input of the first And circuit. Thus, if this flip-flop is in its "1" state then an output will be obtained from the first And circuit because both of its inputs are positive. This output then is transmitted to the Or circuit 614 and then to the Or output conductor. It is also transmitted to the inverter 615. However, since it is transmitted through the inverter 615 it is logically reversed; i.e., the inverter 615 will produce a positive output voltage when no such output is produced by Or circuit 614.

If on the other hand the 5–$C_0$ flip-flop is set in its "0" state then positive voltage will not be applied to the second input of the first And circuit of Or circuit 613 so that positive voltage will not be transmitted through the following Or circuit 614 and will not appear on the Or output conductor. Instead, due to the operation of the inverter circuit positive voltage will be applied to the (Or)′ output conductor.

Under the assumed conditions with 0 recorded on the 5–$B_0$ flip-flop and a 0 recorded on the 5–$C_0$ flip-flop as described above a positive output will be obtained on the Or′ conductor. Consequently, with positive output voltage from the 6–G And circuit an output will be obtained from And circuit 7–12′ in response to the succeeding $\Phi_b$ pulse.

The output from And circuit 7–12′ causes flip-flops 7–II and 7–III to be set in their "1" states.

With positive output voltage from the 6–G And circuit and with flip-flop 7–II in its "1" state the next succeeding $\Phi_c$ pulse conditions the And gates 6–30′, 6–31′, 6–32′ and 6–33′ so that they will transmit positive voltages if the corresponding B flip-flops are in their "0" states. If the corresponding B flip-flops are in their "1" states no positive output voltages are obtained from the corresponding And circuits. Under the assumed conditions with the 5–B1, 5–B2 and 5–B3 flip-flops in their "1" states no output will be obtained from the And circuits 6–31′, 6–32′, and 6–33′ so that the C flip-flops 5–C3, 5–C2, and 5–C1 will remain in their previous state, namely, 010, respectively.

An 0 is recorded on the 5–$B_0$ flip-flop. Consequently, an output will be obtained from the 6–30′ circuit and set the 5–$C_0$ flip-flop to its "1" state. At this time these flip-flops are set in accordance with the binary number 0101. The output from And circuit 6–30′ is also transmitted through the Or circuit 6–35′ to set the 7–J flip-flop in its "1" state. This output is also transmitted through the Or circuit 6–35′ to the reset inputs of the advance binary counter stages 7–$BC_2$, 7$BC_3$, and 7–$BC_4$, thus setting this counter to represent a 1.

The suceeding $\Phi_2$ pulse then primes the program register, and in addition it is transmitted to the And circuit 7–R to the advance binary counter stages $BC_1$ resetting this stage to its "0" state. The following $\Phi_d$ pulse is ineffective at this time. The $\Phi_e$ pulse with the 7–J flip-flop in its "1" state causes flip-flop 7–IV to be set in its "1" state. In addition, the $\Phi_e$ pulse with flip-flop 7–III set in its "1" state causes 7–II flip-flop to be reset to its "0" state.

The succeeding $\Phi_f$ pulse then resets flip-flop 7–III and also resets the program register flip-flops 5–$A_0$ through 5–$A_2$ and 5–$B_0$ through 5–$B_3$ to their "0" states.

The next succeeding $\Phi_1$ pulse then advances the program register and causes it to read out the next succeeding order which is Order No. 30. Inasmuch as the flip-flop 7–IV is set in its "1" state this order is not transmitted to the order word translator with the result that the succeeding $\Phi_a$, $\Phi_b$, and $\Phi_c$ pulses are ineffective at this time. The following $\Phi_2$ pulse is again transmitted through the And circuit 7–R to the first stage 7–BC1 of the advance binary counter 710 with the result that all of these binary counter stages 7–BC1, 7–BC2, 7–BC3 and 7–BC4 are changed from their "0" to their "1" states. As a result, an output pulse is obtained from binary counter stage 7–BC4 which causes the 7–J flip-flop to be reset in its "0" state. This $\Phi_2$ pulse is also transmitted to the program store and primes or steps this store. The succeeding $\Phi_d$ and $\Phi_e$ pulses are ineffective. The following $\Phi_f$ pulse with the J flip-flop in its "0" state causes flip-flop 7–IV to be reset to its "0" state. This $\Phi_f$ pulse also causes the program register flip-flops to be restored to their "0" states.

The next $\Phi_1$ pulse causes the program register to be advanced and read out with the next order, which is Order No. 31. This is the second of the G orders G–13 having 101 recorded in its A field and 1101 in its B field. This order is employed to change the $C_1$ bit of the code word. In this case, the 0 in the B field is in the $C_1$ bit space. The circuits respond to this order in a manner similar to that described above with respect to the Order No. 29, except that the $B_0$ flip-flop is now set in its "1" state as are the $B_2$ and $B_3$ flip-flops with the result that the first, third and fourth And circuits of Or circuits 613 cannot respond and transmit positive output voltages. The flip-flop 5–$B_1$ is now set in its "0" state so that positive voltage is applied to the first input of the second And circuit. The $C_1$ flip-flop is in its "0" state as described above since these flip-flops are set to represent the 0101 code. As a result, positive voltage is not obtained from the "1" output of this flip-flop so that no output is obtained from the second And circuit nor any of the other And circuits connected to Or circuit 614. Consequently, positive voltage is obtained on the Or′ conductor. As a result, in response to the following $\Phi_6$ pulse an output is again obtained from And circuit 7–12′. This output causes flip-flops 7–II and 7–III to be set in their "1" state as described above. The succeeding $\Phi_c$ pulse will cause an output from the And circuit 6–31′ at this time which causes flip-flop 5–$C_1$ to be set in its "1" state. The C flip-flops are now set to represent the binary number 0111. In addition, an output is transmitted through Or circuit 6–35′ which sets the 7–J flip-flop in its "1" state and sets the binary counter 710 to represent a 1. Thereafter, these circuits respond as described above and cause the flip-flops 7–II and 7–III to be restored to their "0" state and cause the program register to be advanced two steps so that the Order No. 32 will be read out and entered upon the order register flip-flops but not decoded and then the Order No. 33 read out and entered upon the order register flip-flops. This order will be decoded because flip-flop 7–IV is now restored to its "0" state.

The No. 33 order is a G–11 order having a 101 in its A field and 1011 in the B field. Thus, this order is employed to change the $C_2$ bit of the code number or symbol indicating the progress of a call. This G order is similar to the No. 29 and No. 31 orders described above, except that the 5–$B_2$ flip-flop is set in its "0" state instead of the 5–$B_0$ and 5–$B_1$ flip-flops as for the No. 29 and No. 31 orders. Under these circumstances, the 5–$B_3$, 5–$B_1$, and 5–$B_0$ flip-flops are all in their "1" state so that the first, second and fourth And circuits have a negative potential applied to the upper inputs. Thus, these And circuits of Or circuit 613 will be ineffective at this time. The third And circuit has a positive voltage applied to its upper terminal applied from the "0" output of the 5–$B_2$ flip-flop. The lower input of this And circuit is connected to the 1 output of the 5–$C_2$ flip-flop. Thus, if this flip-flop is in its "1" state, positive voltage will be applied to this input of the And circuit but if the 5–$C_2$ flip-flop is in its "0" state no such positive voltage is applied. Under assumed conditions wherein the flip-flops are presently set to record the binary number or notation 0111, the 5–$C_2$ flip-flop will be set in its "1" state. Consequently, positive voltage will be obtained from this And circuit of the Or circuit 613 and applied to the Or output lead. Also, this positive voltage is applied to the inverter circuit so that no positive voltage will be applied to the Or′ output conductor. Consequently, in response to the succeeding $\Phi_b$ pulse an output is obtained from the And circuit 7–13′ instead of And circuit 7–12′, with the result that flip-flops 7–I and 7–III are set in their "1" states instead of flip-flops 7–II and 7–III as described above under assumed conditions for Order Nos. 29 and 31. With flip-flop 7–I in its "1" state instead of flip-flop 7–II, an output is obtained from And circuit 6–22′ in response to the following $\Phi_c$ clock pulse since flip-flop 5–$B_2$ is in its "0" state. No output is obtained from the And circuits 6–20′, 6–21′, or 6–23′. The output from And circuit 6–22′ resets the 5–$C_2$ flip-flop to its "0" state. As a result the store register flip-flops 5–$C_0$ through 5–$C_3$ are now set to represent the binary number 0011. This is the binary representation of 3 which is 1 less than the binary representation of the number four which is the idle code. Furthermore, the $C_2$ was in a "1" originally for the binary code for 4 so that when this is changed to 0 the subtraction of 1 from 4 is complete and no further G orders are required. Consequently, the circuits are set to step to the next program order instead of skipping the next order as in the case of Nos. 29 and 31 orders described above. Thus, the following $\Phi_2$ clock pulse is employed to step or prime the program register. The succeeding $\Phi_d$ pulse is ineffective and the $\Phi_e$ pulse is employed to restore the flip-flop 7–I to its "0" state and the next $\Phi_f$ pulse is employed to restore the flip-flop 7–III to its "0" state and restore the program register flip-flops to their "0" states. The next $\Phi_1$ pulse then causes the program register to step and read out the next order which is order No. 34. This order has 111 in its A field and 0100 in the B field and designated a J–17 order. This order is transmitted to the order word translator since flip-flops 7–IV and 7–V are in their "0" states and as a result an output is obtained on the 6–J And circuit.

This order is employed to determine whether or not the 7–U flip-flop is in its "1" state. If it is in its "1" state, it is not required to write any digit into the proper digit spaces in the converter register space. If this flip-flop is in its "0" state it indicates that it is necessary to write a dialed digit in one of the digit slots in the store register space assigned to a converter. Under the assumed conditions, 7–U flip-flop is in its "0" state. Consequently, the succeeding $\Phi_a$, $\Phi_b$, and $\Phi_c$ pulses are ineffective. The succeeding $\Phi_2$ pulse is transmitted to the program register and steps or primes this register. The succeeding $\Phi_d$ and $\Phi_e$ pulses are ineffective while the $\Phi_f$ pulse is employed to restore the program register flip-flops to their "0" states.

The succeeding $\Phi_1$ pulse is then employed to step the program register and cause the next order to be read out on the program register flip-flops. This order is No. 35 and comprises 110 in the A field and 0110 in the B field. This order is designated I–6 and is employed to advance the store register to the first idle digit slot in the converter register space. This order is transmitted to the order word translator 611 and decoded so that a positive voltage is obtained from the 6–I–6 And circuit of this translator.

The following $\Phi_a$ and $\Phi_b$ pulses are ineffective. With flip-flop 7–I in its "0" state and a positive output voltage from the 6–I–6 And circuit an output is obtained from And circuit 8–27 in response to the succeeding $\Phi_c$ pulse. Positive voltage from the 6–I–6 And circuit is transmitted through the 8–H Or circuit to one input of And circuit 8–27 and positive voltage from the 0 output of the 7–I flip-flop and the $\Phi_c$ pulse are transmitted from And circuit 8–N to the other input of And circuit 8–27. The output of And circuit 8–27 sets flip-flop 7–II in its "1" state and resets flip-flop 10–Φ in its "0" state. Consequently, the succeeding $\Phi_2$ pulse will be transmitted to the signal store register. It also activates the And gates 3–0, 3–1, 3–2 and 3–3 so that the setting of the 5–$C_0$ through 5–$C_3$ flip-flops in accordance with binary 3 described above is now entered in the code slot of the register space of the first converter. The circuits do not respond to the succeeding $\Phi_d$ and $\Phi_e$ pulses. The 5–$C_0$ through 5–$C_3$ flip-flops of the store register are reset to their "0" states in response to the following $\Phi_f$ pulse.

The succeeding $\Phi_1$ pulse then causes the store register to step and read out the next word in the next slot in the No. 1 converter register space in this store. The next slot in this register is assigned to the first digit and if this had been previously received it is stored in this slot. Since it is assumed that this digit has been received but not yet stored in this slot the "not received" code 1101 is stored in the slot. In response to this I–6 order the circuits are arranged to hunt or scan the digit slots in succession until a "not received" code or a 1111 code is found and read out. Under assumed conditions, the code in the next slot will be 1101 so that this code is read out and entered upon the store register flip-flops 5–$C_0$ through 5–$C_3$. The following $\Phi_b$ clock pulse then causes an output to be obtained from the And circuit 8–28. The first input to this And circuit is from And gate 8–6′ which has inputs from And circuit 6–I–6, and flip-flops 5–$C_0$, 5–$C_2$, and 5–$C_3$ in their "1" states which are the ones of the idle code. The output of And circuit 8–6′ is transmitted through the Or circuit 8–K to the upper input of And circuit 8–28. The lower input to the And circuit 8–28 is from And circuit 8–L which in turn has an output due to an input from flip-flop 7–II in its "1" state and the $\Phi_b$ clock pulse. The output of And circuit 8–28 is employed to set 7–I and 7–III flip-flops and flip-flop 10–Φ in its "1" state. The succeeding $\Phi_2$ pulse is transmitted to the program register and causes this register to step or be primed. The succeeding $\Phi_d$ pulse is ineffective and flip-flops 7–I and 7–II are restored to their "0" state in response to the $\Phi_e$ clock pulse. In response to the succeeding $\Phi_f$ pulse flip-flop 7–III is restored to its "0" state and the program register flip-flops also are restored to their "0" states.

The succeeding $\Phi_1$ pulse causes the next order to be read out from the program store. This is Order No. 36 and has 110 stored in the A field and 0010 stored in the B field. This is an I–3 order and is the last order of the B program. This order is employed to gate the output of the 6–W, 6–X, 6–Y, and 6–Z register flip-flops to the input of the store register flip-flops 5–$C_0$ through 5–$C_3$. As described above, the 6–W, 6–X, 6–Y, and 6–Z flip-flops were set, in response to the No. 22 program order, in accordance with the binary code or representation of the first digit transmitted by the subscriber.

The A portion of the order is transmited to the order word translator 611 where it is decoded and a positive voltage is obtained from the 6–I–3 And circuit. Positive voltage from this And circuit then causes the output gates of 6–W, 6–X, 6–Y, and 6–Z flip-flops to become conditioned for transmitting the information on these flip-flops to the register flip-flops 5–$C_0$ through 5–$C_3$.

The register flip-flops 5–$C_0$ through 5–$C_3$ had been set in accordance with the "not received" digit code 1101 prior to this time. Consequently, the 0 output of the 6–W, 6–X and 6–Z are transmitted through the corresponding gate circuits to reset the corresponding flip-flops 5–$C_3$, 5–$C_2$, and 5–$C_0$ when the corresponding flip-flops 6–W, 6–X, 6–Z are in their "0" state. If any of these flip-flops are in their "1" state then the corresponding flip-flops 5–$C_3$, 5–$C_2$, and 5–$C_0$ will remain in their "1" state. Since the 5–$C_1$ flip-flop is in its "0" state the 1 output from the 6–Y flip-flop is gated through the corresponding And circuit to the set input conductor of the 5–$C_1$ flip-flop. If the 6–Y flip-flop is in its "1" state the 5–$C_1$ flip-flop will be correspondingly set in its "1" state. If this 6–Y flip-flop is in its "0" state the 5–$C_1$ flip-flop will remain in its "0" state. Thus the setting of the 6–W, 6–X, 6–Y, and 6–Z flip-flops is transferred to the flip-flops 5–$C_3$ through 5–$C_0$, respectively, in response to the succeeding $\Phi_b$ clock pulse. With the 10–Φ flip-flop in its "1" state the program store is advanced or primed in response to the following $\Phi_2$ clock pulse. The succeeding $\Phi_d$ and $\Phi_e$ pulses are ineffective and $\Phi_f$ pulse causes the program register flip-flops to be reset to their "0" states. The next $\Phi_1$ pulse causes the first order of the C program or sequence or group of orders to be read.

The first order of the C program, Order No. 37, is a J–15 order. The system responds to this order in substantialy the same way as described above when it was idle. Thus, in response to the $\Phi_1$ pulse this order is read out and transmitted to the order word translator 611 where it is decoded. As a result, flip-flops 10–$\Phi$ and 6–W, 6–X, 6–Y and 6–Z, are all restored to their "0" state and flip-flop 7–$V_1$ set in its "1" state in response to the following $\Phi_b$ pulse due to an output from And gate 7–19. With the 10–$\Phi$ flip-flop set in its "0" state the succeeding $\Phi_2$ pulse is transmitted to the signal store and causes the setting on the store register flip-flops 5–$C_0$ through 5–$C_3$ to be recorded in the signal store in the first digit slot. This is the position the store register was left in as described above.

As described above the flip-flops of the store register 5–$C_0$ through 5–$C_3$ have been set at this time in accordance with the first digit of the called subscriber station designation transmitted by the calling subscriber. Consequently, the binary representation of this digit or letter is entered in the first digit space in the first converter register space of the signal store.

In further response to the J–15 order the signal store shown in FIG. 3 is stepped until the sychronizing code 1111 is read out and entered upon the flip-flops 5–$C_0$ through 5–$C_3$. This code indicates that the register space for the No. 2 converter has now been positioned for reading out the information stored in it so that it may be processed and brought up to date. Inasmuch as this register and the converter are in their idle conditions, the circuit responds to the remaining portions of this order and the succeeding orders of the C program in the manner previously described without in any way changing the information stored or recorded in this register space.

The succeeding programs cooperate with the other succeeding register spaces in succession as described.

The next time the No. 1 register space in the signal store is scanned it will be processed by the C program of orders.

The first order of this program is No. 37 as shown in Table D. In this order is a J-15 order having 111 recorded in the A portion and 0001 in the B portion.

The circuits respond to this J–15 order in the manner described above. At this time the converter flip-flop 911 will still be in its "0" state because no new digit signal has been received; also the scan information recorded in the scan slot will be 0000 since this was returned to the "0" state, in response to the previous I–8 Order No. 23 of the B program. Consequently, in response to the No. 38 order which is an F-1 order the 0011 code in the code slot will not match the 0001 of the B portion of this order. As a result the No. 39 order will be employed to control the system. This is a B–0 order and since the 0011 recorded in the code slot does not match the 0000 in the B portion of this order the No. 40 order will be skipped and the No. 41 order employed to control the system. This order advances the program store to the next program.

Thereafter, the various register spaces are scanned in succession by the successive programs in the manner described above. So long as no further signals are received from any subscriber, the information recorded in the various register spaces is not changed.

Assume now for purposes of illustration that a second digit is received from the subscriber which is connected to the first or No. 1 converter.

Assume also for purposes of illustration that this information is received between the time the No. 1 converter register space in the signal store is scanned by the first portion of the B program of orders and the time this register space is scanned by the first portion of the C program of orders.

When this information is received the No. 1 converter flip-flop 911 will be set in its "1" state as described above.

Assume that after this flip-flop 911 has thus been set in its "1" state the first order of the C program which is Order No. 37 in Table D is read out of the program store and entered on the program register flip-flops.

This is a J–15 order and the system responds to the first portion of this order in the manner described above. Thus, this order is transmitted to the order word translator 611 and an output obtained from the 6–J And circuit and the 6–J–14+J–15 And circuit. As a result in response to the $\Phi_b$ pulse, the flip-flop 10–$\Phi$, 8–$R_0$ through 8–$R_3$, 6–W, 6–X, 6–Y and 6–Z are all resorted to their "0" state if they had been in the "1" state and the flip-flop 7–$V_1$ is set in its "1" state. As a result, the signal store is advanced to the synchronizing code 1111, then the signal store is advanced an additional step and the address code read out and entered upon the 5–$C_0$ through 5–$C_3$ flip-flops. This address is then transferred to the address register 811 and then to the address translator 812 so that the No. 1 converter 901 is conditioned to transmit its output from the corresponding multifrequency receiver. This output is transmitted through the And gates of the No. 1 converter 901 and then through the Or gates 1027 through 1034 inclusive to the digit translator 1011 in the manner described above. In addition an output is attained from the S–1 conductor from this No. 1 converter.

The signal store is then again stepped to the scan slot and the signal store flip-flops 5–$C_0$ through 5–$C_3$ first set in accordance with the code 0000 previously recorded in the scan slot. Thereafter the output from the digit translator 1011 is gated to the signal register flip-flops 5–$C_0$ through 5–$C_3$. As a result the binary representation of the second digit transmitted by the calling subscriber will be entered in the scan slot of the circuit register space at this time.

Thereafter the circuits respond to the remaining portion of the J–15 order and the succeeding orders of the C program in a manner described without further changing the information recorded in the register space.

As before the various programs cooperate with the various register spaces in succession until the No. 1 register space again cooperates with the A program. The next time the A program is employed in cooperation with the No. 1 register space the circuits will respond in substantially the same manner as described above when the system is idle. A mismatch will be obtained in response to the No. 2 or C–8 order since 0011 is recorded in the code slot at this time and not 1000.

The next time the No. 1 register space in the signal store is scanned or processed by the B program, the circuits will respond to the first order of this program which is Order No. 19. This is a J–14 order and causes the signal store to be advanced so that the various words or information recorded in the various slots is read out in the store register flip-flops 5–$C_0$ through 5–$C_3$. In this case in response to the No. 20 order which is a B–0 order a mismatch will be obtained since 0000 is not recorded in the scan slot. Instead, the information relative to the second transmitted digit is stored in this scan slot. The circuits thereafter respond as described above with respect to the first digit assuming that the second digit is not a 0. At this time the series of G order Nos. 29, 31 and 33 is again made available to subtract one from the binary representation of three stored in the code slot. In this case, however, only the Order No. 29 which is the first G order is employed because a one was previously recorded in the $C_0$ bit of this code designation as described above. When this one is changed to a zero in response to Order No. 29, one has been subtracted from the three leaving a binary representation of two. Consequently, following G Order Nos. 31 and 33 are not employed to control the operation of the system. Instead Order No. 30 is employed to bypass Order Nos. 31 and 33. Order 30 is an A–3 order which causes the program store to be advanced four steps or four orders to Order No. 34. Order No. 34 which is J–17 will be employed to control the system and since the U flip-flop will again be in its "0" state, the No. 35 order which is an I–6 order will be employed to control the system. In this case, the store is advanced until a "not received" code 1101 is entered upon the C register flip-flops. Inasmuch as the first digit has already been recorded in the first digit slot of this register, the store will step past this digit. When the second digit slot is scanned the "not received" code 1101 will be read out and, as a result, Order No. 36, which is an I–3 order, is employed to control the system. This order causes the representation of the second digit stored on the W, X, Y and Z flip-flops to be entered upon the store register flip-flops 5–$C_0$ through 5–$C_3$. Consequently, the next time the store register is advanced in response to $\Phi_2$ pulse, this binary representation of the second digit will be entered in the second digit slot in the store register. At this time the code stored in the code slot will be 0010 which indicates that the second digit has been received.

The C program will then cooperate with the succeeding register in the same manner as described above, since this register is assumed to be idle. The succeeding idle register spaces will likewise be scanned by the A, B and C programs in succession in the manner described. The first register space which is associated with the first converter will be similarly scanned by the A, B, and C programs since neither the transmitting code 1000 nor the $d_3$ received code 0001 is stored in the code slot. Thus, the first or A program cooperates with the register in the manner described without changing any information stored therein. So long as no additional signals have been received to be stored in this register the scan slot will have stored in it 0000. Consequently, when this register is processed by the B program of orders the information stored in the register will not be changed. When the C program processes this register the system will operate in substantially the same manner as described above when this program cooperated with this register after the first digit had been received. At this time this program will not cause any change in the information recorded in the register.

Assume now that the third digit is received after the first part of the A program cooperates with this first register space but before it is processed by the first part of the B program. When the first order of the B program is read out which is the No. 19 order, this order causes the signal store to be advanced and the synchronizing code read out, the address code read out, and the converter activated so that the output conductors have voltages applied to them representing the digit just transmitted and received from the multifrequency receiver 201. In addition the S–1 conductor will have a voltage applied to it indicating that a received coded digit is awaiting storage. This digit is then written in the scan slot of this regster space.

Then when the next or No. 20 order is read out, this order causes the digit in the scan slot to be read out and entered upon the storage register flip-flops 5–$C_0$ through 5–$C_3$ to be compared with the setting of the flip-flops 5–$B_0$ through 5–$B_3$ of the program register. The flip-flops 5–$B_0$ through 5–$B_3$ are set in accordance with 0000 recorded in the B field of this order, since 0000 is recorded in the B portion of this order while the store register flip-flops 5–$C_0$ through 5–$C_3$ have recorded on them a code representation of the character of the signals just received. As a result no match will be obtained so the setting of the 5–$C_0$ through 5–$C_3$ flip-flops is transferred to the 6–W, 6–X, 6–Y and 6–Z flip-flops for later use. The response of the circuits to these orders is more fully described above and is substantially the same when signals have been received and stored in the scan slot by the first portion of any one of the three programs.

Thereafter, the first two G orders 29 and 31 are employed to reduce the number in the code slot by one, thus leaving a code 0001 stored in this slot indicating that the third digit has been received. Then the U flip-flop is scanned and since this flip-flop is still in its "0" state, the store will be advanced to the third digit slot where the "not received" code 1101 is read out and then the binary representation of the third digit on the 6–W, 6–X, 6–Y and 6–Z flip-flops gated to the flip-flops 5–$C_0$ through 5–$C_3$ and then written into the signal store by the And gates 3–0, 3–1, 3–2 and 3–3 in response to a $\Phi_2$ pulse transmitted to this store register.

Thereafter this register space in the store is processed by the C program, of which the first order designated J–15 is No. 37 order. The system responds to this order in a manner described above.

When the No. 38 order, which is designated F–1 in Table D, is read out upon the program register flip-flops in response to the $\Phi_1$ pulse, this order will be transmitted to the order word translator 611 and translated so that an output voltage will be obtained from the 6–E+F And circuit. This is in response to the 100 recorded in the A field. The B field has the "third digit received" code 0001 recorded in it. At this time the succeeding $\Phi_a$ and $\Phi_b$ pulses are ineffective; however, in response to the $\Phi_c$ pulse, an output is obtained from the And gate 8–27 since positive voltage is applied to the lower input of this And gate from the Or circuits 8–G and 8–H and positive voltage is applied to the upper input from And circuit 8–N as a result of the 7–I flip-flop being in its "0" state and a $\Phi_c$ pulse from the clock circuit. The output from the circuit 8–27 is employed to set 7–II flip-flop in its "1" state and to reset the 10–$\Phi$ flip-flop.

The succeeding $\Phi_2$ pulse is transmitted to the signal store and causes this store to be advanced or primed and the information previously recorded on the store register flip-flops 5–$C_0$ through 5–$C_3$ to be read back into the store. The following $\Phi_d$ and $\Phi_e$ pulses are ineffective and the store register flip-flops 5–$C_0$ through 5–$C_3$ are reset to their "0" states by the $\Phi_f$ pulse.

In response to the next $\Phi_1$ pulse the signal store is advanced and the code word read out of the code slot. This will be 0001 and will be entered upon the flip-flops 5–$C_0$ through 5–$C_3$. The succeeding $\Phi_a$ pulse is ineffective and in response to the succeeding $\Phi_b$ pulse an output is obtained from And gate 8–28. At this time positive voltage is applied to the upper input of this And gate from And gate 6–E+F through Or gates 8–G and 8–K. Positive voltage is applied to the lower input of And gate 8–28 from the And circuit 8–L because positive voltage is applied to it from the 7–II flip-flop in its "1" state and the $\Phi_b$ pulse. The output of And gate 8–28 is employed to set flip-flops 10–$\Phi$, 7–I, and 7–III in their "1" states.

At this time the setting on the 5–$C_0$ through 5–$C_3$ flip-flops which is in accordance with the code representing a binary 1, i.e., 0001, which was read out of the code slot and indicates that the third digit has been received, is compared with the setting of the B flip-flops of the program register. The outputs of these two sets of flip-flops are transmitted to the MATCH circuit 612. Since they are both set to 0001 a match is obtained and a positive voltage is obtained on the M output conductor while no such voltage is obtained on the M' conductor.

As a result all of the inputs to the And circuit 7–38' are positive in response to the succeeding $\Phi_c$ pulse. A positive voltage is obtained from the 6–E+F And circuit. Positive voltage is obtained from the $V_1$ flip-flop which is now set in its "1" state as described above in response to the J–15 order No. 37. Positive voltage is obtained on the M conductor from the match circuit. Positive voltage is obtained from the one output of the 7–I flip-flop which is in its "1" state. At this time positive voltage also is obtained from the $\Phi_c$ pulse from the clock circuit. The output from And gate 7–38' sets flip-flop 7–V in its "1" state. The operation of the 7–V flip-flop at this time disables the controlling And gate 610 for the order word translator so that succeeding orders read out from the program register and entered upon the program register flip-flops are not decoded by the order word translator 611.

With the 10–$\Phi$ flip-flop in its "1" state at this time, the succeeding $\Phi_2$ pulse will be transmitted to the program store and advance or prime this store. The succeeding $\Phi_d$ pulse is ineffective while the $\Phi_e$ pulse causes flip-flops 7–I and 7–II to be restored to their "0" states. The $\Phi_f$ pulse causes 7–III flip-flop to be restored to its "0" state and the program register flip-flops also to be restored to their "0" states.

Then in response to the succeeding $\Phi_1$ pulse the next or No. 39 order is read out but is not translated. Consequently, $\Phi_a$, $\Phi_b$ and $\Phi_c$ pulses are ineffective. The $\Phi_2$ pulse is again transmitted to the program store causing this store to step or advance. The $\Phi_d$ and $\Phi_e$ pulses are ineffective while the $\Phi_f$ pulse causes the program register flip-flops to be restored to their "0" states. Each succeeding set of clock pulses causes the program register to be advanced one step in the manner just described. None of these orders are decoded because the 7–V flip-flop is in its "1" state which prevents transmission of these orders to order word translator 611.

When the program register has been stepped so that Order No. 42 is read out and entered upon the order register flip-flops, the flip-flops 5–$A_0$, 5–$A_1$ and 5–$A_2$ all will be set in their "1" states. The flip-flops 5–$B_0$ through 5–$B_3$ will be set in accordance with the 1000 recorded in the B field of this order. As a result the And circuit 7–10′ will have all its inputs positive in response to the $\Phi_a$ clock pulse. The other inputs are from the "1" outputs of the 5–$A_0$, 5–$A_1$ and 5–$A_2$ flip-flops of the order word register. The output of And circuit 7–10′ causes the flip-flop 7–V to be restored to its "0" state. Consequently, this order is transmitted to the order word translator where it is decoded as a J order with the positive voltage output from the 6–J And circuit. This order is employed to write 1000 in the code slot in the first converter register in the signal store.

This order word as indicated in Table E indicates that the register is conditioned for beginning of transmission of pulses to operate the step-by-step system in response to the multifrequency signals previously received from the subscriber representing the digits or designations of the called station. Thus, with positive voltage from the 6–J And circuit of the order word translator 611 and from flip-flop 5–$B_3$ in its "1" state due to the 1 in the highest denominational order in the B field, as described, an output will be obtained from And gate 5–18′ in response to the following $\Phi_b$ pulse from the clock circuit. As a result the flip-flop 5–$C_3$ is set in its "1" state while flip-flop 5–$C_0$ is reset to its "0" state. As described above, the previous code in the code slot was 0001 indicating that the third digit had been received. Consequently, to change this to a 1000 it is necessary to set the 5–$C_3$ flip-flop in its "1" state and to reset the 5–$C_0$ flip-flop to its "0" state. The circuits do not respond to the following $\Phi_c$ pulse. Then in response to the following $\Phi_2$ pulse the program store is stepped or primed. The system does not respond to the following $\Phi_d$ or $\Phi_e$ pulses; in response to the $\Phi_f$ pulse the program register flip-flops are restored to their "0" states.

In response to the following $\Phi_1$ pulse the next or No. 43 order is read out from the program store and entered upon the order word register flip-flops. This order is the first of a group of orders used for determining the character of the first three digits transmitted by the calling subscriber so that a translation may be obtained to determine how many digits are to be expected. In obtaining the translation the first three digits are not changed or altered in any way and will be later transmitted as will be described presently without change or translation except that they will be in the form of a series of pulses similar to dial pulses which will actuate the step-by-step switches instead of the multifrequency pulses representing the various digits or designations of the called party. The C–1 order thus causes the store to step and then to match the digit in the next slot in the store with the binary representation stored in the B field of the corresponding C order. Thus in response to the first of these orders No. 43 which has 010 recorded in its A field and 0001 recorded in the B field, the system examines the first received digit to determine whether or not this digit is a 1.

Thus, when this order is read out and entered upon the order word register flip-flops, it will be transmitted to the order word translator 611 and decoded thereby so that a positive voltage will be obtained from the 6–C+D And circuit. The system does not respond to the following $\Phi_a$ and $\Phi_b$ pulses. However, in response to $\Phi_c$ pulse all of the inputs to the And circuit 8–27 are positive with flip-flop 7–I in its "0" state. Thus, positive voltage from the 6–C+D And circuit is transmitted through the 8–G and 8–H Or circuits to the lower input of And circuit 8–27. Positive voltage from the output of the 8–N And circuit due to a positive input voltage from the $\Phi_c$ clock pulse and the 7–I flip-flop in its "0" state is applied to the upper input of And circuit 8–27.

The output of the And circuit 8–27 causes the 10–$\Phi$ flip-flop to be set in its "0" state and flip-flop 7–II to be set in its "1" state.

With the flip-flop 10–$\Phi$ in its "0" state the next $\Phi_2$ pulse is transmitted to the signal store with the result that this store is stepped or primed and in addition since the store register flip-flops 5–$C_0$ through 5–$C_3$ are now set in accordance with the binary 1000 this setting is now fully read into the store register in the code slot.

The following $\Phi_d$ and $\Phi_e$ clock pulses do not cause circuits to respond further. The following $\Phi_f$ pulses now cause the flip-flops 5–$C_0$ through 5–$C_3$ to be restored to their "0" states. Then in response to the next succeeding $\Phi_1$ pulse the code in the first digit slot representing the calling signal transmitted by the calling subscriber is read out and entered upon the store register flip-flops 5–$C_0$ through 5–$C_3$. Due to the translation of the digit translator 1011, as described above, this digit is represented by a binary number which is matched to the binary number recorded in the B field of this C–1 order which is Order No. 43. If the first digit is a 1, then a match is obtained and the program store is advanced two steps. If the match is not obtained, then the system advances to the next order.

The translation obtained to determine the number of digits to be expected for the call depends upon the characters or digits of the first three letters or numbers transmitted by the subscriber as shown in the following table F:

TABLE F

| DG. 1 | 2 | 3 | 4 | 5 | 6 | 7 | 8 | 9 | 10 | 11 | |
|---|---|---|---|---|---|---|---|---|---|---|---|
| 0 | | | | | | | | | | | 1 Digit Call |
| 1 | 1 | X | | | | | | | | | 2 Digit Call |
| 1 | 1 | 9 | X | | } Revertive Codes | | | | | | 4 Digit Call |
| 1 | 1 | 8 | X | X | | | | | | | 5 Digit Call |
| A | B | X | X | X | X | X | | | | | 7 Digit Call |
| 1– | A | B | X | X | X | X | X | | | | 8 Digit Call |
| X | 0/1 | X | A | B | X | X | X | X | X | | 10 Digit Call |
| 1– | X | 0/1 | X | A | B | X | X | X | X | X | 11 Digit Call |

Assume first that the first digit is a 1. Under these circumstances a match is obtained. After the store is stepped to the first digit, which is entered upon the 5–$C_0$ through 5–$C_3$ flip-flops as described above, the system does not respond to the succeeding $\Phi_a$ pulse. However, in response to the following $\Phi_b$ pulse an output is obtained from And circuit 8–28 due to positive voltage being applied to its upper input from the 6–C+D And circuit from the order word translator 611 which is transmitted through the Or circuits 8–G and 8–K. Positive voltage is applied to its lower input from And circuit 8–L due to positive voltage being applied to its input from the 7–II flip-flop in its "1" state and $\Phi_b$ clock pulse.

The output from the And circuit 8–28 then causes flip-flop 10–$\Phi$ to be set in its "1" state and flip-flops 7–I and 7–III also to be set in their "1" states.

Then if a match is obtained, as assumed above, an output will be obtained from And circuit 7–43'. At this time positive voltage is applied to the first input of this And circuit from the 6–C+D And circuit. Positive voltage from the 5–$A_0$ flip-flop is also applied to the second input since this flip-flop is in its "0" state. Positive voltage is obtained from the match circuit 612 and is applied to its third input. Positive voltage from flip-flop 7–I in its "1" state is applied to the fourth input and the $\Phi_c$ pulse is applied to the fifth input.

The output from And circuit 7–43' is employed to first set the 7–J flip-flop in its "1" state and then to restore the advance binary counter stages 7–$BC_2$, 7–$BC_3$ and 7–$BC_4$ to their "0" states, thus setting this counter to represent a binary 1. The following $\Phi_2$ pulse is then transmitted to the program store and causes this store to be advanced or primed. This $\Phi_2$ pulse is also applied to And circuit 7–R the output from which is transmitted to the binary counter 710 which in turn causes the advance counter 710 to count down 1 so that the stages are all set in their "0" states. The $\Phi_d$ pulse is ineffective while $\Phi_e$ pulse causes 7–IV flip-flop to be set in its "1" state. In addition, with the 7–III flip-flop in its "1" state flip-flops 7–I and 7–II are reset to their "0" states. The following $\Phi_f$ pulse causes the order word register flip-flops to be restored to their "0" state and causes the 7–III flip-flop to also be restored to its "0" state.

The succeeding $\Phi_1$ pulse causes the next or No. 44 order to be read out and entered upon the order word register flip-flops. However, since the 7–IV flip-flop is in its "1" state, this order is not transmitted to the order word translator and thus is ineffective to control the system at this time. The succeeding $\Phi_2$ pulse is again transmitted to the program register and also to the advance binary counter which causes all the binary counter stages to be set in their "1" states which, in turn, causes the 7–J flip-flop to be reset to its "0" state. The following $\Phi_d$ and $\Phi_e$ pulses are ineffective. However, the succeeding $\Phi_f$ pulse with the 7–J flip-flop in its "0" state causes flip-flop 7–IV to be reset to its "0" state. In addition, the order word register flip-flops are reset to their "0" states.

Then in response to the following $\Phi_1$ pulse the next or No. 45 order is read out from the order word register and entered upon the order word register flip-flops. This order will be transmitted to the order word translator 611 and decoded in the manner described above.

This is another C–1 order and the system responds to this order in the same manner as described above with respect to Order No. 43. This order like Order No. 43 has 0001 recorded in its B field representing a binary 1. In this case the store is again stepped by this order so that the second digit of the call designation will be read out from the second digit slot in the signal store and entered upon the signal store register flip-flops 5–$C_0$ through 5–$C_3$. In all other respects the system responds to this order in the same manner as described above with respect to Order No. 43.

Assume for purposes of illustration that the second digit was also a 1 so that a match will also be obtained at this time. As a result the next order in the program store is skipped so Order No. 47 is next employed to further control the system.

The No. 47 order is a D–8 order with 011 in the A field and 1000 in the B field. This order is similar to the C–1 orders except that the program is stepped one step if a match is obtained or the next order is skipped and the program store stepped two steps if a match is not obtained. The 1000 in the B field is matched against the third digit or symbol of the called stations identification as transmitted by the calling subscriber.

Assume first that the third digit is 8 so that a match is obtained as shown in Table F, which means that the subscriber is transmitting a 5-digit reverting code. If the third digit is an 8, as assumed, then the match would be obtained and no output will be obtained from the And circuit 7–47'. If the third digit is an 8, as assumed, then the program register is stepped and in response to the next $\Phi_1$ pulse Order No. 48 is read out. This is an H–2 order with 101 in the A field and 0010 in the B field indicating that the "end" code 1100 should be written in the digit slot three steps beyond the present signal store position.

This order is decoded by the order word translator 611 and in response to the succeeding $\Phi_a$ and $\Phi_b$ pulses, no action takes place. In response to the $\Phi_c$ pulse an output is obtained from And circuit 8–27 due to the fact that positive voltage is applied to its lower input from positive voltage from the 6–H And circuit of the order word translator 611 through the 8–G and 8–H Or circuits and to the upper input from the 8–N And circuit due to the positive voltage from the 7–I flip-flop in its "0" state and the $\Phi_c$ pulse. As a result the 10–$\Phi$ flip-flop is reset to its "0" state and the 7–II flip-flop set in its "1" state.

Positive voltage is also obtained from And gate 8–24 due to positive voltage from the 6–H And circuit of the order word translator 611 through Or circuit 8–49' and from the 8–N And gate, as described above. Positive voltage from the gate 8–24 sets flip-flop 7–J in its "1" state and in addition activates the input And circuits to the advance binary counter stages 7–$BC_1$ through 7–$BC_4$, thus setting these counter stages to represent the number recorded in the B field of this order. This is 0010 in the Order No. 48 with the result that these binary stages are set to represent the number 2, that is, binary stages 7–$BC_1$, 7–$BC_3$ and 7–$BC_4$ are reset in the "0" states while binary counter stage 7–$BC_2$ remains set to its "1" state.

With the 10–$\Phi$ flip-flop in its "0" state, the next $\Phi_2$ pulse is transmitted to the signal store which causes the third digit to be reread back into this register in the third digit slot and causes this register to be advanced or primed. The $\Phi_2$ pulse is also transmitted to the binary counter through the And gate 7–R since flip-flop J–7 is in its "1" state. As a result, the binary counter stage 7–$BC_1$ is changed from its "0" state to its "1" state and binary counter stage 7–$BC_2$ is changed from its "1" state to its "0" state. The succeeding $\Phi_d$ pulse is ineffective while the $\Phi_e$ pulse causes flip-flop 7–IV to be set in its "1" state. When flip-flop 7–IV is in its "1" state, And circuit 610 can no longer have a positive output voltage so And circuit 6–H cannot have a positive output voltage at this time. The $\Phi_f$ pulse causes the flip-flops 5–$C_0$ through 5–$C_3$ to be restored to their "0" states.

During the next clock cycle, the signal store is advanced one step in the manner described above without the circuits responding further to the "not received" code stored in this slot in the first converter register space in the signal store, which is read out and entered upon the 5–$C_0$ through 5–$C_3$ flip-flops in response to the $\Phi_1$ pulse. Then in response to the $\Phi_2$ pulse this code is restored in this No. 4 digit slot. The next $\Phi_2$ pulse is also transmitted to the advance binary counter 710 and restores all its stages to 0.

The next $\Phi_1$ pulse causes the "not received" code in the No. 5 digit slot to be read out. Then the following $\Phi_2$ pulse causes this code to be restored in this slot and the binary counter counts down 1 more so all its stages are set to 1— as a result the 7–J flip-flop is restored to its "0" state. Then in response to the $\Phi_f$ pulse flip-flop 7–IV is restored to its "0" state. Consequently, an output is again obtained from And circuits 610 and 6–H.

In response to the next succeeding $\Phi_1$ pulse the next "not received" code 1101 is read out from the store register and entered upon the store register flip-flops $5\text{–}C_0$ through $5\text{–}C_3$. The following $\Phi_a$ pulse is ineffective. However, the $\Phi_b$ pulse with positive voltage from the 6–H And circuits of the order word translator 611 and the 7–II flip-flop in its "1" state causes an output to be obtained from the And circuit 8–28. Positive voltage from the And circuit 8–28 is due to the positive voltage from the 6–H And circuit in the order word register 611 through the 8–G and 8–K Or circuits and from And circuit 8–L due to positive voltage from the 7–II flip-flop in its "1" state and the $\Phi_b$ clock pulse. The output from And circuit 8–28 is employed to set the 10–$\Phi$ flip-flop in its "1" state and to set flip-flops 7–I and 7–III in the "1" state.

In addition the flip-flops $5\text{–}C_0$ through $5\text{–}C_3$ are set in accordance with the "not received" code 1101 read out of the No. 6 digit slot in this register space and thus are not set in accordance with 1111, so an output is obtained from inverter 5–6 and transmitted to the And gate 5–10. The second input of this And gate has positive voltage from the 6–H And circuit. The third input has positive voltage from the 7–II flip-flop in its "1" state and the fourth input positive voltage from the $\Phi_b$ clock pulse. As a result the output from And gate 5–10 at this time causes the $5\text{–}C_0$ flip-flop to be reset in its "0" state. Thus when this code now entered upon the flip-flops $5\text{–}C_0$ through $5\text{–}C_3$ is read back into the store register, it will be 1100 instead of 1101. As described, three digits have already been received and then the store register advanced three more digit slots so the third one of these is now changed to the 1100 code indicating the end of the signaling. In other words after the first three digits 118 and two more digits, to be received, the 1100 code is recorded in the sixth slot in the register space of the first converter in the store register, which indicates the end of the expected series of digits.

In response to the $\Phi_c$ pulse following the $\Phi_b$ pulse in response to which the $5\text{–}C_0$ flip-flop was changed from its "1" to its "0" state, flip-flop 7–V is set in its "1" state in response to a positive output from And circuit 7–48′. With the 10–$\Phi$ flip-flop set in its "1" state, the next succeeding $\Phi_2$ pulse is transmitted to the program register and the following $\Phi_d$ pulse is ineffective while the $\Phi_e$ pulse causes 7–I and 7–II to be reset in their "0" states. The following $\Phi_f$ pulse causes the program register flip-flops to be reset to their "0" states, and flip-flip 7–III to be reset in its "0" state.

Thereafter the various orders in the program register will be read out until a 111 code is read out of the A field in the program register in the manner described. Thus, the program register will be advanced to the first order of the A program and the various cycles described herein repeated.

Returning now to the D–8 Order No. 47, which was read out as described above and entered upon the order word register, assume that the third digit is a 9 instead of an 8. Under these circumstances, when this 9 is compared with the 8 in the B field of this order a mismatch will be obtained so that the No. 48 order will be skipped and the No. 49 order read out and entered upon the order word register flip-flops.

This is a B–9 order with 1001 recorded in its B field indicating a 9. The system responds to this B–9 order in the manner described above. Briefly, this order causes the number on the store register flip-flops $5\text{–}C_0$ through $5\text{–}C_3$ to be compared with the number on the flip-flops $5\text{–}B_0$ through $5\text{–}B_3$ of the order word register. Under the assumed conditions these both will be binary 9's so that a match will be obtained and the program register stepped to the next order.

The No. 50 order is an H–1 order and similar to Order No. 48 except that the B portion has a 0001 recorded in it instead of 0010 which causes the signal store to be advanced two steps and then a 1100 written in the fifth digit slot in the first converter register space. Thus, as shown by Table F, the 119 code is a revertive code in which a single additional digit is to be dialed making a total of four digits. Thereafter, the system responds to this H–1 order by causing the program register to advance until 111 is read out of the A field, that is, until the first order of the A program is read out after which the system responds to the various programs in the manner described.

Returning now to Order No. 49 which was a B order with 1001 recorded in its B field and assuming that the third digit dialed was not a 9, then a mismatch is obtained when the B order which is Order No. 49 is read out so that the No. 50 order is skipped and the No. 51 order, read out and employed to control the system. This order has 0000 recorded in its B field. As a result, the signal store is advanced one step and the "not received" code 1101 changed to an end code 1100 thus indicating that only three digits are to be received and they are the ones already received.

Returning now to the No. 43 order which was the first order of the C–1 orders which was employed to determine whether the first digit received was a 1. It is assumed above that this digit was a 1. Assume now that the first digit is not a 1 so that in response to this order a mismatch will be obtained with the result that the system steps to the No. 44 order instead of skipping to the No. 45 order as described above. The No. 44 order is an A–7 order with 000 in the A field and 0111 in the B field which represents the number 7. As a result, in response to this order the program register is stepped eight steps in the manner described above to the Order No. 52 which is a C–1 order with 0001 recorded in the B field and 010 in the A field. In response to this C–1 order the signal store is advanced one slot and the second received digit read out from the second digit slot in the register space of the first converter. If it is assumed that the second digit is not a 1, then a mismatch will be obtained so that the program register is stepped to the next or the No. 53 order which is a B–10 order with 001 in the A field and 1010 in the B field which represents the number 10. This number 1010 is then matched with the second digit received. Assume that this digit is not a 0 so that a mismatch is again obtained. As a result the succeeding No. 54 order is skipped and the No. 55 order read out. Order 55 is an H–5 order with 101 in the A field and 0101 in the B field which represents the number 5. Thus, the store register is stepped six steps and the "not received" code 1101 there changed to the end-of-calling code 1100. As indicated in Table F, this code indicates that seven digits are to be expected: the first digit, examined by Order No. 43; the second digit, examined by Order Nos. 52 and 53; the third digit, not examined in the present case; and four additional digits yet to be received.

Returning now to Order No. 43 and assuming that the first dialed digit is not a 1, the program register will be stepped to the No. 44 order, as described above, and then to the No. 52 order. If it is assumed that the second digit is a 1 instead of not being a 1 as assumed above, then in response to this No. 52 order which is a C–1 order, a match will be obtained so that the next Order No. 53 will be skipped and Order No. 54 read out and entered upon the order word register. This order is an H–8 order similar to the other H orders and has 101 recorded in its A field and 1000 recorded in the B field which represents the number 8, thus directing the equipment to cause the store to be advanced nine steps. Nine steps beyond the second digit slot will advance the store to the eleventh or last digit slot of the register space, where the "not received" code 1101 is changed to the "end-of-dialing" code 1100. A first digit that is neither a 0 nor a 1 followed by a second digit that is a 0 or a 1 characterizes the code for a ten-digit call, as shown in Table F. Accordingly, provision is made for the seven digits expected in addition to the three already received.

Returning to Order No. 52 and assuming that the second digit is not a 1, then in response to this code a mismatch will be obtained instead of a match with the result that the program store is stepped to the No. 53 order. This B–10 order matches the second digit with the 1010 code in the B field which represents the number 10 or a dialed 0. If it is assumed that this digit is a 0, then the match is obtained and the program store stepped to read out Order No. 54 with the result that the store is stepped nine steps, as described above, and the "end-of-dialing" code again substituted for the "not received" code 1101. This is again one of the codes which indicates a ten-digit call when the first digit is neither a 1 nor a 0 and the second digit is a 0, as shown in Table F.

Returning again to Order No. 43 and assuming that the first digit is a 1, then a match is obtained and the next order skipped and Order No. 45 read out. This is a C–1 order and causes the second digit to be matched with 0001 representing the number 1 recorded in the B field of this order. It is now assumed that this second digit is not a 1; then the next Order No. 46, an A–5 order, is read out which causes the program register to be advanced six steps to the No. 52 order, as described above. Assuming now that the third digit is a 1, then a match will be obtained with the No. 52 order and the next order skipped whereupon Order No. 54 is read out. If it is instead assumed that the third digit is not a 1, then in response to the No. 52 order a match will not be obtained so that Order No. 53 will be employed to control the system. This is a B–10 order and causes the third digit to be matched with the 1010 recorded in the B field of this order. Thus if this third digit is a 0 a match will be obtained whereupon the program register is stepped to the next or No. 54 order. As a result when the No. 54 order, H–8, is read out the store register is advanced nine steps which brings it to the first slot in the next register space. Thus the advance of the register is stopped without changing any of the "not received" codes in the digit slots of the first register space. With a 1 as a first digit and a second digit not a 1 and the third digit either a 1 or a 0, the code indicates an eleven-digit call, as shown in Table F, so that all of the digit slots in the register space are available to record the various digits to be transmitted by the calling subscriber.

Again, assuming that the first digit is a 1 so that a match is obtained in response to the No. 43 order whereupon the No. 45 order is employed to control the system and assuming that no match is obtained in response to this order indicating that the second digit was not a 1, the next or No. 46 order is read out, as described above, whereupon the program register is advanced to the No. 52 order. Assuming that the third digit is not a 1 then a mismatch will again be obtained and the program register advanced to the No. 53 order. At this time if the No. 3 digit is matched against the 1010 recorded in the B field of this order, and assuming that the third digit is not a 0, then a mismatch will be obtained and the program register advanced to the No. 55 order. This H–5 order causes the store register to advance six steps and the 1101 stored in this digit slot to be changed to a 1100. Thus this code indicates an eight-digit call and the end or completion code 1100 is written in the ninth digit slot, there being three digits already recorded in the first three slots and the store regiser advanced six more slots in response to this No. 55 H–5 order in the manner described above.

For the eleven-digit call, where the store has been advanced to the first slot in the next register space, the store register will be in position for processing by the next program. For other types of calls, where the store has not been advanced to this position but remains at one of the digit slots where the translation of the first three digits indicates that a fewer number of digits are to be expected, then in response to the first code of the A program the store is advanced to the synchronizing code in the first slot in the next register space in the manner described herein. Because all the operations of the C program described above terminate in orders of the "H" type, the program store is automatically advanced in each case to the next following "J" order, which will be J–14, the No. 1 order of the A program.

Thereafter the various programs continue to scan the various register spaces in the store register in the manner described above if these register spaces and associated converters remain idle. When they become busy they are processed in the manner described above with respect to the first register space.

This No. 1 register space now has had the 1000 code entered in the code slot indicating that this register is ready for transmission. This register has also been conditioned so that the end code has been inserted in the proper digit slot for calls having from three to ten digits. For calls having eleven digits no such code is required as will be presently described.

The next time this storage register space assigned to the No. 1 converter is processed by any of the programs A, B or C it will be processed by the A program and since the send code of 1000 is stored in the code slot the A program will cause the outpulsing of the dial pulses to start.

Thus, as described above, the first order or code in the A program is designated J–14. This order, as described above, causes the signal store to be advanced until 1111 is read out of the signal store and entered upon the flip-flops 5–$C_0$ through 5–$C_3$. At this time the signal store will have been advanced to the first or synchronizing slot and it is now assumed that this code will be from the register space in this store assigned to the No. 1 converter. When this code is read out, the signal store is advanced one more step to the address code designating the No. 1 converter and register space. This code is read out and entered upon the 5–$C_0$ through 5–$C_3$ flip-flops. Prior to this time these flip-flops were all reset to the "0" state in the manner described above.

After the address code is read out and entered upon these flip-flops this information is then transferred from the 5–$C_0$ through 5–$C_3$ flip-flops to the address register flip-flops 8–$R_0$ through 8–$R_3$ thus storing on these flip-flops the address or designation of the No. 1 register space to be processed. The signal store is then stepped one more step, at which time it will read out the information in the next slot. If another signal from the subscriber has not been received, then the 911 flip-flop will be in its "0" state so that a positive output will not be obtained from And gate 9–S. Consequently 0000 will remain recorded in the scan slot. If, however, a signal from the subscriber has been received since this register space was processed by the C program, then the output of the digit translator 1011 will be gated to the 5–$C_0$ through 5–$C_3$ flip-flops so that when the store is again advanced, the character or binary code of this digit received from the subscriber will be entered in the scan slot of the converter register space No. 1 in the manner described above.

The program store is then advanced and the next program order read out and entered upon the program register flip-flops $A_0$ through $A_2$ and $B_0$ through $B_3$.

At this time the 7–IV and 7–V flip-flops will be in their "0" states so that this order will be transmitted to the order word translator 611 and translated or decoded. As shown in Table D, the second word or order in this program is a C–8 order having 010 stored in the A portion and 1000 stored in the B portion. This order causes the 10–Φ flip-flop to be reset in its "0" state so that during the succeeding clock cycle the signal store will be advanced and the information store in the code slot, which is 1000, will be read out and entered upon the flip-flops 5–$C_0$ through 5–$C_3$. Thereafter, in response to the $\Phi_c$ clock pulse, a match will be obtained from the match circuit when the information stored on the flip-flops 5–$C_0$ through 5–$C_3$ is matched with the B portion of the order which is entered upon the order word register flip-flops 5–$B_0$ through 5–$B_3$. Since 1000 is entered on both sets of flip-flops at this time a match will be obtained and positive voltage applied to the M conductor.

In the above descriptions of the A program a match was not obtained because it was assumed that the register space was not in condition to start sending. In accordance with the above description, the next or No. 3 order of the program was then read out. However, when a match is obtained and as a result positive voltage is applied to the M conductor an output is also obtained from And circuit 7–43′ since the $A_0$ flip-flop is in its "0" state because a "0" is recorded in the units place in the A portion of this order. Likewise, the 7–I flip-flop has been set in its "1" state in the manner described above so that an output will be obtained from And circuit 7–43′ in response to the $\Phi_c$ clock pulse. The output from this And circuit sets the 7–J flip-flop to its "1" state and also the advance binary counter so that the next or succeeding No. 3 order of the A program will be skipped. In skipping this order it is read out and entered upon the program register flip-flops but is not transmitted to the order word translator 611. The program store is advanced so that the next No. 4 order will be read out and entered on the order word flip-flops. This order is designated I–4 and comprises 110 in the A portion and 0100 in the B portion. The function of the I–4 order is to advance the signal store to the first digit slot containing some word other than all zeros; i.e., the first digit slot containing some portion of a digit requiring transmission. This order is read out and entered upon these flip-flops in response to the $\Phi_1$ clock pulse. Since the 7–IV flip-flop was restored to its "0" state in response to a previous $\Phi_f$ clock pulse, and flip-flop 7–V is in its "0" state, this order is transmitted to the order word translator gate circuits. Then, in response to the succeeding $\Phi_c$ pulse and in response to an output from the 6–I–4 And gate of the order word register 611, and since the 7–I flip-flop is in its "0" state, an output will be obtained from And circuit 8–27 due to positive voltage from the 6–I–4 And circuit through Or circuit 8–H to one input of And circuit 8–27. In response to a positive voltage from the "0" output of the 7–I flip-flop and $\Phi_c$ pulse, an output will be obtained from And circuit 8–N and applied to the other input of And circuit 8–27. As a result the 10–Φ flip-flop is reset to its "0" state and the 7–II flip-flop set in its "1" state.

With the 10–Φ flip-flop set in its "0" state, the next cycle of the clock pulse will be transmitted to the signal store and cause it to advance and read out the information stored in the next slot. This information will represent the first digit transmitted by multifrequency signals from the subscriber. This digit is represented by the corresponding binary number notation or code.

With a positive output from the 6–I–4 And gate and an output obtained from Or circuit 5–2 in response to a digit other than all zeros on the signal store register flip-flops 5–$C_0$ through 5–$C_3$, an output will be obtained from the And circuit 8–20 which is transmitted through the Or gate 8–K to one of the inputs of the And gate 8–28. A positive voltage is applied to the other input from the output of the 8–L And gate due to positive input from the one output of 7–II flip-flop and in response to the $\Phi_b$ clock pulse. As a result, flip-flop 10–Φ is set in its "1" state and flip-flops 7–I and 7–III are set in their "1" states. Consequently, the next $\Phi_2$ pulse will be transmitted to the program or order word store. In response to the $\Phi_e$ pulse, flip-flops 7–I and 7–II are reset to their "0" states and in response to the $\Phi_f$ outpulse the 7–III flip-flop is reset to its "0" state. In addition, the I–4 order entered upon the order word register flip-flops is erased and these flip-flops restored to their "0" states. Consequently, in response to the next succeeding $\Phi_1$ clock pulse, the program store is advanced and the next, or No. 5, order read out and entered upon the program or order word register flip-flops.

The No. 5 order is a B–13 order with 001 recorded in the A portion and 1101 recorded in the B portion. In response to this order, the information previously read out from the signal store and entered upon the flip-flops 5–$C_0$ through 5–$C_3$ is compared with the B portion of the order entered upon the 5–$B_0$ through 5–$B_3$ flip-flops. Thus, the information read out and stored on the flip-flops 5–$C_0$ through 5–$C_3$ is compared with the 1101 code which is the code for a digit not received. Inasmuch as the first digit has been received and stored in the first storage slot for received digits, the code representing this digit will be other than 1101. This code 1101 represents a binary 13 which is above 10, which is the maximum value a digit may have as received from a calling subscriber.

As a result, a match is not obtained at this time so that positive voltage will not be obtained on the M conductor from the match circuit. Instead, positive voltage will be obtained from the M′ conductor from the match circuit and cause an output to be obtained from the And circuit 7–24′ in the manner as described above in response to the succeeding $\Phi_b$ pulse.

The positive output from the And circuit 7–24′ causes the next order to be skipped since the 7–J flip-flop is set in its "1" state, and the advance binary counter 710 comprising the binary counter stages 7–$BC_1$ through 7–$BC_4$ is set to represent "1." Consequently, in response to the succeeding clock cycle the following, or No. 6 order, of the A program is stepped over and is not transmitted to the order word translator 611 because the flip-flop 7–IV was set in its "1" state in response to the previous $\Phi_e$ pulse with the 7–J flip-flop in its "1" state. However, the 7–J flip-flop and flip-flop 7–IV are restored to their "0" states during the clock cycle so that upon the reading out of the next program order, which is Order No. 7, this order will be transmitted to the order word translator 611 and translated or decoded thereby.

The No. 7 order is designated I–1 in Table D and is employed to transmit one pulse from the converter to the step-by-step system through converter finder 1060, trunk finder 1050 and converter trunk 103 to the first selector 104. This first selector responds to the pulses representing the first digit while succeeding selectors in the step-by-step system respond to succeeding pulses representing the suceeding digits in the usual manner.

In response to this order a positive output voltage is obtained from the 6–I–1+I–2 And gate and from the 5–$B_0$ flip-flop of the program register in its "0" state; further, in response to a positive $\Phi_b$ clock pulse, a positive output is obtained from the And circuit 9–7′. At this time, as described above, the address of this register space, namely "1," has been entered upon the 8–$R_0$ through 8–$R_3$ flip-flops of the R registering circuit and translated by the address translator 812 so that the And gates of the No. 1 converter are partially conditioned for operation. Consequently, when a positive output voltage is obtained from And circuit 9–7′ the monopulser 9–M will be operated to its "1" state. The monopulser 9–M is a monostable circuit which is normally stable in its "0" state. When it is operated to its "1" state it will remain in its "1" state for a predetermined interval of time and then automatically returns to its "0" state. During the time this monopulser is in its "1" state, a pulse will be transmitted over the Send conductor which causes an output pulse to be transmitted to actuate the connected step-by-step equipment as described above. The length of the pulse is determined by the time the monopulser stays in its "1" state and this, in turn, is controlled by the electrical characteristics of the monopulser circuit so that the pulse will be of the proper length or time duration to properly actuate the step-by-step switches and equipment.

The Military Standardization Handbook Selected Semiconductor Circuits MIL–HDBK–215 dated June 15, 1960 by the Department of Defense shows exemplary monostable multivibrator circuits S–14, 6–16, and 6–17 suitable for use in combination with the circuits described herein.

Since the 10–Φ flip-flop is still in its "1" state the following $\Phi_2$ clock pulse is transmitted to the program store and primes this store. The next $\Phi_f$ pulse restores the order word flip-flops to their "0" state.

The following $\Phi_1$ clock pulse then causes the next or No. 8 order to be read out of the program store shown in FIG. 4.

This No. 8 order is the first of a series of G Order Nos. 8, 10, 12 and 14. These orders are followed by A Order Nos. 9, 11, 13 and 15. This series of G and A orders is similar to the series of G and A Order Nos. 29 through 33 in the B program. Both series of orders are for the purpose of subtracting "1" from a binary number entered upon the signal store register flip-flops 5–$C_0$ through 5–$C_3$.

As described above with reference to the series in the B program, each of the binary bits is individually examined starting with the bit of least significance or denominational order, that is, the $C_0$ bit. These bits are examined one at a time in succession and changed. If the bit standing on the particular flip-flop is a "0," it is changed to a "1," the following A order is skipped, and the next bit is changed by the next G order. So long as the bits in ascending order are all "0," the above process is repeated. When a "1" is found on one of the flip-flops 5–$C_0$ through 5–$C_3$, it is changed to a "0" and then the following A order employed to advance the program register to the next program. In this fashion "1" is subtracted from the value of the digit stored on the flip-flops 5–$C_0$ through 5–$C_3$. Then, when the signal store register is again advanced, the value of the digit is regenerated and again recorded in the particular digit slot of the signal store. At this time this digit will have a value of "1" less than previously.

Thus, the Order No. 8 is a G–14 order with 101 recorded in the A portion and 1110 recorded in the B portion. The "0" in the last position indicates that the $C_0$ bit will be examined and changed. If this bit is a "0" then it will be changed to a "1" by setting the 5–$C_0$ flip-flop to its "1" state and, in addition, No. 9 order will be skipped and the succeeding No. 10 order read out and entered upon the program register flip-flops. This order has 101 recorded in its A portion and 1101 recorded in its B portion. The "0" in the $B_1$ position now directs the equipment to examine the 5–$C_1$ flip-flop. If this should be another "0," it will be changed to a "1" and the succeeding A–7 Order No. 11 skipped. The above cycle will be repeated until a "1" is encountered on some one of the flip-flops 5–$C_0$ through 5–$C_3$. A "1" will be recorded on some one of these flip-flops because, in response to the No. 4 order, I–4, the signal store register was advanced to a slot not having 0000 recorded in it. Assume, for example, that when the No. 8 order is read out and entered upon the program register, as described above, the 5–$C_0$ flip-flop will be set in its "1" state. As a result, in response to this No. 8 order in combination with the operation of the various And gates of the Or circuit 613 as described above with reference to the B program, this "1" will be changed to a "0." In addition, the program register will be advanced one step and cause the next or No. 9 order to be read out of the program register and entered upon the program register flip-flops. This order will be translated by the order word translator 611.

Order No. 9 is designated A–6 in Table D and has 000 recorded in its A portion and 0110 recorded in its B portion. Thus, the B portion is the binary representation of the number 6 which is entered upon the advance binary counter stages 7–$BC_1$ through 7–$BC_4$, as described above, and causes the program register to be advanced seven steps to the No. 16 order. This order is designated I–7 and has 110 recorded in its A portion and 1000 recorded in its B portion.

In response to this order the setting of the flip-flops 5–$C_0$ through 5–$C_3$ is checked to determine whether or not they are all set in their "0" states. Assume that a digit greater than "1" had been transmitted by the subscriber as the first digit since this is the digit assumed to be in process of being transmitted. Consequently, after "1" has been substracted from the value of this digit it still will not be "0" indicating that additional pulses must be transmitted before this digit is fully transmitted. As a result, the flip-flops 5–$C_0$ through 5–$C_3$ which have now had a "1" subtracted by the Order No. 8 in the manner described above, will not all be in their "0" states. Consequently, an output will be obtained from Or gate 5–2. This output is transmitted to the And gate 7–15. This, together with positive voltage from the 6–I–7 And gate and the $\Phi_b$ pulse from the clock circuit, causes an output to be obtained from this gate 7–15. As a result, flip-flop 7–V is set in its "1" state and the program store stepped to the next order. Since flip-flop 7–V is in its "1" state no further orders will be translated by the order word translator until the program store is stepped to one having 111 recorded in its A field. Order No. 19 is the first order of the B program and its has 111 recorded in its A portion. As described above, with 111 recorded in the A portion of this order, an output is obtained from the And circuit 7–10′ in response to the next $\Phi_a$ clock pulse thus causing flip-flop 7–V to be reset in its "0" state. Consequently, this No. 19 order will be transmitted to the translator circuit 611. Thereafter, this order and the succeeding orders of the B program are employed in combination with the information stored in the next converter register space in the signal store register in the manner described herein.

Following the processing of the next converter space in the signal store by the B program, the C program processes the succeeding register. The operation of the various circuits in response to these programs is similar to that described above under the varying conditions of received pulses.

During these succeeding cycles of operation of the A, B and C program, as described above, additional signals may be received from the subscriber and stored in the various digit slots in the No. 1 converter space in the signal store register in the manner described above for the reception of the first three digits. The receiving and storing of such information in the scan slot is in response to the J–14 order in the A and B programs or the J–15 order in the C program. The storing of these digits in the proper digit slot is under conrtol of the B program in the manner described above.

The sending of the pulses by any of the converters from the corresponding information stored in the corresponding converter register space in the signal store may be substantially simultaneous with the receipt of other signals from the subscriber which are stored in the proper register spaces in the manner described above. In other words, the sending from any given register space will be controlled by the A program while the reception of any signals is by the first orders of each of the three programs and the transfer of this information to the proper digit space is controlled by the B program.

Thus, each time the A program is employed in combination with the first converter space in the signal store register under the assumed conditions a pulse will be transmitted or other transmitting operations performed as will be described. As described above, this A program will cooperate with the No. 1 converter space in the signal store approximately every one-tenth of a second. Thus, a pulse will be transmitted every one-tenth of a second or at the rate of ten pulses per second which is a proper and desirable speed for operating the step-by-step switches. As described above, the length of the pulses will be determined by the constants of the monopulser 9–M. Thus assume that following the transmission of the first pulse, as described above, the A program again cooperates with the No. 1 register space in the manner described above. The first order is J–14 which is employed to reset numerous flip-flops and to read out the address of the first converter and translate it so that this converter will be conditioned to respond to received signals in the manner described. The second, or C order then examines the code in the code slot to see if this is a send code. Under the assumed conditions this code is 1000 which is the send code so that the No. 3 order is skipped and the I–4 No. 4 order employed to control the system. In response to this order the signal store register is advanced to the first digit slot since this first digit has not been completely transmitted. As a result, a "1" is recorded in some one of the digits of this binary representation of the first number received. Consequently, the advance of the signal store will be stopped at this time and the No. 5 order read out from the program store. This is a B order which is employed to insure that the information stored in this slot is not a 1101 which is the code representing the condition wherein this particular digit has not been received from the calling subscriber's station. Since this is the first digit and the two following digits have already been received, in response to the B–13 order a match will not be obtained. Consequently, the succeeding A–12 order No. 6 is skipped and the I–1 No. 7 order again employed to control the system. As described above, in response to this order the monopulser 9–M is actuated so that another pulse of the first digit is transmitted. Thereafter the program store is advanced and the No. 8 order, which is the first of the G orders, employed to subtract "1" from the value representing this digit. Above it was assumed that the $C_0$ bit was a "1" and this was changed to a "0" in response to the transmission of the first pulse. Now, in response to this same No. 8, or G–14 order, this "0" is changed to a "1." In addition, since a "0" was read out, the output from the Or circuit 613 will be on the Or′ conductor and as a result the next succeeding No. 9 or A–6 order will be skipped instead of being employed to further control the operation of the system as described above. The next, or No. 10, order is also a G order. In response to this order the $C_1$ bit is changed. If this bit is a "1" it will be changed to a "0" and the program store advanced and the next order which is an A order read out. If this bit is a "0" then the No. 11 order will be skipped and not acted upon and the program store advanced to the No. 12 order which is another G order. The above cycle of operations will then be repeated until a "1" is found and recorded on some of the flip-flops 5–$C_0$ through 5–$C_3$.

Assume for purposes of illustration, that the $C_1$ bit is a "1." As a result, the No. 11 or A order is read out and translated. This order has all zeros recorded in its A portion and has 0111 recorded in its B portion Thus the B portion is the binary representation of the No. 7 so the program will be stepped eight steps in response to this order which advances the program to the first order of the B program.

Thereafter, the above cycles of operation of the system are repeated wherein the system responds to the received multifrequency signals in the manner described above and converts them into dial pulses for the operation of the step-by-step switches and equipment. Each time the A program cooperates with the No. 1 converter space in the signal store register another pulse will be transmitted and the binary number stored in the first digit slot in this register reduced by one.

When this number is reduced to 0000 it indicates that the proper number of pulses representing the first digit have been transmitted to the step-by-step equipment which thereupon responds to these pulses and takes the required number of steps in the usual manner. At this time in response to the No. 8 order a "1" will have been previously recorded on the 5–$C_0$ flip-flop with the result that this flip-flop will be reset to its "0" state in response to this order and positive voltage will be obtained from the Or conductor from the Or circuit 613. As a result, the program register is advanced and the No. 9 order read out, as described above. This order causes the program register to be advanced to the No. 16 order which is an I–7 order. This order then examines the setting of the signal store register flip-flops 5–$C_0$ through 5–$C_3$. Since this was the last pulse and since a "1" was subtracted from the number set on these flip-flops they will now all be in their "0" states and, as a result, a match will be obtained from the match circuit. Consequently, a positive voltage will be obtained on the M conductor at this time. As a result, the program register will be advanced to the No. 17 order which is an I–10 order.

This I–10 order has 110 recorded in the A portion and 1100 recorded in the B portion. This order is employed to test the information stored in the next slot in the signal store register to determine whether a synchronizing code or an end-of-calling code is stored in the next slot or whether the next digit is stored in this slot. If an end-of-calling code is recorded in the next slot it will be 1100; if a synchronizing code it will be 1111. If the digit has not been received, then the code will be 1101. Otherwise, the code stored in this slot will represent the binary code of the next received digit.

Thus, in response to the I–10 code, an output is obtained from the 6–I–10 And gate so in response to the $\Phi_c$ clock pulse an output is obtained from And circuit 8–27 which in turn resets the 10–Φ flip-flop to its "0" state and sets flip-flop 7–II to its "1" state. Then, the signal store is stepped and the information recorded in the next slot then read out and entered upon the flip-flops 5–$C_0$ through 5–$C_3$. If flip-flops 5–$C_3$ and 5–$C_2$ are in their "1" states and 5–$C_0$ is in its "0" state, then an end-of-calling code is recorded in this slot. If flip-flops 5–$C_3$ and 5–$C_1$ are all in their "1" states, then the synchronizing code is recorded in this slot. If neither of these codes are recorded in the slot, then the information recorded in the slot either represents the next received digit or the "not received" code. In either event, it is desired to start an interdigital timing operation.

Thus, during the transmission of the previous set of pulses representing the first digit, these pulses were transmitted at the rate of ten pulses per second, as pointed out above, one pulse for each cycle of operation of the A program in combination with the first converter register space. After this series of pulses has been completely transmitted representing this first digit, it is necessary to provide an interdigital pause or line closure which is approximately six-tenths of a second in duration, in the exemplary embodiment of this invention described herein. On the other hand, if this is an end of call, then it is desired to reset the entire first converter register space in the signal store and condition its operation in response to another call.

Since it has been assumed that the first digit of a multi-digit call has been transmitted, the information recorded in the next slot will be the value of the next digit. Consequently, an output is not obtained from And circuit 8–17′. This And gate has inputs from the "1" output of flip-flops 5–$C_3$ and 5–$C_2$ and the "0" output of flip-flop 5–$C_0$. Likewise an output is not obtained from And gate 5—5 since inputs to this gate are from the "1" outputs from the flip-flops 5–$C_3$, 5–$C_2$, 5–$C_1$ and 5–$C_0$.

As a result no output is obtained from the Or circuit 8–35 so that no output will be sent to the And gate 8–31. However, with no output from And gate 8–35, an output will be obtained from the inverter 8–35′ and transmitted to the And circuit 8–32. This And circuit has an input from the 6–I–10 And circuit of the order word translator 611 and an output from the 8–L And gate which has an output at this time in response to the positive voltage from the "1" output from the 7–II flip-flop and the $\Phi_b$ clock pulse. The output of And gate 8–32 is employed to set the 6–X flip-flop in its "1" state. It will be recalled that the 6–X flop-flop is normally set in its "0" state in response to an output from either gates 7–18 or 7–19 in the manner described above in response to the J–14 or J–15 orders which are the first orders of each of the programs A, B or C.

An output is also obtained from And gate 8–28 at this time due to positive voltage from the 6–I–10 And gate of the order word translator 611 which is transmitted through the Or gates 8–G and 8–K to the upper input of And gate 8–28. The lower input to this And gate has positive voltage applied to it at this time from the And gate 8–L in the manner described above. As a result flip-flops 10–Φ, 7–I and 7–III are set in their "1" state in response to the $\Phi_b$ clock pulse.

With the flip-flop 10–Φ in its "1" state the next series of clock pulses will be employed to advance the program store. However, the succeeding $\Phi_e$ pulse causes flip-flops 7–I and 7–II to be restored to their "0" states and the succeeding $\Phi_f$ pulse causes the 7–III flip-flop to be set in its "0" state. In addition, the program register flip-flops are also reset to their "0" states.

The next order is No. 18 and is designated I–5. This has 110 recorded in its A portion and 0101 recorded in its B portion. This order is entered upon the program register flip-flops and translated by the order word translator 611 which causes a positive voltage output to be obtained from the 6–I–5 And gate. Thus, in response to the succeeding $\Phi_c$ pulse the 10–Φ flip-flop is reset to its "0" state and 7–II flip-flop set to its "1" state. As a result, during succeeding clock cycles the signal store register is advanced one step. The information read out on each step is entered upon the signal store register flip-flops and then rewritten back in the signal store in the manner described above.

When the synchronizing code 1111 is read out, an output will be obtained from the 5—5 And circuit. As a result, with a positive voltage from the And gate 5—5, positive voltage from the 6–I–5 And circuit, positive voltage from the "1" output of the 6–X flip-flop and a positive output from the 8–L And gate in response to positive voltage on the "1" output of the 7–II flip-flop and the $\Phi_b$ pulse, an output is obtained from the And gate 8–30. This output voltage causes a "1" to be written in the signal store at points 3–E and 3–F. These points are in the $C_1$ and $C_2$ bit spaces and, is indicated in FIG. 3, these ones will be written in the code slot. As described above, the signal store has been advanced to the next synchronizing code which is the synchronizing code of the No. 2 converter register space has been read out. With the ten intervening slots between the position of the last digit slot of the first register space in the signal store at this time and positions 3–E and 3–F, as indicated in FIG. 3, "1" will be written in the code slot of the first register space in positions $C_1$ and $C_2$. As described above, 1000 had previously been written in this code slot so that now the code 1110 will be written in this code slot. This is the first of the interdigital timing codes, as shown in Table E.

In addition, an output will be obtained from And gate 8–22 at this time due to a positive voltage from gate 5—5, positive voltage from the "1" output from the 6–X flip-flop in the 6–W, 6–X, 6–Y, 6–Z register and positive voltage from the 6–I–5 And circuit. This positive voltage from And gate 8–22 is transmitted through the Or gate 8–K to the upper input of And gate 8–28. Positive voltage is obtained on the lower input of this And gate from the output of the And gate 8–L in response to positive voltage from the "1" output of the 7–II flip-flop and the $\Phi_b$ clock pulse. As a result, the flip-flops 10–Φ, 7–I and 7–III are set in their "1" states. Then, during the succeeding $\Phi_e$ clock pulse, with flip-flop 7–III in its state, flip-flops 7–I and 7–II are reset to their "0" states and in response to the succeeding $\Phi_f$ clock pulse 7–III flip-flop is reset to its "0" state. The succeeding clock cycles are then employed in combination with the B program of orders which operate in combination with the information stored in the succeeding or No. 2 converter register space in the signal store.

On succeeding cycles of the A program, no pulses will be transmitted due to the information stored in this succeeding digit space in the No. 1 converter register space because the code slot will not have 1000 recorded in it. Instead, each time that the B program operates in combination with the No. 1 converter storage space in the signal store, the binary number stored in the code slot will be reduced by 1 until the code slot has 1000 again recorded in it. As indicated in Table E, it will take six cycles of the B program to reduce the number in the code slot from 1110, which is binary 14, to 1000, which is binary 8. Since it takes one-tenth of a second for each cycle, it will be six-tenths of a second until the send code is stored in the code slot which will condition the register for transmission of the first pulse of the second digit.

Briefly, as indicated in FIG. 12, each time the B program operates in combination with the No. 1 converter space in the signal store register, the No. 19 and No. 20 orders are employed to determine whether any information is to be stored or is stored in the scan slot. If no information is stored in this slot, then the Order No. 21 is employed to advance the program store to Order No. 26 which examines the code slot and finds that a "1" is recorded for the $C_3$ bit so that the flip-flop 7–U is set in its "1" state and program store advanced to the No. 28 order designated J–16, which examines the last three bits of the code stored in the code slot. A "1" will be recorded in one or more of these bits during the interdigital timing interval, as indicated in Table E, with the result that a match will not be obtained so that the program is advanced to the series of G and A orders which reduce the binary number stored in the code slot by one in the manner described above.

Alternatively, if an additional digit has been recorded in the scan slot, then in response to the No. 20 order, a match will not be obtained so that the program store is advanced to the No. 22 order which is designated I–2 and then to No. 23 order. The No. 23 order determines whether or not the digit in the scan is a "0" and, if not, then no match is obtained. If this is a "0" then the program is advanced to the No. 24 order but since an idle code is not recorded in the code slot, no match will be obtained. Thus, in both of these cases, the program will be advanced to the No. 28 order J–16 and since the last three digits in the code slot are not zeros, the program register is advanced to the No. 29 order which causes, as before, a 1 to be subtracted from the binary notation in the code slot thus counting the interdigital time interval. Order No. 34 causes an examination of the flip-flop 7–U to determine whether the counting procedure just completed is part of interdigital timing or initial digit counting as described above; if the latter, Orders No. 35 and 36 would accomplish placement of the digit information in a digit slot as described above.

At the end of the interdigital timing, the send code will again be recorded in the code slot whereupon the A program during successive cycles when this program cooperates with the No. 1 register space in the signal store will cause pulses to be transmitted representing the next digit. At the end of this digit another interdigital interval will be timed in the manner described above. Thus, the various received digits are outpulsed.

When the last pulse of the last digit has been transmitted, the A program will again be advanced to the No. 16 or I–7 order and a match obtained in response thereto since "0" will now be recorded in the digit slot. As a result, the program is advanced to the No. 17 order designated I–10, which order again causes the circuits to examine the information stored in the next succeeding slot in the manner described, and at this time either an "end" code 1100 or a synchronizing code 1111 will be stored in this next slot in the signal store register. As a result, an output will be obtained from either And gate 8–17′ if the code is a 1100 code or from And gate 5—5 if the code is a 1111 synchronizing code. In either case, this positive output voltage is transmitted through the Or gate 8–35 and then to one of the inputs of the And gate 8–31. Positive voltage is obtained from the 6–I–10 And gate and applied to the upper input of this And gate and from the 8–L And gate for the other input of And gate 8–31 in response to positive voltage obtained from the "1" output of the 7–II flip-flop and from the $\Phi_b$ clock pulse.

As a result, the 6–W flip-flop in the 6–W, 6–X, 6–Y, 6–Z register is set in its "1" state. In addition, positive voltage is obtained from the And gate 8–28 due to positive voltage from the 6–I–10 And gate of the order word translator 611 which is transmitted through the Or gates 8–G and 8–K to the upper input of the And gate 8–28. Positive voltage is applied to the lower input of this And gate from And gate 8–L in response to the $\Phi_b$ clock pulse and positive voltage on the "1" output of the 7–II flip-flop.

Positive voltage from And gate 8–28 sets flip-flops 10–Φ, 7–I and 7–III in their "1" states. Then, in response to the following $\Phi_e$ pulse 7–I and 7–II flip-flops are restored to their "0" states and in response to the $\Phi_f$ pulse 7–III flip-flop is restored to its "0" state.

With the flip-flop 10–Φ set in its "1" state, the succeeding cycle of clock pulses causes the program store to be advanced to the next or No. 18 order which is an I–5 order. This order, as described above, causes the signal store register to be advanced to the synchronizing code 1111. If the register is already in this position it will not be advanced because the circuits will respond to the 1111 synchronizing code and prevent the advance of the signal store. At this time the 6–X flip-flop is in its "0" state and the 6–W flip-flop is in its "1" state. Consequently, an output will be obtained from the And gate 8–21 due to positive voltage from And gate 5—5 in response to the 1111 entered upon the flip-flops 5–$C_0$ through 5–$C_3$ in response to the synchronizing code read out of the signal store register at this time. Positive voltage is obtained from the "1" output of the 6–W flip-flop and from the 6–I–5 And gate thus causing a positive voltage to be transmitted from the And gate 8–21 through Or gate 8–K to And gate 8–28. This positive voltage, together with positive voltage from the 8–L And gate in response to positive voltage on the "1" output of 7–II flip-flop and the $\Phi_b$ clock pulse causes an output to be obtained from the And gate 8–28.

Positive voltage is also obtained from And gate 8–29 at this time in response to positive voltage from And gate 5—5, positive voltage from the 6–I–5 And gate and positive voltage from the "1" output of the 6–W flip-flop. Positive voltage from the And gate 29 causes a "0" to be written in the signal store at point D. As shown in FIG. 3 D is in the $C_3$ channel of the signal store and is also ten slots ahead of the posiiton of the last slot of the No. 1 converter storage space in the signal store at this time. Thus, a "0" will be written in the $C_3$ channel of the code slot of the No. 1 converter register space in the signal store. Previously, the "send" code 1000 was recorded in this slot so that now a reset code 0000 will be recorded in this slot.

The output from the And gate 8–28 causes the circuits to advance in the manner described above so that the B program will then control the operation of the system during the next succeeding interval. Thereafter, the other programs control the operation of the system in cooperation with the information stored in the various converter register spaces of the signal store register in the manner described above. The next time the C program cooperates with the No. 1 converter register space, a match will not be obtained in response to Order No. 38 but a match will be obtained in response to the No. 39 or B–0 order since all zeros are recorded in the code slot in this No. 1 converter register space.

Order No. 39 has 001 recorded in the A portion and 0000 in the B portion. Consequently, the code entered upon the flip-flops 5–$B_0$ through 5–$B_3$ of the program register is 0000. At this time a 0000 is still recorded on the store register flip-flops 5–$C_0$ through 5–$C_3$ in response to the previous program Order No. 38. Consequently, a match will be obtained from the match circuit 612 so that positive voltage is obtained on the M output lead from the match circuit at this time. However, no such positive voltage will be obtained on the M′ conductor from the match circuit with the result that the $\Phi_a$, $\Phi_b$ and $\Phi_c$ pulses are ineffective at this time. The succeeding $\Phi_2$ pulse will then cause the program store to be primed or advanced. The succeeding $\Phi_d$ and $\Phi_e$ pulses from the clock circuit are ineffective. In response to the succeeding $\Phi_f$ pulse, the program register flip-flops will be reset to their "0" states.

Upon the receipt of the next $\Phi_1$ pulse from the clock circuit, the program register will be stepped since the 10–Φ flip-flop is in its "1" state with the result that the next No. 40 order word is read out and entered upon the order word register flip-flops. This No. 40 order is an I–13 order having a 110 entered in the A field and 1111 entered in the B field. This order is employed to write in the code slot and the eleven digit slots. The idle code of 0100 will be written in the code slot and the code 1101 indicating that a corresponding digit has not been received is written in each of the eleven digit slots of the No. 1 converter register space by this order.

This order entered on the order register flip-flops is decoded by the order word translator 611 which causes a positive output to be obtained first from the 6–I And circuit and then from the 6–I–13 And circuit. The $\Phi_a$ and $\Phi_b$ clock pulses are ineffective during this clock cycle. With positive potential from the 6–I–13 And gate of the order word translator 611, positive voltage is applied to the lower input of And circuit 8–27 through the 8–H Or circuit. Positive voltage is applied to the upper input of this And circuit from And circuit 8–N which has a positive output due to the flip-flop 7–I being in its "0" state and the $\Phi_c$ clock pulse. The output from And gate 8–27 is employed to reset the 10–Φ flip-flop and to set the 7–II flip-flop in its "1" state. In addition an output is obtained from And circuit 8–26 at this time due to the positive output from the And circuit 6–I–13 and the positive output from the And circuit 8–N as described above. As a result, flip-flop 5–$C_2$ is set in its "1" state and a zero is written in all four positions 3–H, 3–J, 3–K and 3–L in the signal store. The 3–H, 3–J, 3–K and 3–L positions at this time in effect write a zero in the scan slot. Normally 0000 would have already been written in this slot so that the writing of zeros at the 3–H, 3–J, 3–K and 3–L over these zeros leaves the slot in the same condition. If anything other than zeros had been previously written in this slot, then they will be changed to zeros.

It should be noted that the store register flip-flops comprising flip-flops 5–$C_0$ through 5–$C_3$ had previously been set to all zeros so that with $C_2$ now set to "1," these flip-flops are set to represent the idle code.

Consequently, when the next $\Phi_2$ clock pulse is received, this code 0100 will be written in the code slot of the signal store associated with the converter being processed which, under the assumed condition, will be the No. 1 converter. The $\Phi_d$ and $\Phi_e$ clock pulses are ineffective during this cycle of the clock circuit. The $\Phi_f$ pulse causes the signal store register flip-flops to be all restored to their "0" states. The next succeeding $\Phi_1$ pulse will step the signal store and cause the information recorded in the corresponding slot in the register space to be entered upon these flip-flops. Inasmuch as synchronizing signal comprising 1111 is not present in this slot, the $\Phi_a$ pulse is ineffective at this time.

Then in response to the $\Phi_b$ clock pulse an output is obtained from the 7–8 And circuit. This output is due to the flip-flop 7–II being in its "1" state, and due to positive voltage obtained from the 6–I–13 And circuit and due to the $\Phi_b$ clock pulse. The output of the And circuit 7–8 is employed to set 7–I flip-flop in its "1" state, to reset flip-flop 5–$C_1$ to its "0" state and set flip-flops 5–$C_0$, 5–$C_2$ and 5–$C_3$ to their "1" states. This represents the code indicating that the corresponding digit has not been received. The succeeding $\Phi_c$ pulse is ineffective so that upon the reception of the next $\Phi_2$ pulse from the clock circuit, this code is written in the next slot in the converter register No. 1. $\Phi_d$ and $\Phi_e$ clock pulses are ineffective and the $\Phi_f$ clock pulse is employed to reset the store register flip-flops 5–$C_0$ through 5–$C_3$ to their "0" states.

Thereafter each of the succeeding cycles of clock pulses causes the store to step and the same code to be written in each digit slot in the No. 1 converter register space until the code 1101 is written in all of the eleven digit storage slots in the converter register. When the store is again stepped it will be stepped to the first or synchronizing slot in the next register space in the store where 1111 is stored. When 1111 is read out from the store and entered upon the store register flip-flops 5–$C_0$ through 5–$C_3$, in response to the $\Phi_1$ clock pulse, an output will be obtained from the 5—5 And circuit which is transmitted to gate 7–11 and other And gate circuits. Positive voltage from the $\Phi_a$ pulse is applied to one of the other inputs of this And circuit 7–11 and from the 6–I–13 And circuit to another one of the inputs of this And circuit. The output of this And circuit 7–11 is employed to set 7–III flip-flop in its "1" state, to set the 10–$\Phi$ flip-flop in its "1" state, reset 7–II flip-flop to the "0" state, and to condition the No. 1 signal converter control circuit so that it will test idle and be available to be selected for use on another call.

The $\Phi_b$ and $\Phi_c$ clock pulses of this cycle are ineffective.

The 10–$\Phi$ flip-flop is set now in its "1" state, so the next $\Phi_2$ pulse causes the program store to be primed or advanced. The succeeding $\Phi_d$ pulse is ineffective. The $\Phi_e$ pulse with flip-flop 7–III in its "1" state causes an output from the And circuit 7–M which, in turn, resets flip-flops 7–I and 7–II to the "0" state. The succeeding $\Phi_f$ pulse then resets 7–III flip-flop and in addition causes the program register flip-flops 5–$A_0$ through 5–$A_2$ and 5–$B_0$ through 5–$B_3$ to be reset to their "0" states. At this time the converter register space has been restored to its initial condition wherein it is ready to respond to a succeeding cycle.

Thereafter the various signal store spaces are processed by the A, B, and C programs in the manner described above, assuming either that no signals are received or that signals are received from the various converters and stored in the corresponding signal stores in the manner described above with reference to the No. 1 converter. As described above, the No. 1 converter is processed by the A, B, and C programs. The C program causes the 1000 code to be written in the code slot when sufficient signals or digits have been received and processed by the equipment to permit determination of the total number of digits to be expected for each particular call, as described above. In this fashion the incoming signals are received as multifrequency signals and then later are retransmitted in the form of dial pulses representing the numbers or digits of the called subscriber's station in the form of dial pulses suitable for operation of step-by-step switches and equipment.

If the subscriber desires to make a 0 operator call, the first and only digit dialed will be a 0.

This digit will be entered in the scan slot in response to the first order of either the A, B, or C program in the manner described above. Then this slot is examined in response to the second order of the B program which is order No. 20 designated B– in table D. This order has 001 recorded in the A portion 0000 in the B portion. Since it is assumed that the digit 0 has been transmitted by the subscriber this slot will have recorded in it 1010 at this time. Consequently, a match will not be obtained between this number and the 0000 recorded in the B portion of the order. As a result the next order is skipped and order No. 22 employed to control the operation of the system. As described above this order causes the 1010 which was previously read out from the scan slot and entered upon the flip-flops 5–$C_0$ through 5–$C_3$ to be entered upon the 6–W, 6–X, 6–Y and 6–Z flip-flops.

Thereafter, the No. 23 order is read out from the program store. As described above this order is employed to examine the flip-flops 5–$C_0$ through 5–$C_3$ for the presence of the code 1010, the binary representation of the decimal number 10, which represents a dialed 0. Any combination of the flip-flop states other than 5–$C_3$ and 5–$C_1$ in their "1" states and 5–$C_2$ and 5–$C_0$ in their "0" states will produce an output from Or gate 5–4. As described above previously Or gate 5–4 did produce an output, with the result that the No. 28 order was then employed to control the system. However, now in response to the 0 dialed by the subscriber no output from Or gate 5–4 will be obtained in response to the Order No. 23 of the B program, with the result that Order No. 24 will be employed to control the operation of the system. This order is designated E–4 in table D and has 100 recorded in its A portion and 0100 recorded in its B portion. At this time, the signal store is stepped to the code slot and the code recorded therein read out.

Under the assumed conditions wherein the 0 was the first digit dialed, the idle code 0100 will still be recorded in this slot because the subsequent orders of the B program have not yet caused 1 to be subtracted from this code in the manner described above. Consequently, a match will be obtained between the idle code 0100 read out from the code slot in the converter register space and entered upon flip-flops 5–$C_0$ through 5–$C_3$ and the 0100 in the B portion of this order which is entered upon the program register flip-flops 5–$B_0$ through 5–$B_3$. This indicates that this digit is the first digit dialed. If a 0 is dialed for any other digit, then the code recorded in the code slot will not be 0100 so that a mismatch will be obtained in response to the No. 24 order with the result that the next order employed to control the system will be Order No. 28. The system then responds to this order and the succeeding orders of the B program in the manner described above.

However, where the 0 is the first digit, then a match is obtained as described above with the result that the No. 25 order is next employed to control the operation of the system. This order is designated I–11 in table D and has 110 recorded in its A portion and 1101 recorded in its B portion.

This order is read out of the program store in response to the $\Phi_1$ clock pulse and entered upon program register flip-flops 5–$A_0$ through 5–$A_2$ and 5–$B_0$ through 5–$B_3$ in a manner described. Then in response to the $\Phi_c$ clock pulse outputs are obtained from the And gates 8–N, 8–25 and 8–27 with a result that the flip-flop 10–$\Phi$ is reset to its "0" state and flip-flop 7–II is set in its "1" state.

In addition in response to positive output from the And gate 8–25 flip-flop 5–$C_3$ is set in its "1" state and flip-flop 5–$C_2$ is reset in its "0" state. By thus setting flip-flop 5–$C_3$ and resetting flip-flop 5–$C_2$ the code set upon the flip-flops 5–$C_0$ through 5–$C_3$ is changed from the idle code 0100 to the send code 1000.

Thereafter, the $\Phi_2$ pulse causes this code to be read into the signal store in the code slot instead of the idle code previously stored in this slot. The following $\Phi_d$ and $\Phi_e$ pulses are ineffective at this time while the $\Phi_f$ pulse causes flip-flops 5–$C_0$ through 5–$C_3$ to be restored to their "0" states.

The succeeding $\Phi_1$ pulse causes the next code which will be a "not received" code 1101 to be read out from the first digit slot and entered upon the flip flops 5–$C_0$ through 5–$C_3$. Then in response to the $\Phi_b$ pulse, an output will be obtained from the And gate 7—7 since flip-flop 7–II is now in its "1" state.

The output from And gate 7—7 is employed to set the flip-flop 7–I in its "1" state and also to reset flip-flops 5–$C_0$ and 5–$C_2$ and to set flip flop 5–$C_1$. In this manner the "not received" code of 1101 is changed to the code 1010 representing the dialed 0. Then in response to the succeeding $\Phi_2$ pulse, since the flip-flop 10–$\Phi$ is still in its "0" state, this code will be read into the signal store in the first digit slot of the No. 1 converter register space. The following $\Phi_f$ pulse resets the flip-flops 5–$C_0$ through 5–$C_3$.

The succeeding $\Phi_1$ pulse will cause the 1101 code recorded in the second digit slot to be read out and entered upon the flip-flops 5–$C_0$ through 5–$C_3$ in the manner described. Then in response to the $\Phi_a$ pulse an output will be obtained from the And gate 7–12 with a result that flip-flops 10–$\Phi$ and 7–III are set in their "1" states and the flip-flop 7–II is reset to its "0" state.

In addition flip-flop 5–$C_0$ is reset to its "0" state thus changing the code from the "not received" code 1101 to the end of call code 1100. In addition the flip-flop 7–J is set in its "1" state and the binary counter stages 7–$BC_2$, 7–$BC_3$, and 7–$BC_4$ are reset to their "0" states thus setting the binary counter 710 to represent a 1. This causes the next order to be skipped as described above and thereafter the Order No. 27 employed to advance the program store as described to the C program.

Thus the No. 1 converter register space in the signal store has been set with the binary number 1010 in the first digit slot, the end of call code 1100 in the second digit slot and the send code 1000 in the code slot. The system responds thereafter to the various orders and causes 10 pulses to be transmitted for the first digit to the step-by-step system which responds in the usual fashion and directs the call to a 0 operator.

It is to be understood thatt he above-described arrangements are illustraive of the application of the principles of the invention. Numerous other arrangements may be devised by theose skilled in the art, without departing from the spirit and scope of the invention.

What is claimed is:

1. In a telephone switching system in combination, a plurality of signal converters for converting multifrequency calling signals to serial groups of pulses, an electronic control apparatus common to all of said converters including means for storing a plurality of different programs of orders for controlling the operation of said electronic equipment, means for controlling the storing of multifrequency signals received by each of said converters by one of said programs, and means for controlling the transmission of converted signals by each of said converters by another one of said programs.

2. In combination a plurality of telephone control signal converters for changing telephone controlling signals of one type to other controlling signals of another type comprising a plurality of signal receivers responsive to received signals of said one type, testing means for testing said receivers for received signals, a common signal store for storing information representing the signals received by all of said receivers, means jointly responsive to said receivers and to said testing means for storing information representing received signals in said signal store, signal transmitting means individual to each of signal receivers, and control means for controlling said signal transmitting means in accordance with the information stored in said common signal store.

3. In a communications switching system in combination a plurality of calling signal converters for converting multifrequency calling signals to dial pulses representing the same calls comprising a plurality of multifrequency signal receivers, means for scanning said multifrequency signal receivers in succession for received signals, a common signal store having a plurality of storage spaces, control means for directing information representing signals received by one of said receivers to one of said storage spaces, dial pulse transmitting apparatus, and control means responsive to information stored in said one of said storage spaces for controlling said dial pulse transmitting apparatus.

4. In a step-by-step telephone switching system in combination a plurality of subscribers' stations having means for transporting multifrequency calling signals, a plurality of multifrequency signal receivers, means for selectively interconnecting said subscribers' stations with said multifrequency receivers, means for periodically testing said receivers for received signals, a signal store common to said receivers and having a plurality of storage spaces, means for transmitting information from one of said receivers to said signal store, electronic control means for causing information representing the signals received by one of said receivers to be stored in one of said storage spaces, pulse responsive switches included in said switching system, pulse transmitting means, means responsive to information stored in said storage space for controlling said pulse transmitting means, and means for conveying said pulses to said switches.

5. In combination a plurality of signal receivers, a signal store common to said receivers, electronic control circuits interconnected with said signal store and with said signal receivers, a program store for storing information comprising a plurality of different programs of different sequences of orders for controlling said electronic control circuits, and means included in said electronic control circuits responsive to orders of each of said programs for testing said signal receivers for received signals.

6. In combination a plurality of signal receivers in accordance with claim 5 further characterized by means responsive to one of said programs of orders to control information stored in said store representing signals received by one of said receivers.

7. In a communication switching system in combination a plurality of multifrequnecy signal receivers, a signal store common to said signal receivers and having a plurality of individual register spaces, testing means for sequentially testing said signal receivers for received signals, control means for controlling the storing in one of said storage spaces of information representing signals received by one of said receivers, and a plurality of signal pulse transmitters for transmitting series of pulses, said control means including apparatus for controlling one of said signal pulse transmitters by the information stored in said one storage space.

8. A communication switching system in accordance with claim 7 further characterized in that said control means includes a program store having stored therein a plurality of programs of sequences of orders and means responsive to said orders for controlling said system.

9. A communication switching system in accordance with claim 8 further characterized in that said control means includes apparatus responsive to orders in each of a plurality of said programs for controlling said testing means.

10. A communication switching system in accordance with claim 8 further characterized in that said control means includes apparatus responsive to orders of one of said stored programs of orders for controlling the storing of information in said register spaces representing signals received by said receivers.

11. A communication switching system in accordance with claim 8 further characterized in that said control means includes apparatus responsive to orders of one of said stored programs of orders for controlling said one of said signal pulse transmitters by information stored in said one storage space.

12. A communication switching system in accordance with claim 11 further characterized in that said control means includes other apparatus responsive to orders of a different one of said stored programs of orders for timing the interval between series of transmitted pulses.

13. A communication switching system in accordance with claim 8 further characterized in that said control means includes apparatus responsive to orders of one of said stored programs of orders for returning said storage spaces to their idle conditions.

14. A communication switching system in accordance with claim 8 in which the information stored in said register spaces represents characters of a called designation further characterized in that said control means comprises apparatus responsive to orders of one of said programs for counting received characters including means for subtracting one from a predetermined number stored in said one register space for each character received by said one receiver.

15. A communication switching system in accordance with claim 8 in which information stored in said register spaces represents the status of a call characterized in that said control means comprises apparatus responsive to orders of one of said programs for controlling the entering of information in said register spaces representing the status of a call.

16. In a telephone switching system, a plurality of subscriber lines, means for registering signals of a first type received from said lines, means for transmitting signals of a second type, control means for translating between said first and said second type signals, program store means including a plurality of programs, means responsive to a first of said programs for controlling said registering means, means responsive to a second of said programs for controlling said transmitting means, means responsive to a third of said programs for controlling said control means, and means responsive to portions of each of said programs for scanning said means for registering signals of said first type received from said lines.

17. In a telephone switching system, a plurality of subscriber lines, a plurality of receivers for receiving signals from said lines, a signal store common to said receivers and having a plurality of register spaces, a program store for storing information comprising a plurality of different programs, and electronic control circuitry connected to said receivers, said signal store, and said program store for associating each of said programs in order with successive ones of said register spaces, the number of said storage spaces being greater than the number of programs and not evenly divisible thereby.

References Cited by the Examiner

UNITED STATES PATENTS 2,723,312 11/1955 McGuigan et al. ---- 179—16.45

KATHLEEN H. CLAFFY, *Primary Examiner.*

WILLIAM C. COOPER, *Examiner.*